United States Patent
Joseph et al.

(10) Patent No.: US 8,407,110 B1
(45) Date of Patent: Mar. 26, 2013

(54) METHOD AND APPARATUS FOR REGISTRATION OF FULFILLMENT SERVICES

(75) Inventors: B. Anthony Joseph, Bellevue, WA (US); Thomas W. Plaster, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1301 days.

(21) Appl. No.: 11/958,852

(22) Filed: Dec. 18, 2007

(51) Int. Cl.
*G06Q 10/00* (2012.01)
*G06Q 30/00* (2012.01)

(52) U.S. Cl. ..... 705/28; 705/26.1; 705/26.63; 705/26.8; 705/26.81; 705/27.1

(58) Field of Classification Search ............. 705/26.1, 705/26.63, 26.8, 26.81, 27.1, 28
See application file for complete search history.

(56) References Cited

U.S. PATENT DOCUMENTS

| | | | |
|---|---|---|---|
| 5,715,314 A | 2/1998 | Payne et al. | |
| 5,909,492 A | 6/1999 | Payne et al. | |
| 5,960,411 A | 9/1999 | Hartman et al. | |
| 5,963,915 A * | 10/1999 | Kirsch | 705/26.8 |
| 6,029,141 A | 2/2000 | Bezos et al. | |
| 6,101,482 A | 8/2000 | DiAngelo et al. | |
| 6,223,215 B1 | 4/2001 | Hunt et al. | |
| 6,405,176 B1 | 6/2002 | Toohey | |
| 6,449,599 B1 | 9/2002 | Payne et al. | |
| 6,587,827 B1 | 7/2003 | Hennig et al. | |
| 6,622,127 B1 | 9/2003 | Kiots et al. | |
| 6,725,222 B1 | 4/2004 | Musgrove et al. | |
| 6,845,364 B1 | 1/2005 | Pool et al. | |
| 6,873,968 B2 | 3/2005 | Ehrlich et al. | |
| 7,050,938 B1 | 5/2006 | Prater et al. | |
| 7,222,087 B1 | 5/2007 | Bezos et al. | |
| 7,370,009 B1 | 5/2008 | Notani et al. | |
| 7,406,472 B2 | 7/2008 | Manucha et al. | |
| 8,204,799 B1 * | 6/2012 | Murray et al. | 705/26.81 |
| 2002/0138496 A1 | 9/2002 | Schambach et al. | |
| 2002/0178074 A1 | 11/2002 | Bloom | |
| 2003/0033205 A1 | 2/2003 | Nowers et al. | |
| 2003/0069831 A1 | 4/2003 | Le et al. | |
| 2003/0083949 A1 | 5/2003 | Kar | |

(Continued)

OTHER PUBLICATIONS

Ricker, F. et al., Order Fulfillment: The Hidden Key to E-Commerce Success, Supply Chain Management Review, Fall 1999, pp. 60-70.*

(Continued)

*Primary Examiner* — Bradley B Bayat
(74) *Attorney, Agent, or Firm* — Robert C. Kowert; Meyertons, Hood, Kivlin, Kowert & Goetzel, P.C.

(57) ABSTRACT

Various embodiments of a method and apparatus whereby a single action may control fulfillment services are described. Various embodiments may include an inventory management system associated with a fulfillment services provider. The inventory management system may be configured to implement a fulfillment services management interface configured to generate a user interface providing an indication of item(s) listed for sale by a merchant. In various embodiments, order fulfillment services for such items may not be provided by a fulfillment services provider. Additionally, the user interface may provide a single action user interface element for the merchant to register the one or more items for fulfillment by a fulfillment services provider. The inventory management system may, in response to receiving an indication of activation of the single action user interface element, register the item(s) for fulfillment by the fulfillment services provider.

25 Claims, 20 Drawing Sheets

U.S. PATENT DOCUMENTS

| | | | |
|---|---|---|---|
| 2003/0115072 A1* | 6/2003 | Manucha et al. | 705/1 |
| 2003/0171962 A1 | 9/2003 | Hirth et al. | |
| 2003/0172007 A1 | 9/2003 | Helmolt et al. | |
| 2003/0200156 A1* | 10/2003 | Roseman et al. | 705/27 |
| 2004/0064351 A1 | 4/2004 | Mikurak | |
| 2004/0098333 A1* | 5/2004 | Meesseman | 705/37 |
| 2004/0111286 A1 | 6/2004 | Koenig et al. | |
| 2004/0117337 A1 | 6/2004 | Beck et al. | |
| 2004/0143519 A1* | 7/2004 | Siegel | 705/28 |
| 2004/0254842 A1 | 12/2004 | Kirkegaard | |
| 2005/0006456 A1 | 1/2005 | White | |
| 2005/0033671 A1 | 2/2005 | Hahn-Carlson | |
| 2005/0081151 A1 | 4/2005 | Van Der meer | |
| 2005/0114222 A1 | 5/2005 | Mundy | |
| 2005/0125312 A1 | 6/2005 | Dearing et al. | |
| 2005/0154904 A1 | 7/2005 | Perepa et al. | |
| 2005/0171858 A1* | 8/2005 | Cotton et al. | 705/26 |
| 2006/0015455 A1* | 1/2006 | Hahn-Carlson et al. | 705/39 |
| 2006/0036504 A1 | 2/2006 | Allocca et al. | |
| 2006/0089897 A1 | 4/2006 | Maas et al. | |
| 2006/0116936 A1 | 6/2006 | Lucas | |
| 2006/0122892 A1 | 6/2006 | Fletcher et al. | |
| 2006/0122897 A1 | 6/2006 | Fletcher et al. | |
| 2006/0190362 A1 | 8/2006 | Krystek et al. | |
| 2006/0195364 A1 | 8/2006 | Shroff et al. | |
| 2007/0078725 A1 | 4/2007 | Koszewski et al. | |
| 2007/0094510 A1 | 4/2007 | Ross et al. | |
| 2007/0143206 A1 | 6/2007 | Ciu et al. | |
| 2007/0192215 A1* | 8/2007 | Taylor et al. | 705/28 |
| 2009/0083058 A1* | 3/2009 | Beringer et al. | 705/1 |

OTHER PUBLICATIONS

Cohen, "Electronic Commerce," Information Sciences Institute Research Report ISI/RR-89-244, Oct. 1989, 46 pages.

Amazon Advantage Membership Agreement, Instructions & Rules, Dec. 6, 2004, downloaded from web.archive.org/web/20041211005149/www.amazon.com/exec/obidos/subst/partners/direct/direct-agreement.html, 9 pages.

Amazon Advantage Overview, downloaded from web.archive.org/web/20041024162213/http://www.amazon.com/exec/obidos/subst/partners/direct/advantage/homt.html/, 2 pages.

Amazon.com Press Release, "Target and Amazon.com team to advance e-commerce initiatives," Sep. 11, 2001, 2 pages.

Amazon.com Press Release,"Target to deliver four unique brands in one comprehensive site at target.com," Aug. 12, 2002, 2 pages.

U.S. Appl. No. 11/852,040, filed Sep. 7, 2007.
U.S. Appl. No. 11/351,881, filed Feb. 10, 2006.
U.S. Appl. No. 12/037,707, filed Feb. 26, 2008.
U.S. Appl. No. 11/756,160, filed May 31, 2007.
U.S. Appl. No. 11/751,433, filed May 21, 2007.

* cited by examiner

Packing slip 500

Ship to:
John Q. Customer
100 Main St.
Anytown, USA 12345

Contents of this shipment:

| Item | Quantity | Price |
|---|---|---|
| Item A | 1 | 10.00 |
| Item B  Offered by: Merchant A | 1 | 12.00 |
| Item C  Offered by: Merchant B | 1 | 23.00 |
| Item D  Offered by: Merchant C | 1 | 5.00 |
| | Shipping: | Free |
| | Total: | 50.00 |

FIG. 5

Display 800

Search 802
Search category: ← 804
[Books ⇩]

Search for: ← 806  808
[_____] (Go)

List 820
822 → Units: 2  Total profits if sold: $21.59
824 → (Complete)

| Item 810E | Item information 826B<br><title><br><weight><br><type><br><identifier><br>... | 828 Condition:<br>[Used - average ⇩]<br>Condition notes:<br>great music<br>830 | 832 Price:<br>$1.50<br><br>836 Profit if sold:<br>$-0.99 | 834 Quantity:<br>1<br><br>838<br>C new from $S<br>D used from $T | 842 (Save)<br>844 (Remove) |

| Item 810A | Item information 826A<br><title><br><weight><br><type><br><identifier><br>... | 828 Condition:<br>[Used - very good ⇩]<br>Condition notes:<br>in excellent condition<br>830 | 832 Price:<br>$30.00<br><br>836 Profit if sold:<br>$22.58 | 834 Quantity:<br>1<br><br>838<br>A new from $X<br>B used from $Y | 842 (Save)<br>844 (Remove) |

*FIG. 9F*

Display 800

Search 802
Search category: 804
[Books ⇩]

Search for: 806  808
[____]  (Go)

List 820
822 → Units: 3  Total profits if sold: $32.72
824 → (Complete)

| Item 810G | Item information 826B<br><title><br><weight><br><type><br><identifier><br>... | 828 Condition:<br>[Used - average ⇩]<br><br>Condition notes:<br>A good book<br>830 | 832 Price:<br>[$10.00]<br><br>836<br>Profit if sold:<br>$5.46 | 834 Quantity:<br>[1]<br><br>838<br>C new from $S<br>D used from $T | 842 (Save)<br><br>844 (Remove) |

| Item 810H | Item information 826A<br><title><br><weight><br><type><br><identifier><br>... | 828 Condition:<br>[Used - very good ⇩]<br><br>Condition notes:<br>Good movie, DVD like new<br>830 | 832 Price:<br>[$9.00]<br><br>836<br>Profit if sold:<br>$4.68 | 834 Quantity:<br>[1]<br><br>838<br>A new from $X<br>B used from $Y | 842 (Save)<br><br>844 (Remove) |

| Item 810A | Item information 826A<br><title><br><weight><br><type><br><identifier><br>... | 828 Condition:<br>[Used - very good ⇩]<br><br>Condition notes:<br>in excellent condition<br>830 | 832 Price:<br>[$30.00]<br><br>836<br>Profit if sold:<br>$22.58 | 834 Quantity:<br>[1]<br><br>838<br>A new from $X<br>B used from $Y | 842 (Save)<br><br>844 (Remove) |

This will finalize your shipment contents.  Select 'OK' to continue (OK)   (Cancel)

Display 880

[Print]  [Continue >]

Place this page inside your package

Packing slip 882

Ship from:
Address
862A

Ship to:
Address
872

Purchase order / shipment identifier:

Bar code
884

<Idenifier number>

Special processing and handling information
886

Shipment content list
888

*FIG. 13*

Display 890

That's it - you're done!

* Once your packages is sealed and ready to go, drop it off with your preferred carrier
* When your shipment arrives, we'll list it for sale on our website
* If one of your items sells, we'll ship it to the buyer and credit your payment account for the sale less our fees You can visit your seller account to check on the status of your shipments, inventory and sales. You can also use your seller account to change your asking prices if desired.

[Generate a new shipment]  [Exit]

*FIG. 14*

METHOD AND APPARATUS FOR REGISTRATION OF FULFILLMENT SERVICES

BACKGROUND OF THE INVENTION

1. Field of the Invention

This invention relates to computer-implemented management of fulfillment services and, more particularly, to management of inventory fulfillment services.

2. Description of the Related Art

In order to offer customers a variety of items readily available for delivery, many merchants (whether engaging in electronic or conventional "brick and mortar" commerce) hold various quantities of such items within inventory facilities. Keeping items in inventory may serve to buffer variations in customer demand or a manufacturer or distributor's ability to supply various items. For example, different items offered for sale by a merchant may have different manufacturer lead times. Holding quantities of such items as inventory may enable a merchant to offer consistent availability of these items to customers despite the different lead times.

However, in some circumstances, holding inventory may present various costs or disadvantages to a merchant. For example, inventory storage facilities may be expensive to provision and maintain, particularly for smaller merchants who may not be able to efficiently and profitably distribute the fixed costs of such facilities across a limited quantity of inventory. Moreover, should the need arise, scaling an inventory system to accommodate increased demand or volume may be an expensive proposition requiring substantial investment in technology, facilities and/or staffing.

A merchant's holding of its own inventory may also present disadvantages to customers. As electronic commerce grows in popularity, many merchants increasingly list their offerings along with other merchants via electronic marketplaces that provide a common interface through which customers may search for items and place orders. However, if different merchants are ultimately responsible for fulfilling their own respective orders through such a marketplace, the customer's ordering experience for a given item may vary considerably depending on the merchant from which the item is ordered. For example, a merchant that has little skill or poor processes for order fulfillment may be slow to ship an item, may ship the wrong item, may deliver damaged goods, or may otherwise create a negative customer experience. Such a negative experience may reflect not only on the merchant from which the customer ordered, but also on other merchants in the electronic marketplace, possibly decreasing customer confidence in the marketplace itself.

In addition, individuals, small merchants such as resale shops, or other entities may have single units of items or small quantities of possibly heterogeneous items, possibly but not necessarily used items, which they wish to sell via an electronic commerce channel. Conventional electronic commerce channels that allow customers to list items for sale may require a separate listing process to list each item with the electronic commerce channel, and require the selling customer to handle most or all aspects of shipping each sold item to the particular customer that purchases the item. For example, if an individual wants to list twenty items for sale via an electronic commerce channel, the individual may have to complete twenty different listing processes, one to list each item, and then the individual may potentially have to make as many as twenty separate trips to a carrier or delivery service drop-off to ship the items to fulfill orders or requests for the items. The individual may also have to create shipping labels for each package shipped.

SUMMARY

Various embodiments of a method and apparatus whereby a single action may control fulfillment services are described. Various embodiments may include an inventory management system associated with a fulfillment services provider. The inventory management system may be configured to implement a fulfillment services management interface configured to generate a user interface providing an indication of item(s) listed for sale by a merchant. In various embodiments, order fulfillment services for such items may not be provided by the fulfillment services provider. Additionally, the user interface may provide a single action user interface element for the merchant to register the one or more items for fulfillment by the fulfillment services provider. The inventory management system may, in response to receiving an indication of activation of the single action user interface element, register the item(s) for fulfillment by the fulfillment services provider. In various embodiments, registering the item(s) for fulfillment by the fulfillment services provider may include one or more of: providing the merchant with information for conveying units of the item(s) to the fulfillment services provider, modifying sales listings for the item(s) to indicate that orders for the one or more items are fulfilled by the fulfillment services provider, and including the item(s) as available for promotional or special handling services offered for other items for which orders are fulfilled by said fulfillment services provider.

BRIEF DESCRIPTION OF THE DRAWINGS

FIG. 5 illustrates one embodiment of a packing slip that may be included in a package resulting from the order fulfillment method of FIG. 4.

FIGS. 9A-G and FIG. 10 through FIG. 14 illustrate exemplary user interfaces that may be provided via a fulfillment services registration interface for providing access to inventory fulfillment services to listing customers who have single units of items or small quantities of possibly heterogeneous items that they wish to list for sale with a fulfillment services provider, according to embodiments.

Figure 1:
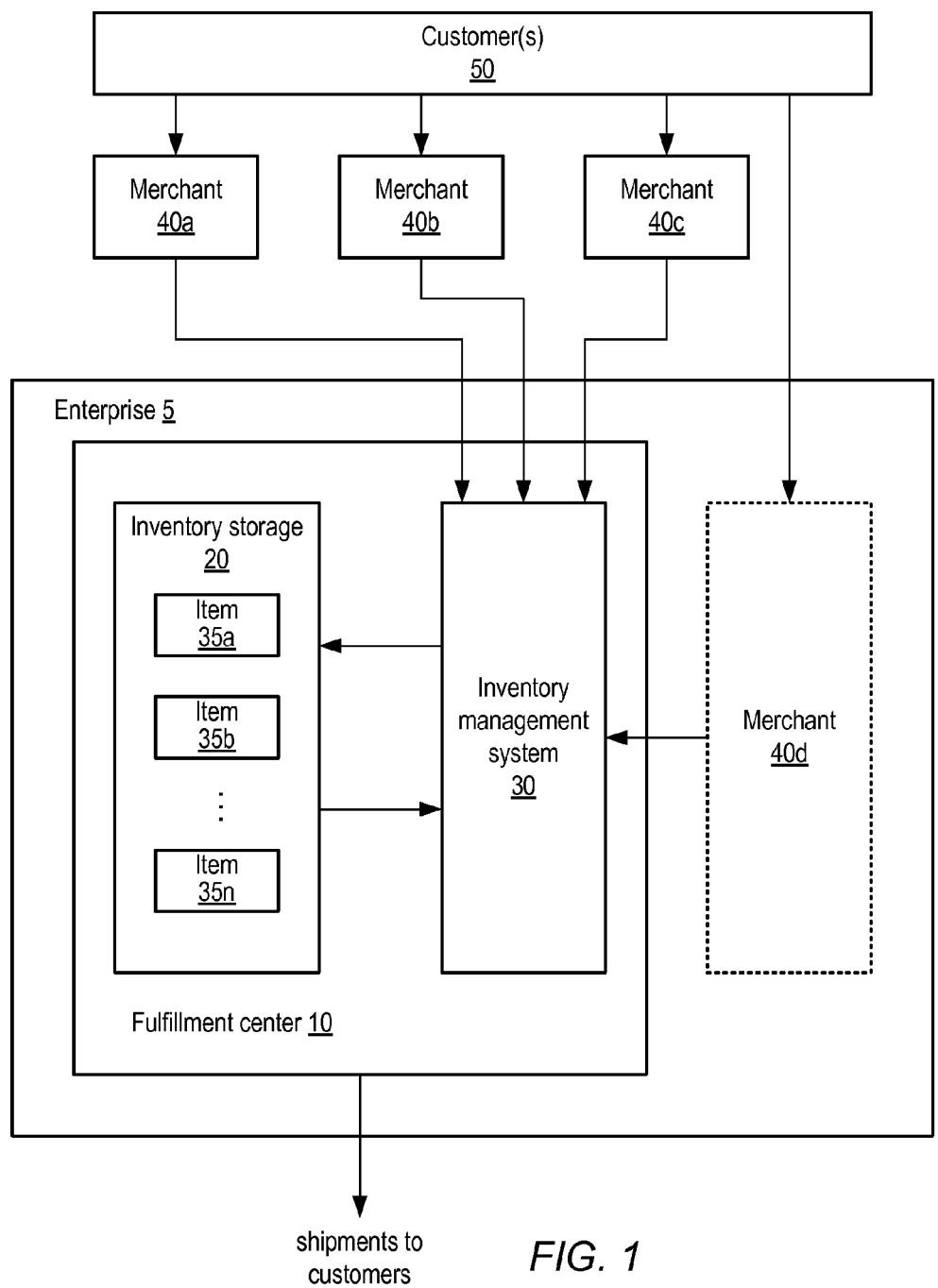
FIG. 1 is a block diagram illustrating one embodiment of a fulfillment center.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Fulfillment Center Overview

One embodiment of a fulfillment center configured to store inventory items for customer order fulfillment is illustrated in FIG. 1. In the illustrated embodiment, an enterprise 5 includes a fulfillment center 10 that in turn includes an inventory storage facility 20 as well as an inventory management system 30. Storage facility 20 may be configured to store an arbitrary number of inventory items 35*a-n*. As described in greater detail below, system 30 may be configured to receive customer orders for various ones of items 35 from one or more customers 50 via one or more of an arbitrary number of different merchants 40*a-d*. Additionally, system 30 may be configured to initiate and/or coordinate actions resulting in the shipment of ordered items 35 to corresponding customers 50.

Generally speaking, fulfillment center 10 may be configured to receive and store different kinds of items 35 from various sources, such as wholesalers, distributors, or merchants 40, for example. Items 35 may generally encompass any type of tangible object or substance that may be received for storage. For example and without limitation, items 35 may include media items (e.g., books, compact discs, videotape and/or DVDs), electronic devices, computers and related peripherals and equipment, consumer or commercial appliances, clothing, prescription and/or over-the-counter pharmaceuticals, cosmetics, food, or other suitable items. It is noted that items 35 may be stocked, managed or dispensed in terms of discrete, countable units or multiples of units, such as packages, cartons, crates, pallets or other suitable aggregations. Alternatively, some items 35 such as bulk products, commodities, etc. may be stored in continuous or arbitrarily divisible amounts that may not be inherently organized into countable units. Such items 35 may be managed in terms of measurable quantities such as units of length, area, volume, weight, time duration or other dimensional properties characterized by units of measurement. Generally speaking, a quantity of an item 35 may refer to either a countable number of individual or aggregate units of an item 35 or a measurable amount of an item 35, as appropriate.

Items 35 received at fulfillment center 10 for storage may be stored within inventory storage facility 20, which may include any suitable combination or arrangement of item storage structures. For example, facility 20 may include racks, bins, pallets or other types of storage apparatus arranged in a grid or other fashion. In some embodiments, facility 20 may include different types of storage suitable for items 35 having special storage requirements. For example, certain types of items 35 may be perishable, fragile or volatile and may require storage under controlled temperature, atmospheric or other conditions. Correspondingly, facility 20 may include refrigerated or other types of storage areas configured to satisfy special environmental requirements of certain items 35. It is contemplated that in some embodiments, items 35 may be stored within facility 20 in different configurations than in which they are received. For example, units of items 35 may be received in boxes, on pallets, or in other aggregate units, and may be unpacked or otherwise disaggregated for storage as individual units within bins, on shelves, or in other storage structures within facility 20.

Inventory management system 30 may generally be configured to track and control the status and movement of inventory items 35 through fulfillment center 10. In one embodiment, as described in greater detail below in conjunction with the description of FIG. 19, system 30 may include computer-accessible media configured to store instructions that are executable, e.g. by a processor or computer system, to detect events that relate to items 35 and to generate or initiate actions in response to such events. For example, system 30 may detect events relating to the arrival of inventory items 35 from a supplier or merchant, and may responsively instruct an agent (e.g., a mechanical agent or human agent) to process the received items 35 and store them appropriately within storage facility 20. Similarly, system 30 may be configured to detect orders for various items 35 that may arrive from merchants 40 on behalf of customers 50. Responsively, system 30 may be configured to instruct an agent to select the appropriate item (s) 35 for a received order from storage facility 20 and prepare the selected item(s) 35 for shipping or other conveyance to a corresponding customer 50. In some embodiments, whenever units of a given item 35 are stored within or selected from storage facility 20, system 30 may update an indication corresponding to the given item 35 to reflect its inventory status. For example, such an indication may reflect the number of units currently stored within facility 20, the number of units that have been selected from facility 20 but that have not yet left fulfillment center 10, the number of units of given item 35 that are on order, and/or any other suitable item status information. System 30 may also be configured to process events relating to the processing of damaged or defective items 35, returns received from customers 50, or other exceptional events.

Merchants 40 may arrange to offer various ones of items 35 in commerce to customers 50. Generally speaking, an item 35 may be offered in commerce by a merchant according to any suitable business model. For example, an item 35 may be offered in commerce on the basis of a sale, rental, lease, auction, barter, credit, licensing, royalty or any other type of transaction. Merchants 40 may offer items 35 in commerce through any of a variety of channels. For example, a given merchant 40 may present offers of items 35 via electronic commerce (e-commerce) portals accessible by customers 50. Such e-commerce offerings may variously include listing items 35 via a web-based entity (e.g., a web site or page) hosted by the given merchant 40 and presented as an offering entity distinct from enterprise 5, or listing items 35 via a web-based entity hosted by enterprise 5 on behalf of the given merchant 40.

In some embodiments, a merchant 40 may list items 35 via a general web-based entity hosted by enterprise 5, such as a marketplace or forum in which many merchants 40 may list offerings. Generally speaking, a marketplace e-commerce channel may generally refer to a web-based entity through which multiple merchants 40 may offer items 35 to customers 50 via one or more web pages. For example, a marketplace may be organized to present to customers 50 one or more web pages listing the various merchants 40 offering a particular item 35 in commerce according to various terms (e.g., price, availability, condition, etc.). Alternatively, a marketplace may be organized to present to customers 50 one or more web pages corresponding to respective virtual storefronts of merchants 40, where each storefront indicates the various offerings of a corresponding merchant 40. In some embodiments, a marketplace may be implemented via a web services application programming interface (API), described below, rather than as one or more web pages. For example, catalog information, ordering functions and other aspects of a marketplace may be implemented as web services functions that may be invoked by various parties to present items 35 in commerce to customers 50. Other configurations of e-commerce marketplaces are possible and contemplated.

A merchant's e-commerce offerings may also include listing items 35 via a third-party web entity distinct from enterprise 5 and the merchant 40, such as a third-party auction web entity. It is also contemplated that a merchant 40 may present e-commerce offerings through entities other than web-based entities. For example, a merchant 40 may present such offerings through electronic mail, electronic bulletin boards, or other electronic channels.

In some embodiments, merchants 40 may also offer items 35 in commerce to customers 50 through non-electronic channels, such as catalog, telephone or physical storefront channels, for example. Alternatively, some merchants 40 may offer items 35 in commerce through a combination of different channels. It is also noted that some merchants, such as merchant 40d, may be affiliated with the enterprise 5 that provides fulfillment services to merchants 40 in general, although in other embodiments, enterprise 5 may provide fulfillment services for items 35 without operating as a merchant for those items.

Generally speaking, customer(s) 50 may include any entity that may place an order for one or more items 35 via one or more merchants 40. For example, a customer 50 may include an individual, institution, corporation, business, organization or other entity. Customers 50 may place orders with merchants 40 via any suitable channel, such as one of the e-commerce channels described above, or via a non-electronic order channel. A customer 50 may be an entity that is ultimately legally and/or fiscally responsible for an order, but need not be such an entity. Similarly, a customer 50 may or may not be the intended recipient of items associated with a given order. For example, a customer 50 may place an order for items 35 on behalf of another entity that may bear liability for payment or may be the intended recipient. In some embodiments, a customer 50 may include multiple individuals or entities that consent to have their ordered items 35 shipped together. For example, a customer 50 may correspond to a group of individuals in the same household or business.

After a given customer 50 places an order for one or more items 35, the order may be fulfilled. Generally speaking, the fulfillment process may include selecting from storage the item(s) 35 specified in the order, packaging selected item(s) 35 appropriately for the mode in which they will be conveyed to the customer 50 or other intended recipient, and conveying the package or packages to the recipient. For example, selected item(s) may be packaged in one or more boxes, envelopes or other types of containers along with protective material, promotional materials (e.g., advertising leaflets or brochures), a packing slip or invoice. The packing container may then be sealed, appropriately labeled, and tendered to a common carrier (e.g., the United States Postal Service or another carrier) or another type of carrier or delivery service for delivery to the intended recipient.

Fulfillment Services Request Processing

As shown in the embodiment of FIG. 1, fulfillment center 10 may be configured to offer fulfillment services to a variety of merchants 40 that may be internal or external to the enterprise associated with fulfillment center 10. In general, fulfillment services may include any actions relating to the storage and processing of items 35 within fulfillment center 10 as well as the fulfillment of specific customer orders for various ones of items 35. For example, fulfillment services may include those tasks involved in receiving items 35 into inventory, such as taking physical receipt of units or quantities of items 35, examining and/or evaluating the condition of received items 35, unpacking or repackaging items 35 if necessary, and storing items 35 within storage facility 20. Fulfillment services may also include selecting or picking items 35 from storage facility 20 in response to a customer order, as well as the packaging and shipping tasks described above. In some embodiments, fulfillment services may include other tasks undertaken on behalf of a merchant 40, such as inspecting or monitoring the quantity and/or condition of items 35 while stored in storage facility 20, receiving and processing items 35 returned from customers 50, processing and disposing of items 35 that are unmarketable for various reasons (e.g., items 35 that are surplus, damaged, expired, spoiled, etc.), engaging in customer service activities (e.g., responding to complaints, inquiries, etc.) with customers 50, or other types of tasks. Embodiments of fulfillment center 10 configured to provide fulfillment services to merchants 40 may also be referred to as fulfillment services providers.

In some instances, fulfillment center 10 may provide fulfillment services to merchants 40 with greater economies of scale than if merchants 40 were to perform their own fulfillment services. For example, the incremental cost of providing a square foot of storage area in a large fulfillment center 10 (e.g., one comprising hundreds of thousands of square feet of storage area) may be significantly lower than the cost incurred by a small merchant 40, which may have limited space for storage or may be forced by local market conditions to retain more space than required for that merchant's inventory. Similarly, fulfillment center 10 may implement sophisticated inventory tracking and management techniques that might be costly and cumbersome to implement on the scale of an individual merchant 40, such as RFID (Radio Frequency Identification) of items, dynamic scheduling and optimization of item selection across multiple orders, real-time inventory tracking with respect to order, receiving and shipping activity, or other inventory management techniques. As described in greater detail below, in some embodiments fulfillment center 10 may be configured to consolidate a single customer's orders from several merchants 40, which may realize additional economies of scale, e.g., by reducing packaging, item handling and shipping costs.

Arranging the provision of fulfillment services to various merchants 40 may present challenges, however. For example, merchants 40 may operate as distinct enterprises having methods and systems for inventory management and accounting that differ from one another as well as from enterprise 5. As a result, merchants 40 and enterprise 5 may lack a uniform way of identifying inventory items 35. For example, a given merchant 40 may identify and manage a particular item 35 by that item's Universal Product Code (UPC), whereas the same item 35 may be identified within fulfillment center 10 by a proprietary unique identification number. Further, merchants 40 may wish to dynamically change the fulfillment services they receive for various items 35. For example, a particular merchant 40 may wish to expeditiously transition from performing its own fulfillment for an item 35 to receiving fulfillment services for that item from fulfillment center 10, or vice versa. If such a transition were to require manual approvals (e.g., of the merchant's eligibility or the item's suitability for fulfillment services) and/or a manual integration of relevant aspects of the particular merchant's inventory and order management systems with those of fulfillment center 10, the overhead of arranging for fulfillment services may significantly erode the savings or efficiencies provided by such services. For example, if enterprise 5 were condition processing of fulfillment services requests on manual lookup and entry of data provided by a merchant 40, days or weeks might elapse.

In one embodiment, fulfillment center 10 may be configured to provide a registration interface through which a merchant may register to receive fulfillment services for one or more items 35, where operation of the registration interface to process a request for fulfillment services does not require human intervention. For example, the interface may provide an automated process through which a merchant may complete those tasks necessary to initiate fulfillment services for various items 35. As described in greater detail below, in various embodiments such an automated process may include evaluating the credentials of a merchant 40 (e.g., whether the merchant is known to enterprise 5, in good financial status, etc.), assessing the items 35 for which fulfillment services have been requested (e.g., whether the items 35 qualify for the requested services), and providing the requesting merchant 40 with the information needed to complete the fulfillment services request (e.g., providing labels to be applied to items 35 for fulfillment center inventory control, shipping labels for shipping items to a fulfillment center 10, instructions, status reports, or other information). The fulfillment center's portion of each of these tasks may be performed automatically and without human intervention, as detailed below.

Figure 2A:
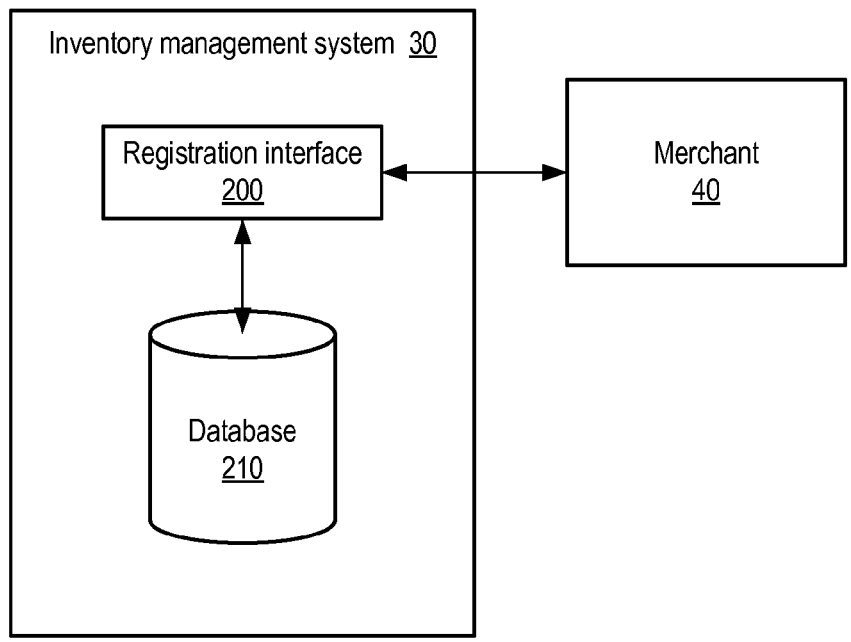
FIG. 2A is a block diagram illustrating one embodiment of a fulfillment services registration interface.

One embodiment of a fulfillment services registration interface is illustrated in FIG. 2A. In the illustrated embodiment, inventory management system 30 of fulfillment center 10 is shown to include a registration interface 200 configured to interact with a database 210. In one embodiment, registration interface 200 may be configured to present an interface through which a given merchant 40 may specify a request for fulfillment services, enter data related to the requested services, and engage in those processing actions deemed necessary by enterprise 5 for given merchant 40 to receive the requested services. For example, in one embodiment interface 200 may be configured to present to a merchant 40 one or more web pages accessible via the public Internet or a private intranet (e.g., a private network maintained by or on behalf of enterprise 5 requiring some level of authentication or secured connection for access). Such a web page may include fillable forms, menus, executable applications (e.g., applications coded in Java™ Javascript or another language suitable for web-based execution) or other web-based interface elements.

In another embodiment, interface 200 may be configured to present a proprietary or non-web-based registration interface to merchants 40. For example, interface 200 may be accessible through a dialup or non-web-based Internet connection, such as via a terminal emulation program such as telnet, or via another type of standard or proprietary application suitable for transmitting information between a merchant 40 and inventory management system 30. In yet another embodiment, interface 200 may include a web services interface for merchant fulfillment services registration, as described in greater detail below. In some embodiments, interface 200 may include other types or modes of interface implementations, including various combinations of the aforementioned techniques, configured for communicating with merchants 40 to perform activities related to registering for or managing use of fulfillment services.

In the illustrated embodiment, interface 200 may be configured to store fulfillment services registration data received from merchants 40, or other data that is derived from or produced as a result of or in relation to a merchant's fulfillment services registration activity, within database 210. Generally speaking, database 210 may include any suitable type of application or data structure that may be configured as a persistent data repository. For example, database 210 may be configured as a relational database that includes one or more tables of columns and rows and that may be searched or queried according to a query language, such as a version of Structured Query Language (SQL). Alternatively, database 210 may be configured as a structured data store that includes data records formatted according to a markup language, such as a version of eXtensible Markup Language (XML). In other embodiments, database 210 may be implemented using one or more arbitrarily or minimally structured data files managed and accessible through any suitable type of application.

Database 210 may generally be configured to store any kind of data related to merchants 40, items 35, and/or requests for fulfillment services in various stages of processing. For example, database 210 may be configured to store identifying information about merchants 40, such as names and address of merchant personnel or departments, merchant billing and shipping address information, merchant banking or other financial information, or other identifying information. Database 210 may also be configured to store current and/or historical status information regarding inventory or sales transactions of merchants 40, such as a merchant's order history, payment history, the status of a merchant's inventory items 35 within fulfillment center 10, the status of any pending fulfillment services requests for a merchant, or other types of status information. In some embodiments, database 210 may also be configured to store identifier mapping information for items 35. For example, database 210 may store records that relate a given merchant 40's identifier for a particular item 35 (e.g., a merchant's stock keeping unit (SKU) identifier) with an identifier that may be specific to enterprise 5 or to fulfillment center 10. Such mapping information may be used, for example, to associate a merchant's fulfillment services request It is noted that database 210 need not be integrated within inventory management system 30, or even within fulfillment center 10. In some embodiments, merchant and/or inventory data may be stored in a number of different data stores distributed throughout enterprise 5. For example, merchant financial data may be stored in an accounting database associated with an accounting department of enterprise 5 that may be distinct from a fulfillment department such as fulfillment center 10. Similarly, in some embodiments interface 200 may be configured to interact with a variety of systems, applications or databases within or external to inventory management system 30 in addition to or instead of database 210.

Figure 3:
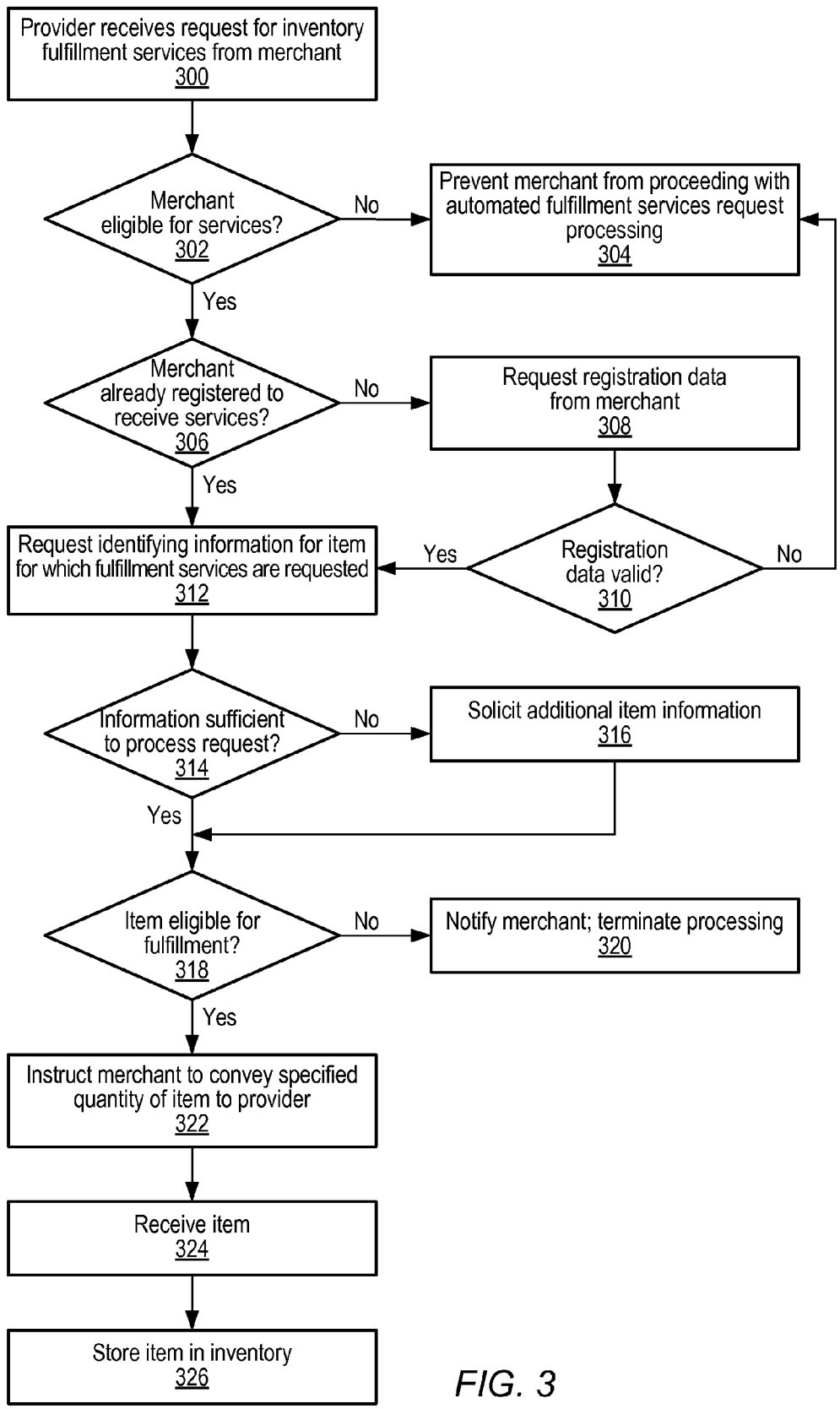
FIG. 3 is a flow diagram illustrating one embodiment of a method through which a fulfillment services provider may receive and process a request for inventory fulfillment services from a merchant.

One embodiment of a method through which a fulfillment services provider (or simply, provider) such as fulfillment center 10 may receive and process a request for inventory fulfillment services from a merchant 40 is illustrated in FIG. 3. It is contemplated that in various embodiments, the illustrated method or a suitable variant thereof may be implemented via computer-executed instructions stored on a computer-accessible medium, as described in greater detail below in conjunction with the description of FIG. 19, or via dedicated computing hardware devices that may be state-dependent (e.g., state machines) but which may not execute discrete instructions per se. It is further contemplated that in some embodiments, some or all of the illustrated method may be implemented by decision logic included within interface 200, while in other embodiments interface 200 may be configured to relay merchant state information (e.g., inputs or outputs of the fulfillment services registration process) to and from other executable components, systems or devices within inventory management system 30 or fulfillment center 10. In such other embodiments, some or all of the illustrated method may be implemented by components other than interface 200. It is noted that in various embodiments, a merchant may submit a single fulfillment services request applicable to multiple different items 35, or may submit respective requests for each of several items 35. Although examples discussed hereinafter may refer to processing of a single item 35, it is understood that the method may be applicable to the concurrent fulfillment services request processing of multiple different items 35.

In the illustrated embodiment, operation begins in block 300 where a request for inventory fulfillment services is received by a fulfillment services provider from a merchant 40. For example, such a request may be received via one embodiment of registration interface 200 as a result of a merchant 40 signing into a secure web page using a merchant identifier and an appropriate credential (e.g., a login name and password, or any other suitable type of credential), and subsequently selecting an option to request fulfillment services (e.g., a link, button, etc.) displayed via the secure web page. In other embodiments, such a request may be received via web services calls or via a mode of communication that does not employ web-based protocols.

Upon receiving a fulfillment services request from a merchant 40, the provider may determine whether the requesting merchant is eligible to receive fulfillment services (block 302). In some embodiments, merchant eligibility for fulfillment services may depend on the merchant's historical behavior. For example, the current status or history of the merchant's prior transactions with the provider or another enterprise may be examined to determine whether the merchant has engaged in fraudulent or questionable transactions with customers, vendors, the provider, or other parties. In some embodiments, a merchant's creditworthiness, customer service history, or any other data related to the merchant (or, in some cases, related to fiscally responsible entities or individuals associated with the merchant, such as guarantors, principals, executives, etc.) may be taken into account when considering a merchant's eligibility for fulfillment services, and such data may include data obtained from third parties such as credit reporting agencies, business references, customers and the like.

In various embodiments, the provider may implement decision models of varying complexity taking into account any of the foregoing types of merchant data or other types not specifically mentioned in order to render a decision as to whether the requesting merchant is eligible for fulfillment services. For example, in one embodiment any history of fraudulent behavior may disqualify a merchant, whereas in other embodiments a more sophisticated risk analysis model may consider such behavior in the context of other data points. It is contemplated that in some embodiments, eligibility for fulfillment services may depend on the type or volume of services requested. For example, a merchant 40 having little history or questionable history may be allowed access to fulfillment services on a trial or probationary basis, with such access restricted to certain types, quantities, or value of items 35, or restricted on some other basis.

If the requesting merchant 40 is determined to be ineligible for fulfillment services, the merchant may be prevented from proceeding with automated fulfillment services request processing (block 304). In some embodiments, the merchant may be directed to contact a fulfillment services agent (e.g., a customer service representative) for further information or assistance in processing the fulfillment services request, for example to receive an explanation of the reasons for disqualification and of actions that may be taken (if any) to remedy the situation.

If the requesting merchant 40 is determined to be eligible for fulfillment services, the provider may determine whether the merchant is already registered to receive fulfillment services (block 306). In one embodiment, determining a merchant's registration status may include determining whether the merchant has supplied data that the provider deems necessary to perform fulfillment services on behalf of the merchant. For example, registration may be contingent upon a merchant 40 agreeing (e.g., electronically or in writing) to a fulfillment services participation agreement that details obligations and expectations of the provider and the merchant relating to fulfillment services (such as the merchant's agreeing to abide by various financial, procedural, customer service or other policies). Registration may also be contingent upon a merchant 40 providing sufficient identifying information, as set forth below. In some embodiments, determining whether a merchant is registered may include determining whether the merchant has previously registered for fulfillment services, and if so, assuming that the merchant is registered without checking each data item required of the merchant for registration. Also, in some embodiments, if the previous registration or any previous fulfillment services activity on behalf of the merchant occurred more than a threshold period of time prior to the current fulfillment services request, the merchant may be required to provide some or all of the registration data once again. It is noted that in some embodiments, determination of a merchant's registration status may occur prior to determination of the merchant's eligibility for fulfillment services.

If the requesting merchant 40 is determined not to be registered, the provider may request registration data from the merchant 40 (block 308). For example, a fillable web form or other request for merchant input may be provided or displayed to the merchant 40 via interface 200. Requested input may include information such as the merchant's name, phone number, address, bank name, bank routing number and account number, taxpayer identification information, and/or any other suitable information. Additionally, if necessary or appropriate, a participation agreement may be conveyed to the merchant 40 via interface 200, along with a solicitation for the merchant to expressly accept or refuse the agreement. The merchant 40 may then enter or supply the requested data in a manner suitable to the mode in which the request was delivered, e.g., by filling out a web-based form.

The provider may then attempt to validate the registration data provided by the merchant 40 (block 310). For example, the provider may check to see that all required data has been provided, and may corroborate certain data items with third parties, e.g., by checking contact or banking information against a public address database or the specified bank, respectively. The provider may also check to see whether the merchant indicated acceptance of the participation agreement, if applicable. If any portion of the provided data fails to validate, the merchant may request that the merchant reenter the data, or may terminate automated fulfillment services request processing and request that the merchant contact an agent for further assistance (block 304).

If the provided data is valid or the merchant 40 is determined to have already registered, the provider may request identifying information associated with the item(s) 35 for which the merchant 40 is requesting fulfillment services (block 312). For example, interface 200 may display another web-based form through which the merchant may provide item-identifying information. In some embodiments, item-identifying information may be supplied along with the initial request for fulfillment services, and a separate request for this information may not be made by the provider. Also, in some embodiments, a merchant 40 may specify a quantity of the item 35 for which fulfillment services are requested in addition to item identifying information.

The provider may then determine whether it has sufficient information about the item 35, as identified by the requesting merchant 40, to process the fulfillment services request for that item (block 314). In one embodiment, the provider may make this determination by first determining whether the item 35 is known to the provider (e.g., whether the provider has some record of information associated with the item 35). For example, as noted previously, an item 35 may be identified by a merchant 40 in a different manner than by fulfillment center 10. In one embodiment, the merchant may provide the merchant's own unique identifier, such as a merchant-specified SKU identifier, as identifying information for an item 35. In response, the provider may determine whether there exists a mapping from the merchant's unique identifier to an identifier known to the provider, for example, by querying database 210 using the merchant's identifier to determine whether a corresponding record includes the provider's identifier. In another embodiment, when supplying identifying information for an item 35, the requesting merchant 40 may provide an identifier known to the provider instead of or in addition to a merchant-specified identifier.

If the provider has insufficient information to process the fulfillment services request for the identified item 35, the provider may solicit additional information from the merchant (block 316). For example, if the provider could not locate a record for item 35 on the basis of a merchant-specific identifier such as a merchant's SKU, the provider may solicit the requesting merchant 40 for a provider-specific identifier, or a generic identifier such as a Universal Product Code identifier, if available. In some embodiments, the provider may provide item search capabilities via interface 200 in order to allow a requesting merchant 40 to determine whether the item 35 for which fulfillment services have been requested is known to the provider. For example, the provider may provide a keyword search feature to allow the requesting merchant 40 to enter keywords relevant to an item 35. Alternatively, the provider may allow the requesting merchant 40 to navigate a hierarchy of item categories to ascertain whether the item 35 identified by the merchant 40 is included in the hierarchy, and in some embodiments, to determine the most similar item in the hierarchy if the item 35 is not included.

In some circumstances, the provider may have no information corresponding to an item 35 for which fulfillment services have been requested. For example, the provider may never have provided fulfillment services for the item 35 before, either for the requesting merchant 40 or any other merchant. In some embodiments, the provider may be configured to request the necessary information in this case. For example, the provider may request that the requesting merchant 40 provide information such as item dimensions, weight, item type or class information (e.g., according to a taxonomy or hierarchy defined by the provider), item special characteristics (e.g., whether the item is liquid, perishable, a hazardous material, requires special handling or storage conditions, etc.) or any other information deemed necessary by the provider to identify the item 35, to determine whether the item 35 is eligible for fulfillment services, and/or to facilitate the provision of fulfillment services.

Once the provider has sufficient information about the identified item 35, the provider may determine whether the item 35 is eligible for the requested fulfillment services (block 318). For example, in one embodiment, the provider may disallow fulfillment services for certain types of items 35, such as hazardous items. In another embodiment, a merchant 40 may be restricted from requesting fulfillment services for certain items 35 according to its participation agreement or fee structure, current business relationship with the provider, the current state of the merchant's other inventory with respect to the provider, or any other suitable criterion. For example, a merchant 40 may contract with a provider to receive fulfillment services for a certain quantity of an item 35 over a given period of time, such that fulfillment requests for additional quantities of that item 35 may be disallowed.

If the fulfillment services request cannot be processed owing to ineligibility of the item 35, the provider may notify the requesting merchant 40 via interface 200, and automated fulfillment services request processing may terminate (block 320). Otherwise, the provider may instruct the requesting merchant 40 to convey some specified quantity of item 35 to the provider, such as a quantity that may have been specified by the requesting merchant in or subsequent to the request for fulfillment services (block 322).

In one embodiment, in instructing the merchant to convey item 35, the provider may provide the requesting merchant 40 with data to be used by the merchant to identify individual units of item 35. For example, the provider may convey a document file to the merchant via interface 200, such as a Portable Document Format (PDF) file or another type of document file, which includes alphanumeric, bar code or other information indicative of identifying information that may be used to manage units of the item 35 within fulfillment center 10. In various embodiments, such identifying information may uniquely identify each individual unit of the item 35, may generically identify the units as being identical instances of the kind or type of item 35, or may combine information generic to the item 35 with information specific to a particular unit of the item 35. For example, the provided identifying information may include a serial number that is unique to a particular unit of an item 35, a UPC or similar product code that is generic to all units of an item 35, or a code that identifies the product type of item 35 as well as the condition of a particular unit (e.g., new, used, damaged, etc.). Any suitable type or combination of identifying information may be employed. The provided document may be used to generate labels to be respectively affixed to individual units of item 35. For example, the requesting merchant 40 may, upon receiving the document, print its contents on label stock and affix the labels to units of item 35 as appropriate.

The provider may also provide the requesting merchant 40 with data to be used by the merchant to convey item 35 to the provider. In one embodiment, the provider may convey a document file, such as a PDF document or other type of document file, to the merchant via interface 200 that includes data indicative of shipping information. For example, the document file may include address information, bar code data and/or other data that may be used to generate a shipping label. Such a shipping label may be a generic shipping label suitable for tendering a package to any type of carrier. Alternatively, the shipping label data may be tailored to a particular carrier, for example by including bar code, geographic code, or other routing or handling information specific to the particular carrier. In some embodiments, shipping information data may be included in the same document used to convey unit identifying information as described above, while in other embodiments shipping information data may be conveyed in a separate document. It is noted that in various embodiments, the provider may convey unit-identifying information, shipping information, both or neither to the requesting merchant 40.

In some embodiments, shipping-related data provided to the requesting merchant 40 may reflect the number of discrete shipments or packages expected from the requesting merchant 40. For example, the merchant may indicate that the specified quantity of item 35 for which fulfillment services have been requested may be divided among a certain number of packages. Alternatively, the provider may instruct the requesting merchant 40 to divide the specified quantity among shipments in a particular way. In some embodiments, the shipping data provided to the requesting merchant 40 in the case of multiple shipments or packages of a particular item 35 may uniquely identify each shipment or package, for example by including bar code or other information to be included on shipping labels generated from the shipping data. It is contemplated that in some embodiments, the provider may instruct the requesting merchant 40 to ship different quantities of item 35 to different fulfillment centers 10, and shipping data conveyed to the requesting merchant 40 may reflect this distribution. For example, the provider may specify the distribution according to available storage resources at various fulfillment centers 10. Alternatively, the provider or the requesting merchant 40 may wish to ensure a particular geographical distribution of item 35 among different fulfillment centers 10, for example to satisfy expected patterns of demand.

In many cases, upon receiving instructions to convey the specified quantity of item 35 to the provider, the requesting merchant 40 may appropriately package and ship item 35 to the provider according to the received instructions. For example, the requesting merchant 40 may print item labels and affix them to units of item 35, pack the units in one or more packages for shipment, print shipping labels and affix them to the package(s), and tender the package(s) to a shipper or carrier for shipment to the provider. However, the requesting merchant 40 need not be in actual possession of item 35. In some embodiments, the requesting merchant 40 may arrange with a third party, such as a manufacturer, distributor, vendor, or other type of supplier, to convey the specified quantity of item 35 to the provider. For example, the requesting merchant 40 may forward item identifying and/or shipping information to the third party, which may arrange to convey item 35 to the provider on behalf of the requesting merchant 40.

Subsequent to instructing the requesting merchant 40 to convey the specified quantity of item 35, the provider may receive item 35 (block 324) and store item 35 into inventory (block 326). For example, one or more packages including units of item 35 may arrive at fulfillment center 10. In various embodiments, the package(s) may be scanned, unpacked, inspected, and/or otherwise processed, and units of item 35 may be stored within storage facility 20. Inventory management system 30 may also be appropriately updated to reflect the status of received units of item 35, and in some embodiments the requesting merchant 40 may be notified that item 35 is available for fulfillment.

In some embodiments, the provider may receive a notification of shipment from the requesting merchant 40 before item 35 arrives. In some such embodiments, either the provider or the requesting merchant 40 may update an indication of availability of item 35 in response to such a notification. For example, the requesting merchant 40 may offer item 35 in commerce via an e-commerce channel maintained by enterprise 5, such as a web-based storefront or a marketplace. In response to a notification of shipment received from the requesting merchant 40, enterprise 5 may update an offering display or listing of item 35 to indicate an expected lead time or other indication of availability, taking into account factors such as expected time in transit from the requesting merchant 40 to the provider, processing time to receive and store item 35 at the provider, and/or other factors affecting availability of item 35.

It is noted that in some embodiments, a fulfillment services provider such as fulfillment center 10 may operate to allow a merchant 40 to request fulfillment services for an item 35, to conduct those actions necessary to validate the eligibility of the merchant and the item for the requested services, and to convey to the merchant the data necessary for the merchant to prepare item 35 for the requested services and convey item 35 to the provider. In particular, it is noted that fulfillment center 10 may perform these tasks in an entirely automated manner, such that if the requesting merchant 40 and the item 35 satisfy the provider's eligibility requirements, the fulfillment services request may be processed without human intervention. For example, by interacting with fulfillment center 10 via registration interface 200, a merchant 40 may complete a fulfillment services request for an item 35, ship item 35 to fulfillment center 10, and begin relaying customer orders for item 35 to fulfillment center 10 for fulfillment as detailed below, without depending on the actions of an agent of fulfillment center 10 external to registration interface 200. Such an automated fulfillment services request processing system may also be referred to as a "self-service" system, in that a merchant 40 may interact with the system entirely on its own initiative.

Figure 2B:
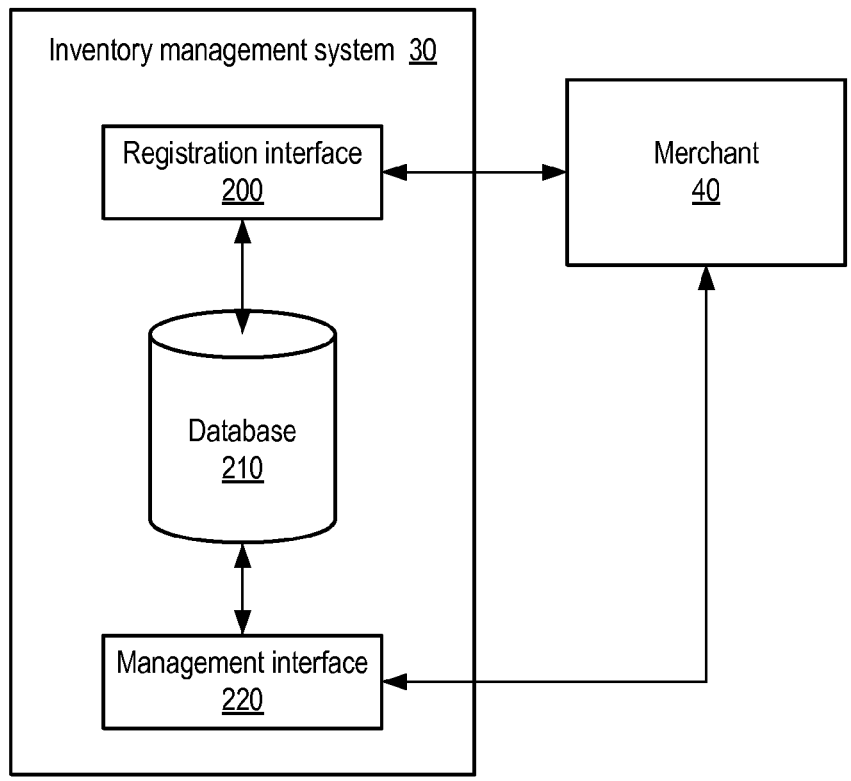
FIG. 2B is a block diagram illustrating one embodiment of a fulfillment services management interface.

In one embodiment, in addition to providing a self-service registration interface 200 through which merchants 40 may request inventory fulfillment services for various items 35, a fulfillment services provider may provide a management interface through which merchants 40 may manage various aspects of the fulfillment services applicable to their items 35. FIG. 2B illustrates an embodiment of inventory management system 30 similar to that of FIG. 2A, with the addition of a management interface 220 that may be configured to interact with database 210 as well as merchant 40.

Management interface 220 may be configured to present an interface through which a given merchant 40 may perform any of a variety of functions, described below, with respect to items 35 for which the given merchant may have previously requested fulfillment services (e.g., via registration interface 200). Like registration interface 200, in one embodiment management interface 220 may be configured to present to a merchant 40 one or more web pages accessible via the public Internet or a private intranet (e.g., a private network maintained by or on behalf of enterprise 5 requiring some level of authentication or secured connection for access). Such a web page may include fillable forms, menus, executable applications (e.g., applications coded in Java™, Javascript or another language suitable for web-based execution) or other web-based interface elements. In other embodiments, management interface 220 may be configured to present a non-web-based management interface or a web services-based management interface to merchants 40, in a manner similar to that described above with respect to registration interface 200.

In some embodiments, it is contemplated that both registration interface 200 and management interface 220 may be implemented as distinct or integrated portions of a web-based fulfillment services portal. For example, functionality associated with both registration interface 200 and management interface 220 may be implemented via respective web pages or groups of web pages presented to merchants 40 as aspects of a centralized fulfillment services website. Alternatively, such functionality may be presented through respective sets of web services calls presented to merchants 40 as a general web services API for registration for and management of fulfillment services.

As described above, in one embodiment, after a merchant 40 has registered an item 35 for fulfillment services, the item 35 may be placed under the physical custody and management of fulfillment center 10. In such an embodiment, the supply chain for items 35 may be extended to encompass items 35 in transit from the merchant 40 to fulfillment center 10 and from fulfillment center 10 to customers 50 in addition to the status of items 35 within fulfillment center 10. (In some cases, the general supply chain for an item 35 may also account for the reverse supply chain reflecting the flow of returned units from customers 50 and/or units removed from fulfillment center 10 and conveyed back to a merchant 40.) In some embodiments, management interface 220 may be configured to provide a given merchant 40 with visibility into the status of the general supply chain with respect to its registered items 35. For example, management interface 220 may provide an indication or display of the quantity of units of a given item 35 that are in transit between given merchant 40, fulfillment center 10 and/or customers 50 at any given time (e.g., including tracking information for units in transit, if available or applicable).

In one embodiment, management interface 220 may also provide an indication of the status of units of given item 35 held in inventory within fulfillment center 10, such as identifying units committed to orders but not yet picked or shipped, identifying units that are spoiled or damaged, or identifying any other relevant inventory status information. In some embodiments, management interface 220 may provide to a merchant 40 explanatory information regarding problems or exceptions that arise in the supply chain for an item 35. For example, if units of an item 35 were damaged upon arrival at fulfillment center 10 from merchant 40, or were otherwise in a state or condition different from that expected from or indicated by merchant 40 when fulfillment services were requested for the units (e.g., used rather than new condition), management interface 220 may be configured to display such information to merchant 40 and allow the merchant 40 to specify an action to resolve the problem. For example, management interface 220 may allow the merchant 40 to instruct that damaged items be disposed of or returned to the merchant 40, to allow the merchant 40 to arrange to convey additional units to fulfillment center 10 (e.g., to cover outstanding orders), or to take another suitable action. More generally, management interface 220 may allow merchant 40 to request, on its own initiative, that units of an item 35 be withdrawn from inventory (e.g., for return to merchant 40), repositioned among different fulfillment centers 10, or disposed of.

Generally speaking, management interface 220 may be configured to provide any type of function suitable for monitoring or altering the status of a given item 35 within the extended supply chain encompassing a merchant 40, fulfillment center 10 and customers 50. In some embodiments, the supply chain and management interface functionality may be extended to other third parties such as manufacturers, distributors, wholesalers, or other parties that may be involved in transactions pertaining to given item 35.

In other embodiments, management interface 220 may be configured to provide functions that may not be directly related to supply chain monitoring or management. In one embodiment, management interface 220 may be configured to provide an interface through which a merchant 40 may receive notice of customer service issues raised on behalf of customers 50 and to participate in their resolution. For example, inventory management system 30 may be configured to receive reports of customer service issues raised with respect to particular orders and to identify the merchant(s) 40 associated with those orders (or specific items 35 included in the orders). System 30 may then direct such customer service reports associated with a given merchant 40 to an inbox, forum or other repository accessible by the given merchant 40 via management interface 220. Alternatively, management interface 220 may forward such reports directly to the given merchant 40, for example via email. In response to a given report, the given merchant 40 may participate in resolving the issue via management interface 220, for example by arranging for an item 35 to be returned or replaced, arranging for a refund or credit to be issued to a customer 50, or indicating another suitable action.

Order Fulfillment Process

As mentioned previously, a fulfillment services provider such as fulfillment center 10 of enterprise 5 may perform fulfillment services for a variety of items 35 offered in commerce by a number of different merchants 40. A merchant 40 may request such services via a self-service registration interface, as described above with respect to FIG. 3.

Once a merchant 40 has arranged to receive fulfillment services for an item 35 from a provider, the provider may proceed to fulfill customer orders. In one embodiment, a customer may place an order for an item 35 directly with a merchant 40 via a channel through which the merchant 40 offers the item 35 in commerce (e.g., through e-commerce or other types of channels as described above). In one such embodiment, customer orders may be conveyed to fulfillment center 10 from a merchant 40 via inventory management system 30, either via interface 200 or via a different interface configured for order processing. In other embodiments, customer orders may be conveyed to fulfillment center 10 through a third party. For example, a merchant 40 may present its own order-entry interface to customers 50 and assume responsibility for conveying the order to fulfillment center 10 for fulfillment. Alternatively, a merchant 40 may arrange for enterprise 5 to host a commerce channel including an order-entry interface on behalf of the merchant, such that the merchant 40 may not be directly involved in receiving and processing the order, but may be fiscally and/or legally responsible for the order.

In some circumstances, a given customer 50 may place an order for two or more different items 35 offered in commerce by different respective merchants 40. For example, the given customer 50 may place separate orders with each one of the merchants 40, ordering a first item 35 or group of items 35 from a first merchant 40, a second item 35 or group of items 35 from a second merchant 40, and so on, in any suitable combination. Alternatively, the given customer 50 may place one or more orders via an e-commerce channel that allows the given customer 50 to concurrently view the offerings of more than one merchant 40. For example, the given customer 50 may use a virtual "shopping cart" into which items 35 offered by different merchants 40 can be placed for order processing. Such a shopping cart may allow the given customer's item selections for a particular order to persist across different e-commerce channels. For example, the contents of a customer's shopping cart may persist as the customer browses from one merchant's web site or listing page to a channel associated with another merchant 40. In some embodiments, a virtual shopping cart may simplify the customer's ordering experience, for example by allowing a customer 50 to submit one payment transaction for all items 35 in the cart rather than submitting separate payment transactions for each merchant 40 associated with those items. A virtual shopping cart may also facilitate identification of opportunities to consolidate items 35 ordered from multiple different merchants 40 by a given customer 50, as described in greater detail below.

In a conventional model of order fulfillment, items 35 ordered from different merchants 40 would be fulfilled separately, which may increase overall costs of fulfillment. For example, packaging and shipping a group of items 35 separately may cost more than packaging and shipping those items together. However, in some embodiments, a fulfillment services provider such as fulfillment center 10 may be configured to consolidate items 35 ordered by a single customer 50 from multiple merchants 40 such that at least some items 35 ordered from different merchants 40 are packaged and shipped as a single shipment, while each merchant 40 remains the merchant of record for its respective item 35. In shipping certain items 35 together, costs of fulfillment may be reduced and the resulting savings passed along to the customer 50 or retained as profit by merchants 40 and/or enterprise 5. At the same time, each merchant 40 may remain the merchant of record for items 35 it offers in commerce, retaining the fiscal, legal and/or other obligations and benefits associated therewith. That is, although the fulfillment services provider may have physical custody of items 35 for which it provides fulfillment services on behalf of merchants 40, the provider may simply function as an intermediary, rather than a principal, in transactions between merchants 40 and customers 50. In various embodiments, the role of the provider in fulfilling an order may or may not be visible to a customer 50.

Figure 4:
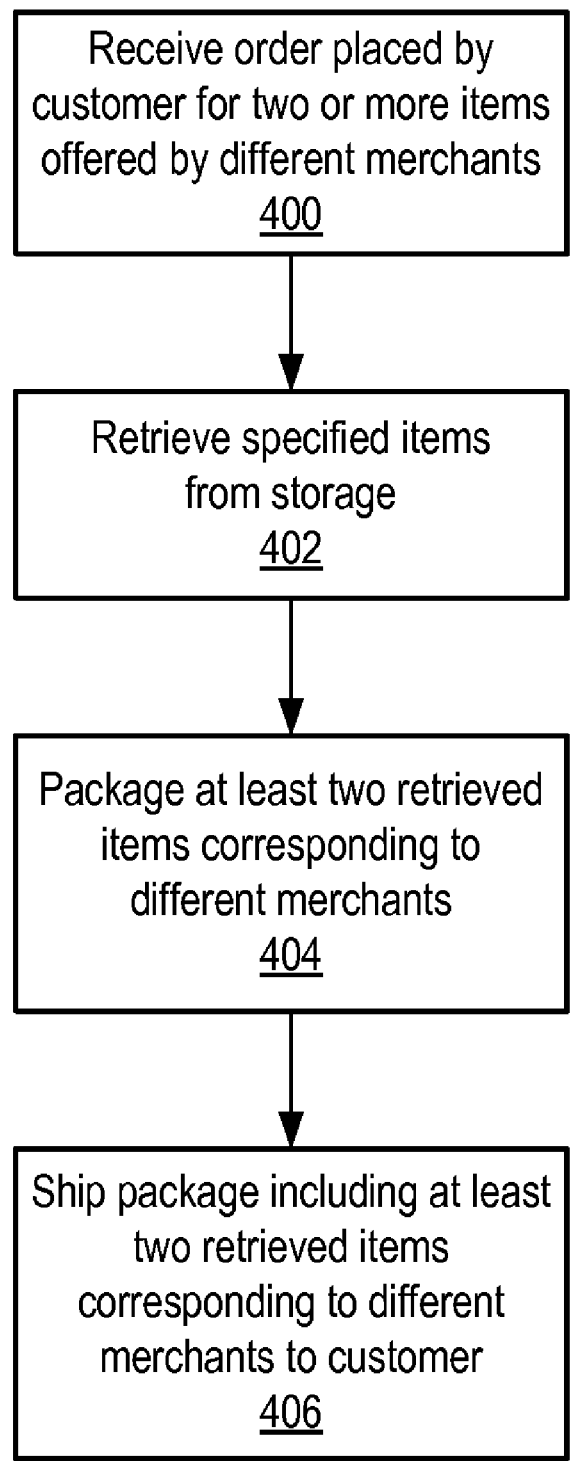
FIG. 4 is a flow diagram illustrating one embodiment of a method of fulfilling orders for items on behalf of a number of merchants.

One embodiment of a method of fulfilling orders for items 35 on behalf of a number of different merchants 40 is illustrated in FIG. 4. Referring collectively to FIGS. 1-4, operation begins in block 400 where a fulfillment services provider such as fulfillment center 10 receives one or more orders placed by a customer 50 for at least two different items 35 offered in commerce by different respective merchants 40. In some embodiments, one or more of the merchants 40 may have requested fulfillment services for its corresponding ordered item 35 via a self-services fulfillment services interface, such as interface 200, as described above with respect to FIG. 3. As described previously, the order(s) may be received from merchants 40, directly from the customer 50, or via a third party. In embodiments where a virtual shopping cart is employed, the relationship among the different items 35, the different merchants 40 and the ordering customer 50 may be explicit or implicit in the data records generated as a result of processing the virtual shopping cart contents. For example, the virtual shopping cart may assign a common order identifier to each item 35 that forms a component of the customer's order, which may facilitate the provider's combining of items 35 into shipments as described below.

In some embodiments, if multiple distinct orders are received from a single customer 50, either from the same or different merchants 40, the orders may be linked by the provider, for example on the basis of a common customer identifier or a common order identifier that may be coordinated among merchants 40 and the provider. Once identified as linked or related, the multiple orders may be processed as a single order for the fulfillment processes described below, to the extent possible. In some such embodiments, the provider may only link orders that are placed or received within a given interval of time, such as orders placed within one hour, one day, etc. The interval may depend on the mode of delivery specified by the customer. For example, if a customer 50 requests expedited shipping for a given order, the interval of time for linking the given order to other orders may be relatively short to prevent delay in shipping the given order.

Subsequent to receiving the order(s), the specified items 35 may be retrieved from storage (block 402). For example, in one embodiment, customer orders may be processed by inventory management system 30 to generate instructions for a human or mechanical picker to select the specified items 35 from within inventory storage facility 20. It is contemplated that in some embodiments, the specified items 35 may be retrieved along with other items 35 destined for unrelated orders. For example, system 30 may divide a number of orders up among multiple pickers in order to optimize picker efficiency, particularly in instances where the items 35 specified in a given order are widely distributed throughout fulfillment center 10.

At least two of the retrieved items 35 corresponding to two different merchants 40 may then be packaged (block 404). For example, the retrieved items 35 may be delivered to a packaging area within fulfillment center 10 to be appropriately packaged for shipment, which may include selection of appropriate boxes or other enclosures, insertion of protective packing materials, and/or inclusion of a packing slip, invoice, manifest, promotional materials or other materials. In some embodiments, if all items 35 corresponding to the customer's order(s) are present in the fulfillment center 10, they may be packaged as a single package for shipment, or divided among multiple packages if cost, item characteristics or shipper requirements dictate. In some cases, fulfillment of ordered items 35 may be distributed across different fulfillment centers 10, for example depending on item availability.

Subsequently, a package including at least two items 35 corresponding to two different merchants 40 may be shipped to the customer 50 (block 406). For example, the package or packages may be tendered to a common carrier for shipping.

One embodiment of a packing slip that may be included in a package fulfilled according to the method of FIG. 4 is shown in FIG. 5. In the illustrated embodiment, packing slip 500 indicates that four items 35 are included within a shipment to the identified customer. Items A and B are indicated as having been offered by Merchant A. Item C is indicated as having been offered by Merchant B. Item D is indicated as having been offered by Merchant C. Thus, Merchants A-C are indicated as the merchants of record for their corresponding items A-D, yet the identified customer may receive items A-D as a single shipment. Other situations involving different numbers of items and merchants are possible and contemplated. It is noted that various embodiments, packing slip 500 may correspond to a customer invoice, billing document, bill of lading, or other document formatted to summarize order information.

It is further noted that in some embodiments, packing slip 500 may include multiple pages or components formatted in a variety of ways. For example, items 35 corresponding to different merchants of record may be indicated on different pages or sections of packing slip 500. In some cases, packing slip 500 may also include information or data in addition to information identifying merchants of record. For example, such information may include terms and conditions that may apply to a given item 35 or a transaction involving given item 35 with respect to the merchant of record, warranty information, customer service information (e.g., contact information for complaints, returns, exchanges, etc.), marketing or promotional information (e.g., offers of future discounts, coupons, etc.), or other types of information. In some embodiments, the information included by packing slip 500 may be customized or formatted to suit requirements or customs pertinent to the location of a customer. For example, different documentation requirements may apply to transactions involving customers located in different legal jurisdictions (e.g., states, countries, etc.). Packing slip 500 may be appropriately formatted to take such requirements or other factors into account.

Consolidation of items 35 ordered from multiple merchants into fewer shipments may result in lower fulfillment costs, as noted above. For example, by virtue of volume, fulfillment center 10 may have preferential access to discounted shipping rates relative to those available to individual merchants 40. Thus, by allowing its items 35 to be combined for shipment with items 35 from another merchant 40, a given merchant 40 may enjoy lower costs of shipping and packaging. Moreover, customer goodwill may be increased through more a timely and/or convenient shopping experience. For example, a customer's order may be completed more quickly through fulfillment from fulfillment center 10 than if each merchant 40 involved in the order fulfilled its portion separately. Moreover, in addition to the possibility of reduced shipping costs to the customer 50, fewer shipments may reduce customer inconvenience in taking delivery of items 35, for example if the customer or the customer's agent must be present at the time of delivery.

It is noted that while order consolidation as described above may be sufficient to reduce fulfillment costs, such consolidation may not be necessary to do so. In some circumstances, the cost of fulfilling a single item 35 through fulfillment center 10 may be lower than if a merchant 40 were to perform its own fulfillment. For example, fulfillment center 10 may benefit from greater economies of scale, better infrastructure for inventory and supply chain management, or other advantages that result in reduced fulfillment costs relative to a merchant 40 performing its own fulfillment on a smaller scale.

In some instances, a merchant's registration of a given item 35 for fulfillment services via registration interface 200 may render that item 35 eligible for various services or promotional opportunities available to items 35 fulfilled by fulfillment center 10, such as a reduced-cost or expedited shipping promotion in which the customer may receive free standard shipping, free expedited shipping, reduced-cost standard or expedited shipping, etc. Other promotional opportunities may include discounts against a current order, credits against future orders, loyalty program points, discounts or credits with partner merchants, or other types of promotions. Such eligibility may apply even to instances in which a customer 50 orders a single unit of the given item 35 without combining the given item 35 with other items 35 in the order. For example, in one embodiment the eligibility for a promotional shipping arrangement or other promotional opportunity of items 35 fulfilled by fulfillment center 10 may depend on the total price of a customer's order. In such an embodiment, if the given item 35 has a price sufficient to meet the eligibility criterion, the customer 50 may receive promotional consideration upon ordering a single unit of the given item 35, alone or in combination with other items 35 fulfilled by fulfillment center 10.

In some embodiments, the cost savings resulting from a merchant's self-service registration for fulfillment services as described above and/or the cost savings resulting from efficiencies of fulfillment center 10 may be used to fund promotional opportunities offered to customers, such as opportunities to receive reduced-cost or expedited shipping, item discounts, or other types of promotions. In other cases, such cost savings may be offered to merchants 40 as a discount or credit against charges for fulfillment services, as profit sharing or cooperative marketing funding, or in another suitable fashion. Such savings may also be retained by enterprise 5 or distributed among enterprise 5, merchants 40 and/or customers 50 in any combination of the foregoing ways.

As described previously, various aspects of the methods and techniques described above (e.g., various aspects of registration interface 200 and/or management interface 220) may be presented to merchants 40 or customers 50 through the use of web pages. Generally speaking, a web page may include data content as well as metadata content that may be configured to control the presentation of the data content. For example, a web page may include text, still images, video content, navigable links, or other types of data content, as well as metadata or instructions that may control the placement, appearance, interactive behavior, or other presentation aspects of the data content.

Often, the data and metadata contents of a web page may be coded in a language, such as a version of Hypertext Markup Language (HTML) or any other suitable language for web-based content implementation. Web page contents may be conveyed from a content source, such as a web host implemented by or on behalf of fulfillment center 10 or enterprise 5, to a client, such as a merchant 40 or a customer 50, over a network (e.g., the Internet or a private network) using a suitable transport protocol such as a version of Hypertext Transport Protocol (HTTP), for example. The contents may then be interpreted or processed, as indicated by the coding language and metadata content, by a suitable client application such as a web browser. Some exemplary types of web browsers include, but are not limited to, Microsoft Internet Explorer™, Mozilla Firefox, and Opera™. In addition to presenting the web page to a client, the web browser may also collect and process input data from the client. For example, the browser may detect the selection or activation of navigable links, menu items, buttons, or other types of input devices that may be presented to a client, and may operate in response to such selection or activation by conveying data back to the content source or another entity or system, navigating to a different content source, or performing another suitable action.

Figure 6:
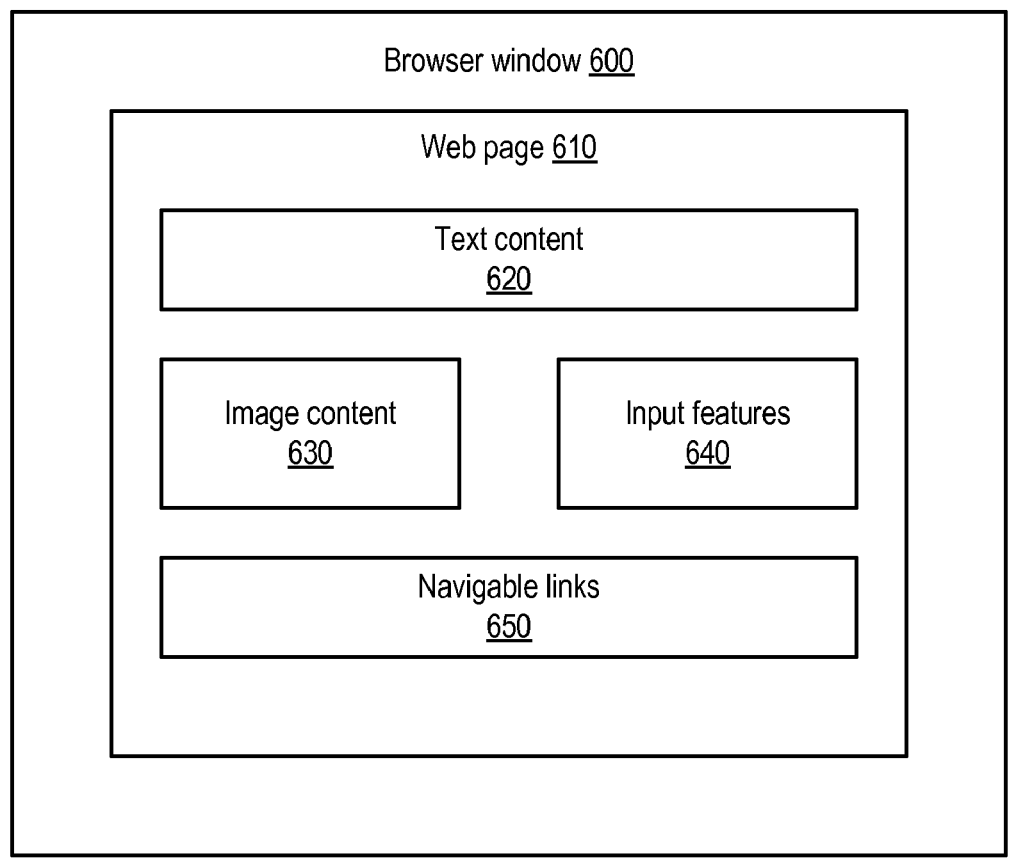
FIG. 6 illustrates one embodiment of a web page.

One embodiment of a generic web page is illustrated in FIG. 6. In the illustrated embodiment, a browser window 600 is shown to include web page 610. Among the various types of content included in web page 610 are text content 620, image content 630, input features 640 and navigable links 650, although in other embodiments web page 610 may include more or fewer types of content in various combinations, including types not specifically enumerated above. Although the various content types are illustrated as segregated features, they may be interspersed or combined in any suitable fashion according to the capabilities of the browser and language used to implement web page 610. In one embodiment, browser window 600 may be generated and managed by a web browser such as those mentioned above.

In one embodiment, the content and placement of various content features of web page 610 may be generated, for example by or on behalf of interface 200, to implement a web page through which a merchant 40 may invoke the self-service fulfillment services registration process described above with respect to FIG. 3. For example, text content 620, image content 630 and input features 640 may be configured to present a fulfillment service provider's request for input data to a merchant 40 and to provide a technique for allowing merchant 40 to enter and convey such data in response, such as through presenting a form with fields in which data may be inserted by the merchant 40.

In another embodiment, web page 610 may be configured to implement an e-commerce channel suitable for presenting offers in commerce of items 35 to customers 50, as well as other data potentially of interest to customers 50. For example, a merchant 40 may operate its own e-commerce hosting facilities, generating its own content and conveying it to customers 50 via web pages 610. Alternatively, a merchant 40 may arrange with another party, such as enterprise 5, to present such web pages 610 on its behalf. In another embodiment, enterprise 5 or another party may implement an e-commerce marketplace such as described above via one or more web pages 610. For example, a number of offers from various merchants 40 for a particular item 35, or for multiple items 35, may be displayed to a customer 50 via web page 610.

Inventory Fulfillment Services for Customers

The above describes embodiments of a computer-implemented system and method whereby a fulfillment services provider may perform inventory fulfillment services for a variety of items offered in commerce by a number of different merchants. A merchant may request such services via a self-service registration interface, as described above with respect to FIGS. 2A and 2B and FIG. 3. Generally, the above-described embodiments are applicable to merchants that have quantities of like items that they wish to sell via the fulfillment services provider and the provided inventory. However, individuals, small merchants such as resale shops, or other entities may have single units of items or small quantities of possibly heterogeneous items, possibly but not necessarily used items, which they wish to sell via the inventory fulfillment services provided by a fulfillment services provider.

The following describes embodiments of a method and apparatus whereby inventory fulfillment services may be provided by a fulfillment services provider to customers who may be individuals or merchants, and who have single units of items or small quantities of possibly heterogeneous items, that they wish to sell via the inventory fulfillment services of the fulfillment services provider. In embodiments, the general process for listing items for sale via a self-service fulfillment services registration interface provided by an inventory management system of the fulfillment services provider may be simplified or streamlined, and additional services may be provided to the customer via the self-service registration interface that may reduce the effort required of the customer to take advantage of the inventory fulfillment services offered by the fulfillment services provider. In one embodiment, a fulfillment services provider, via a fulfillment services registration interface to an inventory management system, may automatically generate shipping information for one or more items specified by a listing customer. The shipping information may include a shipping list, or packing slip, that lists one or more possibly heterogeneous items specified by the listing customer to be sent to the fulfillment services provider, carried in inventory of the fulfillment services provider, offered for sale, and sold to purchasing customer(s) on behalf of the listing customer. The shipping information may also include one or more package labels that specify at least the ship from and ship to addresses for the shipment.

In one embodiment, the listing customer is the seller of record for all items listed with the fulfillment services provider. Thus, for tax or other purposes, the fulfillment services provider is not the seller of record. In one embodiment, any fees or charges to the listing customer may be backloaded. In other words, the listing customer may not be charged for any fees related to a particular item until the item is sold. In one embodiment, any inventory fulfillment services fees related to a particular item may be assessed to the listing customer by deducting the fees from the sale price of the item when (and if) sold. Thus, the listing customer's profit for sale of a particular item may be the sale price minus any inventory fulfillment services fees for that particular item. Thus, the listing customer may not pay any fees for listing items with the fulfillment services provider until the listed items are sold. In one embodiment, after a specified period, unsold items may be disposed of via one or more methods, and the fulfillment services provider may assess appropriate fees for the disposal of unsold items. Alternatively, the fulfillment services provider may begin assessing appropriate inventory fulfillment services fees, for example inventory storage fees, to the listing customer for unsold items after the specified period.

In one embodiment, a listing period may be specified, for example 90 days, for which items listed by a listing customer with the fulfillment services provider will be carried. If an item does not sell within the listing period, one of one or more disposal methods may be used to dispose of the item. In one embodiment, if an item does not sell within the listing period, one or more options for disposal of the item may be provided to the listing customer, for example via email notification prior to or after the item's listing period expires. In one embodiment, the listing customer may be allowed to select from two or more disposal options. In one embodiment, the item may be returned to the listing customer. In one embodiment, the fulfillment services provider may assess one or more fees to the listing customer for returned items. In one embodiment, for any item that has not sold by the end of the listing period, the fulfillment services provider may continue to carry the item, but may begin charging stocking and possibly other applicable inventory fulfillment services fees to the listing customer. In one embodiment, the fulfillment services provider may reduce the sale price of an item that has not sold within the listing period. In one embodiment, the fulfillment services provider may, after the listing period for an item expires without the item being sold, reduce the sale price of the item by some amount (e.g., 10%), and then reduce the price again after a period (e.g., two days, or a week) if the item does not sell at that price, and may continue periodically or aperiodically reducing the price until the item sells or, if the item does not sell, otherwise disposing of the item. In one embodiment, for any item that has not sold by the end of the listing period, the fulfillment services provider may liquidate the item, for example by selling the item to a wholesaler or some other entity at a wholesale price, or alternatively by purchasing the item from the listing customer at a liquidation price that is lower than the listing customer's sale price. In one embodiment, item that has not sold by the end of the listing period may be donated to a charity or other not-for-profit organization. Other disposal methods are possible. In one embodiment, an item that has not sold during the listing period may be recycled or otherwise disposed of. If an item does not sell within the specified period, the listing customer may be charged an appropriate amount to cover whatever disposal method is used for the item.

The term listing customer may be used herein to describe a customer of the fulfillment services provider that uses embodiments to list items for sale via the fulfillment services provider. A listing customer may, for example, be an individual person with a collection of one or more heterogeneous used items at home that they wish to sell, or a small merchant that wish to sell units or small quantities of items but do not require all of the functionality described above, or in general any entity with a collection of one or more possibly heterogeneous items that the entity desires to sell via the fulfillment services provider. The term purchasing customer may be used herein to describe a customer of the fulfillment services provider that purchases items, possibly including items listed by a listing customer, from the fulfillment services provider.

A listing customer may have a collection of one or more items to be sold. The listing customer may generate a list of the items via the fulfillment services registration interface. Shipping information may be generated and provided to the listing customer, and the collection of items may be shipped as one shipment to and listed for sale by the fulfillment services provider. Two or more of the items in a listing customer's collection of items may be units of the same item, for example two or more copies of a book or a CD. A listing customer's collection of items may include two or more heterogeneous items. Heterogeneous, as used herein in relation to two or more items that may be listed by a listing customer, includes the notion of two or more different items in a category of item (e.g., two different books, three different CDs, etc.) and the notion of two or more items in different categories (e.g., books, CDs, DVDs, personal electronic devices, video games, appliances, etc.). Heterogeneous items may also include two or more similar but not identical items (e.g., two copies of a book with different covers, an earlier and later edition of the same book, two different versions of a CD, two electronic devices from different generations of the device, etc.) or even two or more units of the same item in different conditions (e.g., a used book in poor condition and a copy of the same version of the book in like-new condition, several copies of a CD in varying conditions, etc.)

In one embodiment, the fulfillment services provider may determine whether a listing customer's request to receive inventory fulfillment services for one or more items satisfies one or more listing rules of the fulfillment services provider. In one embodiment, to determine that the listing customer's request satisfies a particular one of the one or more listing rules with respect to a given item, the fulfillment services provider may determine that a sales price specified by the customer for the given item is within a suggested price range, which may, for example, be determined from an evaluation of historical sales data. In one embodiment, to determine that the listing customer's request satisfies a particular one of the one or more listing rules with respect to a given item, the fulfillment services provider may estimate the listing customer's expected profit for the given item if the given item sells. In one embodiment, the expected profit may be determined as the customer-specified sale price for the item minus any expected inventory fulfillment services transaction costs or fees for the given item. In one embodiment, the fulfillment services provider may reject a request to receive inventory fulfillment services for the given item if the determined profit for the given item if sold is less than a specified threshold. The specified threshold may be, but is not necessarily, zero. In one embodiment, the listing customer may be provided with the opportunity to adjust the sale price of the item upwards, if desired, or to list a given item even though the expected profit is zero or negative, if desired.

In other embodiments, to determine that the listing customer's request satisfies a particular one of the one or more listing rules with respect to a given item, the fulfillment services provider may filter the given items according to one or more other listing rules. For example, the fulfillment services provider may choose not to accept out-of-date items, items with poor sales history, and/or certain categories or types of items, certain titles of various media products. In general, the listing rules may be used to filter items that the fulfillment services provider will not accept according to any set of criteria that the fulfillment services provider requires or desires.

Figure 7:
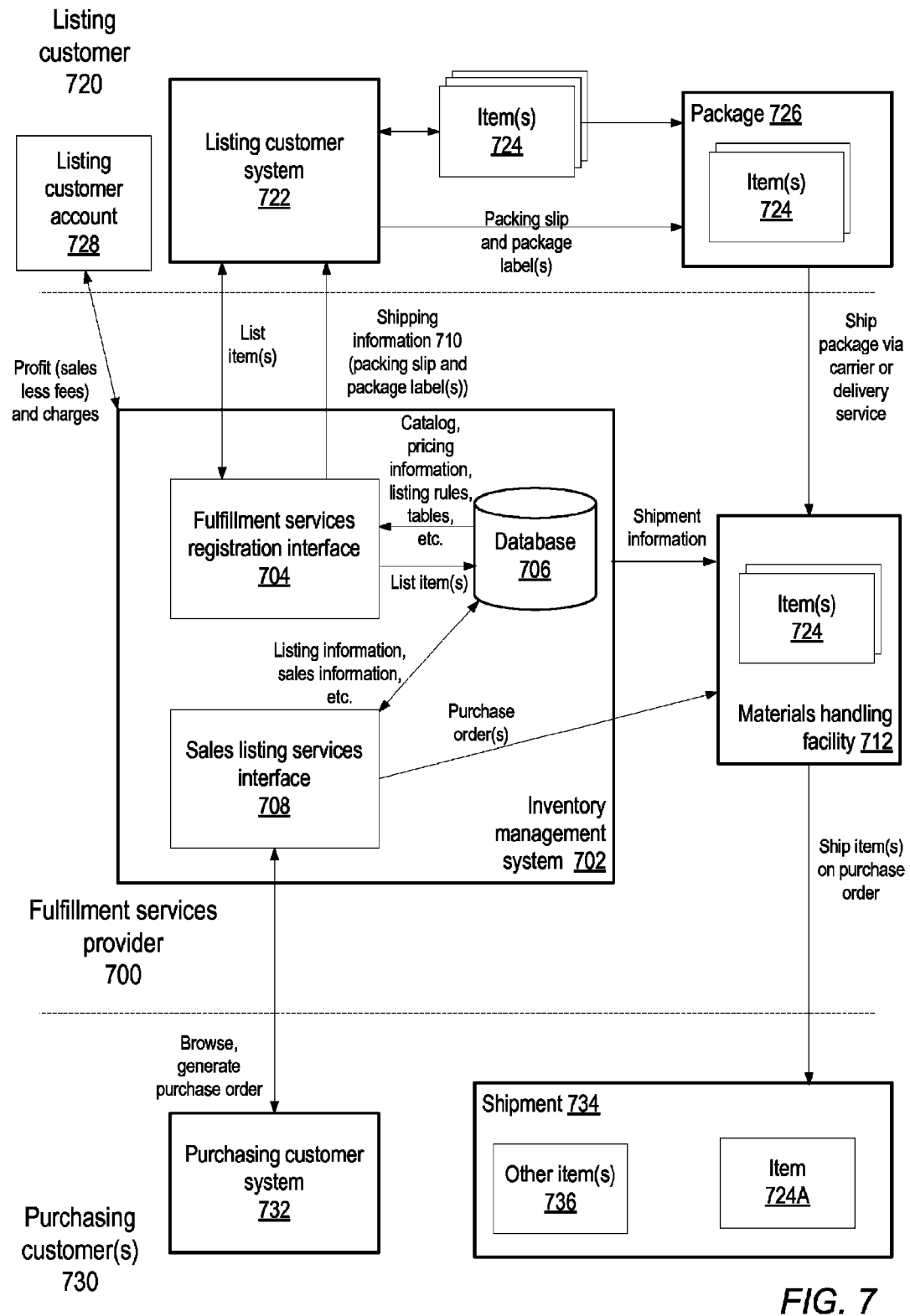
FIG. 7 illustrates a fulfillment services provider and inventory management system that provides, via a fulfillment services registration interface, inventory fulfillment services to customers who have single units of items or small quantities of possibly heterogeneous items that they wish to list with the fulfillment services provider, according to one embodiment.

FIG. 7 illustrates a fulfillment services provider and inventory management system that provides, via a fulfillment services registration interface, inventory fulfillment services to customers who have single units of items or small quantities of possibly heterogeneous items that they wish to list with the fulfillment services provider, according to one embodiment. In one embodiment, a listing customer 720 may access a fulfillment services registration interface 704 to inventory management system 702, for example using a web browser on listing customer system 722. The listing customer 720 may be required to register for an account with the fulfillment services provider 700 before accessing the fulfillment services registration interface 704, and thus may have a unique customer account identifier and password provided to the listing customer 720 upon registration with the fulfillment services provider 700.

The listing customer may, via the fulfillment services registration interface 704, provide an item description (e.g., an ISBN of a book, a UPC, or some other identifier, a title or keyword, etc.) for each of one or more items 724. In one embodiment, a search function may be provided, via the fulfillment services registration interface 704, that enables the listing customer 720 to search for items 724 in particular categories according to keyword or identifier and that allows the listing customer 720 to select, from a list of one or more items found via the search in a catalog of the fulfillment services provider 700, a particular item description that best matches an item 724 that the listing customer 720 wishes to list for sale. A catalog of item descriptions may be maintained by the inventory management system 702 in database 706. Note that database 706 may include, but is not limited to, one or more databases, data stores, collections of files of various types, one or more catalogs of item descriptions, pricing information, listing or other rules, tables and lists, web pages and associated web page data, information, and graphics, textual and/or graphical files for display via various interfaces, historical information such as historical sales information, or any other data and information that may be maintained and used by inventory management system 702. In other words, database 706 may include and therefore is representative of any and all data and information that may be used by inventory management system 702 as described herein.

In one embodiment, in response to the listing customer 720 providing or selecting an item description for a particular item 724, the inventory management system 702, via the fulfillment services registration interface 704, may provide a recommended price or price range at or within which the particular item 724 may likely be sold within a reasonable period (which may or may not be as long as the listing period, e.g. 90 days) in accordance with historical sales information for the particular item 724 and/or for similar items to the particular item 724 gathered and maintained by the fulfillment services provider 700. In one embodiment, the listing customer 720 may, via the fulfillment services registration interface 704, specify a price at which the customer 720 is willing to sell the item 724, and may receive guidance via the fulfillment services registration interface 704 regarding the likelihood of sale of the item 724 at a particular sale price, which may be determined from the historical sales information maintained by the fulfillment services provider 700. Once the listing customer 720 has provided or selected a sale price for a particular item 724, in one embodiment, the inventory management system 702, via the fulfillment services registration interface 704, may provide to the listing customer 720 an expected profit if that particular item 724 sells at that price. The expected profit is the sale price minus any charges or fees assessed to the listing customer 720 by the fulfillment services provider 700 for providing the listing and inventory fulfillment services as described herein.

In various embodiments, one or more fees or charges, or combinations thereof, may be assessed to the listing customer 720 by the fulfillment services provider 700 for providing the listing and inventory fulfillment services as described herein. As noted, these fees and charges may be backloaded, and thus not charged directly to the listing customer 720, being assessed when item(s) 724 listed by the customer 720 are sold, or after the listing period (e.g., 90 days) for the item(s) 724 expires. For example, the fulfillment services provider 700 may charge one or more fees for selling an item 724 listed via the fulfillment services registration interface 704. As an example, for a media item (e.g., a book, CD, DVD, tape, computer or video game, etc.), the fulfillment services provider 700 may charge a commission on the price of an item. For example, the fulfillment services provider 700 may charge a listing customer 10% of the gross selling price a book as commission for selling the book. Different percentages may be charged as commission for different types, categories, and/or price ranges of items 724.

In one embodiment, the fulfillment services provider 700 may charge a flat fee for at least some categories of items, for example for media items, which allows the fulfillment services provider 700 to at least collect some reasonable amount for items 724 in spite of the possibly low sale price of the items. Listing customers 720 may price items very low, but via the flat fee the fulfillment services provider 700 will still receive a set amount for each sale. In one embodiment, the fulfillment services provider 700 may assess a transaction fee for each item, for example $0.99 for each sold item. In one embodiment, the fulfillment services provider 700 may assess order fulfillment fees. For example, for something that sells under $25.00 and weighs less than a pound, the listing customer 720 may be charged approximately $0.90.

The handling of charges that may be assessed for shipping packages 726 containing items 724 from listing customer 720 to the fulfillment services provider 700 are described below.

A listing customer 720 may thus lose money for sales of items that are priced below a certain point, as one or more of the above fees may be deducted from the sale price at the time of sale, and thus the sale price needs to be at least high enough to cover all applicable fees for the customer 720 to break even, and higher still for the customer 720 to realize a profit. Thus, one embodiment may provide one or more filters that may alert the customer 720 on items 724 for which the customer 720 may or will lose money at the specified sale price. In one embodiment, the fulfillment services provider 700 may refuse to accept any items 724 that the listing customer 720 attempts to list at such a low price that the customer 720 will lose money or break even at best. In one embodiment, the fulfillment services provider 700 may specify a profit threshold below which either the customer will be alerted or the fulfillment services provider 700 will refuse to accept the listing of the item 724. The profit threshold may be, but is not necessarily, set to $0.00. The fulfillment services provider 700 may, for example, choose to set the threshold higher than $0.00.

The listing customer 720 may, based on the pricing information provided via the fulfillment services registration interface 704 select whether they want to ship the item 724 to the fulfillment services provider 700 and list the item 724 for sale via a sales listing service, for example via a sales listing services interface 708 to the inventory management system 702 provided by the fulfillment services provider 700, or via another entity (e.g., an electronic commerce channel) whereby purchasing customers may browse for and select various items carried in inventory by the fulfillment services provider 700 for purchase. For example, if the expected profit is low or negative, the listing customer 720 may decide not to list the item, or alternatively may choose to raise the price. In one embodiment, the inventory management system 702 may be configured to refuse to accept a listing of an item 724 from a listing customer 720 if the expected profit for sale of the item 724 is below a specified threshold. For example, the threshold may be, but is not necessarily, specified as zero, indicating that the customer would make no money from sale of the item.

In one embodiment, the inventory management system 702 may include listing rules, data, and logic that may be used to filter the items 724 for which an item description is provided by a listing customer 720 so that particular items 724 that the fulfillment services provider 700 specifies are not to be accepted from listing customers 720 may be rejected. For example, the fulfillment services provider 700 may not wish to carry books or other items that rarely sell, out-of-date items such as older versions of textbooks, and/or older-generation personal electronic devices that are unlikely to sell, and so on. Other reasons for rejecting particular items may be specified by the fulfillment services provider 700. For example, fulfillment services provider 700 may reject any items not listed in its catalog. In one embodiment, the inventory management system 702 may include one or more editable lists or tables in which the fulfillment services provider 700 may add or remove identifiers, titles, descriptions, and so on of items that the fulfillment services provider 700 will not accept. The listing rules and logic may be applied to these lists or tables and thus may be used to reject the listing of particular items specified in the lists or tables. If a customer enters a title, identifier, etc. for an item that the listing rules and logic determine the fulfillment services provider 700 will not accept, the listing customer 720 may be informed, via the fulfillment services registration interface 704, that the item will not be accepted. As another example, fulfillment services provider 700 may, via listing rules, reject or refuse to accept listings for items that are or are suspected to be pirated or otherwise illegal our unauthorized copies of items, for example pirated CDs or DVDs. As another example, fulfillment services provider 700 may, via the listing rules, refuse to accept at least some items not in their original carton or container, for example CDs or DVDs not in the original jewel case or container. As another example, some states or other municipalities may have or may enact laws or statutes, for example intrastate or interstate transport and sale restrictions, that control or restrict the sale of certain items, and the fulfillment services provider 700 may thus include listing rules to conform to legal restrictions.

In one embodiment, the inventory management system 702 of fulfillment services provider 700 may, via the fulfillment services registration interface 704, provide a method and interface for a listing customer 720 to add to the catalog of the fulfillment services provider 700 one or more item descriptions for items that are not currently listed in the catalog. Using this method and interface, the fulfillment services provider 700 may accept listings for items that the fulfillment services provider 700 does not typically carry, and/or listings for items that are not in the catalog. This method and interface may allow a listing customer 720 to create "custom" items, for example batches or sets of two or more items that the listing customer 720 preferably wants to sell together as one item 724.

The above process may be completed by the listing customer 720 for any number of items 724 via the fulfillment services registration interface 704. Once all the items 724 have been processed, the listing customer 720 may complete the listing via the fulfillment services registration interface 704. The inventory management system 702 may then automatically generate shipping information 710 for the listing customer 720. The shipping information 710 may include a shipping list, or packing slip, that lists one or more possibly heterogeneous items 724 specified by the listing customer 720 to be sent to the fulfillment services provider 720, carried in inventory of the fulfillment services provider (e.g., in materials handling facility 712), offered for sale, and sold to purchasing customer(s) 730 on behalf of the listing customer 720. The shipping information 710 may also include one or more package labels that specify at least a ship from address (the address from which the listing customer 720 will ship a package 726 containing the item(s) 724) and a ship to address (the address of the facility to which the package 726 is to be shipped). The ship from address may be automatically pulled from account information of the listing customer 720, or alternatively the listing customer 720 may be allowed, via the fulfillment services registration interface 704, to select from among two or more ship from addresses and/or to enter a different ship from address.

The inventory management system 702 may provide the shipping information 710 to the listing customer 720 via the fulfillment services registration interface 704. The shipping information 710 may, for example, be electronically transmitted to the listing customer 720 in printable form. For example, the shipping information 710 may be provided to the listing customer 720 on a printable web page, via an email message as message text or as an attachment, or via some other electronic communications channel. Alternatively, shipping information 710 may be mailed to the listing customer 720. In one embodiment, either one or both of the packing slip and package label may include scannable or otherwise readable information that may be used by the carrier or delivery service and/or by the fulfillment services provider 700 upon receiving the package. In one embodiment, shipping information 710 provided to listing customer 720 may also include information on one or more carriers or delivery services, for example street addresses, drop-off locations, phone numbers, and/or schedules, that are available near the listing customer 720's address to deliver shipments to the ship to address specified by the fulfillment services provider 700.

The packing slip and each item 724 may then be placed by the listing customer 720 into a package 726, the packing label may be applied to the outside of the package 726, and the package 726 may be shipped to a facility of the fulfillment services provider 700 as specified by the package label, such as materials handling facility 712, which may, for example, be an order fulfillment center. Package 726 may be any of a variety of shapes, sizes, and configurations of boxes, envelopes, or other types of containers appropriate for packing and shipping the item(s) 724 of the listing customer 720 to the fulfillment services provider.

In one embodiment, the fulfillment services provider 700 may, via the fulfillment services registration interface 704, provide an option whereby the listing customer may select to have a packing container or box, or alternatively a packing kit containing a box, tape, and possibly other packing accessories, provided to the customer by the fulfillment services provider 700 for shipping a specified list of one or more items 724 to the fulfillment services provider 700. The fulfillment services provider 700 may, for example, in response to the listing customer selecting the option to have a packing kit sent to the customer, mail or otherwise ship a packing kit to the customer.

The items 724 listed by the listing customer 720 may be entered into and tracked by inventory management system 720 as a pending incoming shipment from the listing customer 720. The shipment may be tracked by the scannable or otherwise readable information printed on the package label(s).

Any of a variety of carriers or delivery services may be used to ship package 726 to a facility of the fulfillment services provider 700 as specified by the package label as long as package 726 meets the shipping criteria (e.g., weight limit, size limit, content restrictions, etc.) of the carrier or delivery service and the carrier or delivery service provides delivery from the shipping address to the destination address specified on the packing label of the package 726. For example, the postal service or a package delivery service such as UPS may be used to ship package 726 if package 726 meets the criteria for allowable packages. The listing customer 720 may deliver the package to a facility of the carrier or delivery service, may have the package 726 picked up and delivered to a facility of the carrier or delivery service, e.g. by a courier service, or alternatively the carrier or delivery service may pick the package 726 up from the listing customer 720. In one embodiment, the inventory management system 702 may be configured to automatically notify the carrier or delivery service that the listing customer 720 has a package 726 to be picked up, and may also notify the listing customer 720 of a pickup time at which the carrier or delivery service is going to pick up the package 726.

In one embodiment, the packing label may be specific to a particular carrier or delivery service; for example, the packing label may be a postal service label, or a UPS label. In one embodiment, shipping costs may be prepaid, and the packing label may thus indicate that the shipping costs are prepaid. Alternatively, the listing customer 720 may pay shipping costs at the time of pickup by or delivery to the carrier or delivery service. If shipping costs are prepaid, the listing customer 720 may be charged by the fulfillment services provider 700 up front for shipping, or alternatively the shipping charges may be backloaded and thus not charged to the customer 720 until the item(s) 724 are sold or otherwise disposed of if the listing period (e.g., 90 days) for the item(s) 724 expires. In one embodiment, if there are two or more items, the shipping charges may be spread across the items 724, and thus a portion of the shipping charges may be deducted from the proceeds of selling each of the items 724 if sold. If some items 724 sell but one or more do not sell and are thus otherwise disposed of, any remaining shipping charges may be applied to the listing customer 720 along with any other fees for disposal of the item(s).

While the above describes packing, labeling, and shipping all items 726 in a single package 726, a listing by a listing customer 720 that includes two or more items 724 may require two or more packages 726. In one embodiment, during the listing process, the listing customer 720 may specify, or alternatively the inventory management system 702 may determine, the number of packages 726 required. In this embodiment, the inventory management system 702 may provide to the listing customer 720 enough packing labels to label all packages 726.

The package(s) 726 including the items 724 listed by the customer may be delivered by the carrier or delivery service to a facility of the fulfillment services provider 700 as specified by a ship to address on the package label, for example to the exemplary materials handling facility 712 shown in FIG. 7. Inventory management system 702 may include interfaces to the facility (e.g., to materials handling facility 712) for directing operators in the facility in receiving incoming shipments and stocking received items to inventory storage in the facility, and for directing operators in picking, processing packing and shipping items to fulfill requests (e.g., purchase orders) received from purchasing customers 730, for example via sales listing services interface 708. As noted above, the items 724 listed by the listing customer 720 may be entered into and tracked by inventory management system 720 as a pending incoming shipment from the listing customer 720. The shipment may be tracked by the scannable or otherwise readable information printed on the package label(s). Once the package 726 arrives at a receiving operation of the facility 712, the package label on the package may be scanned, which identifies to the inventory management system 702 that the shipment from the listing customer 720 has arrived.

In one embodiment, at the facility, the package 726 may be opened, and the packing slip may be removed. The packing slip may include scannable or otherwise readable information about the shipment. For example, the packing slip may include a bar code that may be scanned to obtain information about the shipment. Alternatively, or in addition, the packing slip may include a list of items and quantities of items included in the shipment. An operator may scan or otherwise read the information from the packing slip. The scanned or read information may be communicated to inventory management system 702, which may verify that the package 726 includes all of the items 724 listed by the customer 720. In one embodiment, the operator may be instructed to print and apply materials handling facility item labels over existing barcodes or other marks on the received items 724, or alternatively the inventory management system 702 may automatically print the item labels for application by the operator. In one embodiment, since the items 724 are not regular inventory items but are instead items received for handling by the inventory fulfillment services, the shipment of items 724 may be received under a special purchase order type.

Optionally, the operator may inspect the items 724 contained in the package to ensure the quality of the items 724 is as specified, and also to inspect for any damage that may have occurred during shipping. In one embodiment, some types of items 724, such as CDs and DVDs, may be inspected to insure that the items are not pirated or otherwise illegal copies of items, and/or inspected to insure that the items are acceptable for legal or other reasons to be carried in inventory of the materials handling facility and offered for sale via one or more electronic commerce channels. In one embodiment, the fulfillment services provider 700 may choose not to inspect items or to verify the quality of items 724 provided by listing customers 720, and may instead depend upon quality assessments performed by purchasing customers 730 that purchase and receive items 724 provided by listing customers 720 to monitor the quality of items 724 and to police listing customers 720. In one embodiment, the fulfillment services provider 700 may, through inventory management system 702, provide one or more methods for purchasing customers 730 to provide feedback on satisfaction with received items 724 from listing customers 720, and this feedback information may be provided to potential purchasing customers 730 when deciding whether to purchase items 724 from particular listing customers 720. Thus, a listing customer 720 that gets a bad reputation may have difficulty in selling items 724 via the fulfillment services provider 700 in the future.

Upon receiving the scanned or read information from the packing slip, inventory management system 702 may, in response, provide instructions as to the disposition of the items 724 contained in the associated package 726 in the facility. For example, the inventory management system 702 may provide instructions that direct the operator or some other operator to put or place each item into a particular location, bin, slot, or other receptacle in inventory storage of the facility. In one embodiment, the facility may have an area or areas in inventory storage that are specifically for stocking items 726 received in packages 726 from listing customers 720 via customer interactions with fulfillment services registration interface 704 as described above. Alternatively, items 726 received in packages 726 from listing customers 720 may be stocked with items received from other sources in the inventory storage. In one embodiment, upon receiving the scanned or read information from the packing slip, inventory management system 702 may, in response, print item labels for each of the items 724 in the package 726. The operator may then apply the printed item labels to each item 724, and may forward the item(s), along with stocking instructions, to be placed or put into inventory storage. The item labels applied to the item(s) 724 may include information about the item(s) 724 themselves (e.g., proprietary item identifiers used by fulfillment services provider 700, other item identifiers such as UPC or ISBN identifiers, etc.), and may also include information identifying the listing customer 720 as the seller of record for the item(s) 724. For example, the listing customer 720 may have a unique customer account identifier issued to the listing customer 720 upon registration to receive an account with the fulfillment services provider 700. The information may be included on an item label in a scannable or otherwise readable format, such as a bar code.

In one embodiment, sales listings for items provided by listing customer(s) 720 may be provided via one or more electronic commerce channels, which may or may not be provided by the fulfillment services provider 700. By way of example, access via a sales listing services interface 708 to an electronic commerce channel provided by the fulfillment services provider 700 is described, but it is to be noted that this example is not intended to be limiting, and that other electronic commerce channels may be used to list items from listing customers 720 for purchase by purchasing customers 730.

In one embodiment, a purchasing customer 730 may access a sales listing services interface 708 to inventory management system 702, for example using a web browser on purchasing customer system 732.

Alternatively, the purchasing customer may access inventory management system 702 via a different electronic commerce channel, for example an electronic commerce web site that accesses inventory management system 702 via a web services interface. In one embodiment, the purchasing customer 730 may be required to register for an account with the fulfillment services provider 700 before accessing the sales listing services interface 708. The purchasing customer 730 may, for example via the sales listing services interface 708, browse various items in various categories offered for sale by the fulfillment services provider 700. Items presented to the purchasing customer 730 for sale may include one or more items 724 which were listed by listing customer 720 and shipped to a facility of the fulfillment services provider 700, as described above. Information on an item 724 listed by listing customer 720 may be displayed to the purchasing customer 730 via sales listing services interface 708. This displayed information may include graphical and/or textual information. For example, a graphical image of the item 724 may be displayed, along with a title, artist or writer (if applicable), item description, and pricing information. Specifically, the sale price specified by the listing customer 720 may be displayed with the associated item 724. Information on one or more other items, including one or more other same or similar items offered for sale by the fulfillment services provider 700, by other listing customers 730, or by other entities such as one of the merchants described above in reference to FIGS. 1 through 6, may be displayed via the sales listing services interface 708.

The purchasing customer 730 may select for purchase, for example via the sales listing services interface 708, a particular item from the list of one or more items displayed. The item may be added to a virtual "shopping cart" for the customer 730. The purchasing customer 730 may, but does not necessarily, further browse the offerings of the fulfillment services provider 700, and may select one or more other items for purchase, which are also added to the "shopping cart" for the customer, for example via the sales listing services interface 708. When the purchasing customer 730 is ready to "check out", the customer 730 completes the purchase, for example via interaction with the sales listing services interface 708. A purchase order for the item(s) selected by the customer 730 may be generated by the inventory management system 702, which may include one or more items 724 listed by the listing customer 720 and possibly one or more other items listed by other listing customers 720 or by other entities, including but not limited to the fulfillment services provider 700, and selected for purchase by the purchasing customer 730. In one embodiment, the listing customer 720 is the seller of record for any item 724 purchased by the purchasing customer 730 on a purchase order. Other items on the purchase order, if any, will have other sellers of record.

In one embodiment, rather than listing an item 724 from a listing customer 720 separately on a display presented to a purchasing customer 730, for example via sales listing services interface 708, the item 724 may be included in a group of two or more similar items listed at the same price. For example, the listing customer 720 may list a particular used book to be sold at $5.00. One or more other listing customers 720 may list the same used book at the same sale price, or the same used book from other sources may be offered at the same price. As an example, sales listing services interface 708 may thus display something like "Ten used copies of that book are listed at $5.00. Click here to select one of the used books at that price." Thus, the purchasing customer 730 may simply select to purchase any one of the books. Which particular book is selected and sent to the customer 730 may be determined by any of a variety of methods that may be implemented by the inventory management system 702. For example, a FIFO method may be used, in which an item that has been listed the longest is the next item selected. Alternatively, an item with the highest quality may be the next book selected. As another alternative, an item may be selected using some randomizing algorithm. As an alternative to, or in addition to, the purchasing customer selecting any one of the used books (essentially selecting the item at random from the point of view of the customer 730), the sales listing services interface 708, for example, may provide a method for the purchasing customer 730 to further browse the items, for example to determine the condition of the used books as specified by the listing customers 720, and may allow the purchasing customer 730 to select a particular one of the used books (or other types of items) for purchase at that price. (Note that books are used by way of example; the same or similar methods may be used for other types or categories of items).

In one embodiment, the fulfillment services provider 700 may, through inventory management system 702, provide one or more methods for purchasing customers 730 to provide feedback on satisfaction with received items 724 from listing customers 720, and this feedback information may be provided to potential purchasing customers 730. Thus, the (good or bad) reputation of listing customer 720 may be made available to purchasing customer 730 for consideration when the purchasing customer 730 is deciding whether to purchase an item 724 provided by the listing customer 720 or, possibly, from some other source. Further, if the purchasing customer 730 purchases one or more items 724 provided by listing customer 720, the purchasing customer 730 may choose to enter feedback on the purchase. Thus, purchasing customer (s) 730 may, through feedback, help to insure that the quality of merchandise provided by listing customers 720 is as indicated by the listing customer 720. Listing customers 720 that gather a bad reputation may have a hard time selling listed items 724 in the future, which may be a motivation for listing customers 720 to be honest in any description of an item 724 provided via the fulfillment services registration interface 704.

Once a purchase order including at least one of the items 724 listed by the listing customer 720 has been generated for the purchasing customer by inventory management system 702, the purchase order may be sent to the facility (e.g., materials handling facility 712) of the fulfillment service provider 700 to be processed. Note that the fulfillment service provider 700 may have two or more facilities 712 in which inventory is stored, picked, and processed for shipping, and therefore it is possible that portions of a purchase order may be forwarded to and fulfilled at two or more such facilities. However, for the sake of simplicity, it will be assumed in this example that all items listed on the purchase order are fulfillable in facility 712.

At facility 712, in an order fulfillment process, an operator or operators may be tasked with picking items to fulfill the purchase order generated by purchasing customer 730. The operator(s) may then pick the item(s) from inventory storage to fulfill the purchase order, including the one or more items 724 that were listed for sale by the listing customer 720, which may be picked from the location in inventory where the items 724 were stored according to the instructions provided by the inventory management system 702, and deliver the picked item(s) to one or more processing stations for processing. At the processing station(s), collections of mixed picked items from various orders may be sorted into their respective orders, if necessary, and additional processing may be performed on the sorted orders, if necessary. Once the order for purchasing customer 730 is ready for packing, the items in the order, which may include one or more items 724 listed by listing customer 720 and one or more other items 736, may be packed into one or more boxes or other shipping containers or receptacles for shipping as a shipment 734 to the purchasing customer 730. It is possible that all of the items to fulfill the purchasing customer 730's order may not have been available in the facility 712, and therefore the shipment 734 may be a partial shipment to satisfy the customer 730's order, with the missing items on backorder to be picked and shipped to the purchasing customer 730 at a later date.

In one embodiment, the inventory management system 702 may determine if the purchase order received from the purchasing customer 730 is eligible for a particular shipping option or program, for example for a discount shipping program, free shipping program for purchases over a certain amount, or some promotional or special shipping opportunity. If the purchase order is eligible for a particular shipping option or program, the inventory management system 702 may notify the purchasing customer 730 at the time of purchase, and may instruct the operators at the facility 712 that the shipment 734 is to be shipped to the purchasing customer 730 under terms of the particular shipping option or program.

The item label on an item 724 listed and provided by listing customer 720 may be scanned or otherwise read at least once during the order fulfillment process. For example, an operator, upon picking an item 724, may scan, for example using a hand-held scanner, the item label from the item. Thus, the information on the picked item 724, which may include information identifying the particular listing customer 720, may be communicated to the inventory management system 702.

The item(s) on the purchase order, or at least a portion of the items, including one or more items 724 listed by listing customer 724 and possibly one or more other items 736, may then be shipped to the purchasing customer 730 as shipment 734. The listing customer 720 is listed as the seller of record for items 724 that were listed and provided by the customer 720. Other entities are listed as the sellers of records for other items 736, if any. Once the purchasing customer 730 receives the shipment 734, the customer 730 may examine the items contained therein, including the item(s) 724 listed and provided by listing customer 720. As noted above, in one embodiment, the inventory management system 702 may provide a method and interface for the purchasing customer 730 to provide feedback on the purchase of item(s) 724, if desired. For example, if the item(s) 724 provided by listing customer 720 are of much poorer quality than was indicated by the listing customer 720, the purchasing customer 730 may provide feedback that indicates the quality of item(s) 724 provided by listing customer 720 is poor. Conversely, if the item(s) 724 provided by listing customer 720 are of high quality, the purchasing customer 730 may provide feedback that the listing customer 720 provides high-quality items 724.

As noted above, some or all fees and charges may be backloaded so that the listing customer 720 does not have to pay the fulfillment service provider 700 for the services provided until after an item 724 is sold. At some point, either after a purchase order including an item 724 listed by listing customer 720 is generated, or alternatively after the item 724 is actually picked and processed for shipping, the listing customer 724 is paid for the sale of the item 724. In one embodiment, the customer 720 is paid the sale price of the item 724 minus any charges or fees assessed by the fulfillment service provider 700. In one embodiment, the payment may be an electronic payment made as an electronic transfer to an account 728 of the listing customer 720. The account 728 may be a bank account, or some other account as specified by the customer. In one embodiment, alternative payment methods may be offered; for example, the listing customer 720 may choose to be paid by a check that is mailed or otherwise delivered to the customer 720. In one embodiment, the inventory management system 702 may, via the fulfillment services registration interface 704, provide a method for the listing customer 720 to specify a particular account 728 or some other payment method for all of the listed items 728. In one embodiment, the inventory management system 702 may, via the fulfillment services registration interface 704, provide a method for the listing customer 720 to specify a particular account 728 or some other payment method for all of the listed items 728, or alternatively for each item 728 listed separately.

In one embodiment, the fulfillment service provider 700 may provide, through the inventory management system 702, one or more other options for dispersal of profits from sales by listing customers 720. For example, the fulfillment service provider 700 may provide, through the inventory management system 702, an option to donate a portion or all of the profits to a charity or charity fund, or to some other non-profit organization, which may be specified by the fulfillment service provider 700 or optionally specified by the listing customer 720. In one embodiment, the fulfillment service provider 700 may provide an option to the listing customer 720 to have the profit from a sale of item(s) 724 credited to a purchasing account maintained by the fulfillment service provider 700, and thus the listing customer 720 can use the funds in that account to apply to future purchases from the fulfillment service provider 700.

The inventory management system 702 may provide notifications, for example via email, to the listing customer 720. As an example, a email may be sent to the listing customer to inform the listing customer that an item or items 724 listed by the customer 720 has sold, and that the profits from the sale are to be electronically transferred to the account specified by the customer 724 (or otherwise dispersed). As another example, an email may be sent to the customer 720 to notify the customer that an item is about to or has expired its listing period (e.g., 90 days) without selling. In one embodiment, this email may request a reply from the customer selecting from among two or more options as to what to do with this item 724 (e.g., return, liquidate, recycle, reduce price, etc.) Any additional handling charges or fees for an item 724 that has expired may be communicated to the customer 720, and the listing customer's account 728 may be charged for the fees via an electronic transfer. Other emails may be sent, for example to notify the customer 720 of the status of a shipped package 726, e.g. to notify the customer 720 that the package 726 has been received, and that the package 726 contains (or does not contain, if that is the case) all of the items 724 indicated by the packing slip.

In one embodiment, the inventory management system 702 may provide a web page or pages specific to the listing customer 720 whereby the listing customer 720 can log on (with appropriate identification and password information) and check the status of shipped packages 726, the status of listed items 724 in inventory, the status of sales of the listed items 724, and so on. The inventory management system 702 may also provide, via the customer 720's web page or pages, the ability for the customer 720 to modify information on listed items(s) 724, for example the ability for the customer to increase or decrease the requested sale price of listed item(s) 724 and to change the description of listed item(s) 724. The inventory management system 702 may also provide, via the customer 720's web page or pages, recommendations on adjusting the price of listed item(s) 724 based on historical sales information for the specific item(s) 724 or similar item (s) 724.

Figure 8:
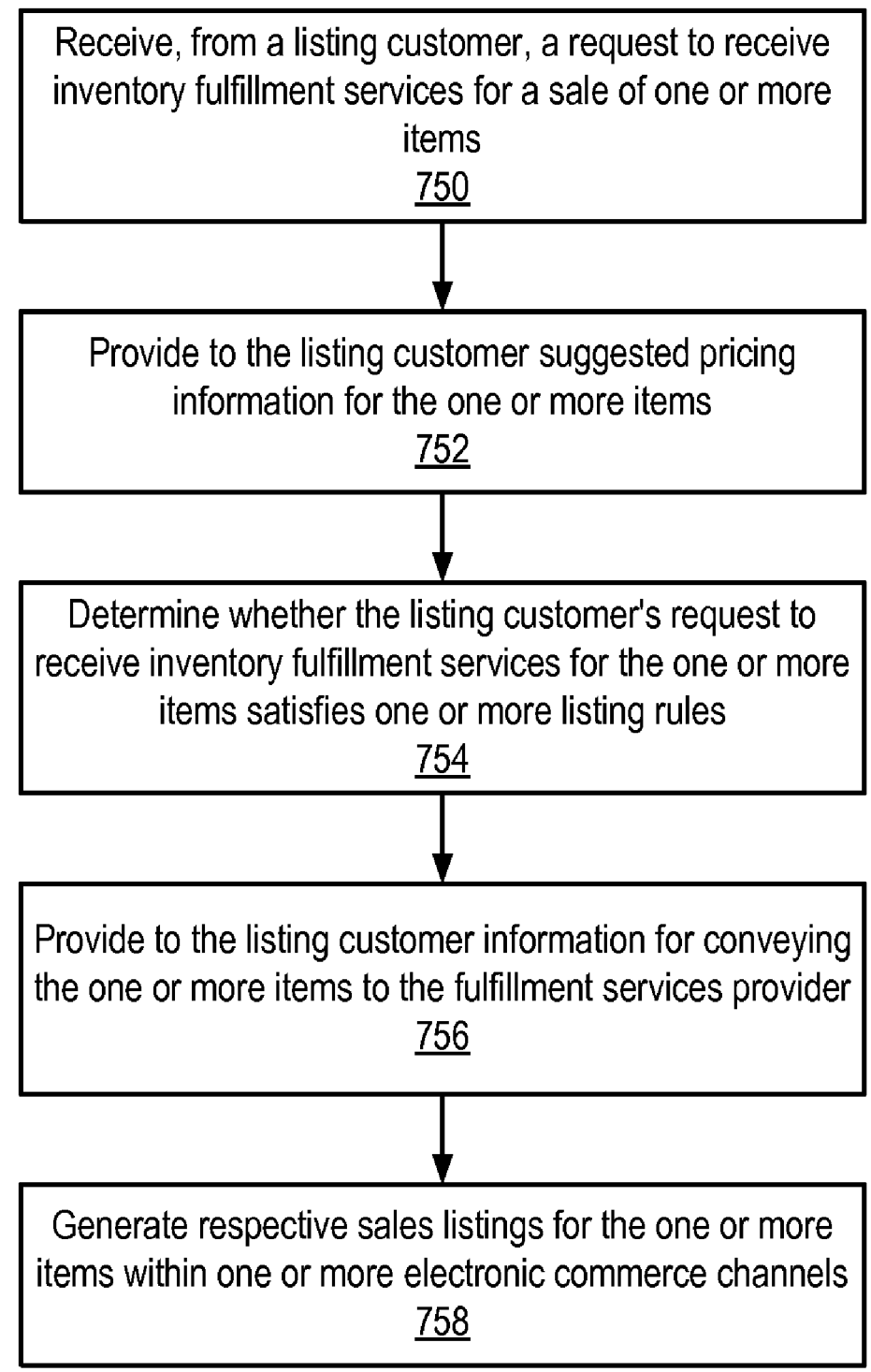
FIG. 8 is a flow diagram illustrating a computer-implemented method for providing inventory fulfillment services to customers who have single units of items or small quantities of possibly heterogeneous items that they wish to list for sale with a fulfillment services provider, according to various embodiments.
Figure 19:
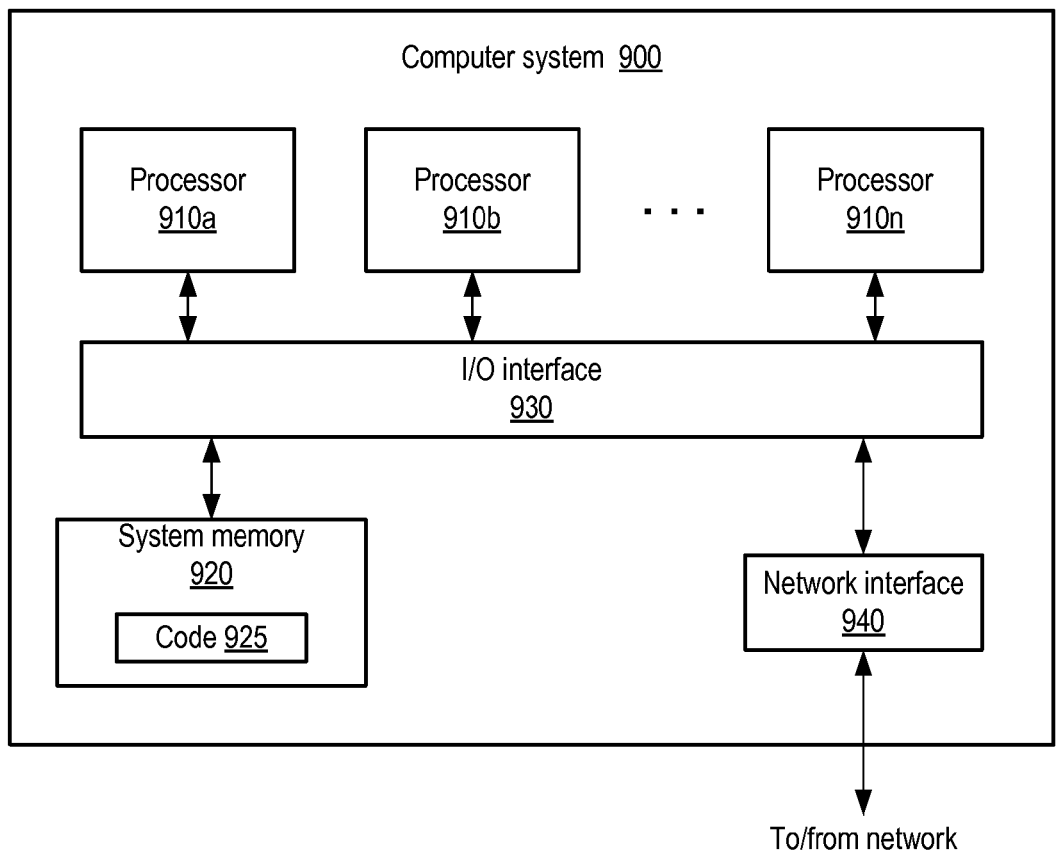
FIG. 19 is a block diagram illustrating an exemplary embodiment of a computer system.

FIG. 8 is a flow diagram illustrating a computer-implemented method for providing inventory fulfillment services to customers who have single units of items or small quantities of possibly heterogeneous items that they wish to list for sale with a fulfillment services provider, according to various embodiments. An exemplary computer system on which embodiments of the method may be implemented is illustrated in FIG. 19. As indicated at 750, a fulfillment services provider may receive, from a listing customer, a request to receive inventory fulfillment services for a sale of one or more items. If the request is to receive inventory fulfillment for a plurality of items, the plurality of items may include at least two heterogeneous items. The items may, for example, include used items that the listing customer wishes to sell through the inventory fulfillment services offered by the fulfillment services provider, such as media items (CDs, DVDs, video games, books, etc.), other types or categories of items, or mixed categories or types of items. In one embodiment, the request may be received via a computer-implemented fulfillment services registration interface, such as fulfillment services registration interface 704 illustrated in FIG. 7. FIGS. 9A through 14 illustrate an exemplary graphical user interface implementation for a fulfillment services registration interface. The listing customer may, for example, access the fulfillment services registration interface via a web browser on a listing customer computer system or via some other web-enabled device.

As illustrated at 752, the fulfillment services provider may provide to the listing customer, for example via the fulfillment services registration interface, suggested pricing information for the one or more items in response to the request to receive inventory fulfillment services for the one or more items. In one embodiment, to provide the suggested pricing information to the listing customer for a given item, the fulfillment services provider may evaluate historical sales data corresponding to the given item and generate a suggested price range for the given item in accordance with the historical sales data.

As illustrated at 754, the fulfillment services provider may determine whether the listing customer's request to receive inventory fulfillment services for the one or more items satisfies one or more listing rules of the fulfillment services provider. In one embodiment, to determine that the listing customer's request satisfies a particular one of the one or more listing rules with respect to a given item, the fulfillment services provider may determine that a sales price specified by the customer, via the fulfillment services registration interface, for the given item is within a suggested price range, which may, for example, be determined from an evaluation of historical sales data.

In one embodiment, to determine that the listing customer's request satisfies a particular one of the one or more listing rules with respect to a given item, the fulfillment services provider may estimate the listing customer's expected profit for the given item if the given item sells. In one embodiment, the expected profit may be determined as the asking sale price for the item (which may be specified by the listing customer via the fulfillment services registration interface) minus any expected inventory fulfillment services transaction costs or fees for the given item. In one embodiment, the fulfillment services provider may reject a request to receive inventory fulfillment services for the given item if the determined profit for the given item if sold is less than a specified threshold. The specified threshold may be, but is not necessarily, zero. In one embodiment, the listing customer may be provided with the opportunity to adjust the sale price of the item upwards, if desired, or to list a given item even though the expected profit is zero or negative, if desired.

In other embodiments, to determine that the listing customer's request satisfies a particular one of the one or more listing rules with respect to a given item, the fulfillment services provider may filter the given items according to one or more other listing rules. For example, the fulfillment services provider may choose not to accept out-of-date items (e.g., older versions of textbooks, older generations of personal electronic equipment, etc.), items with poor sales history, and/or certain categories or types of items, certain titles of various media products. In general, the listing rules may be used to filter items that the fulfillment services provider will not accept according to any set of criteria that the fulfillment services provider requires or desires.

As illustrated at 756, if the fulfillment services provider determines that the request satisfies the one or more listing rules, the fulfillment services provider may provide to the listing customer information for conveying the one or more items to the fulfillment services provider. This information, which may be referred to as shipping information, may be provided to the customer via the fulfillment services registration interface. For example, the shipping information may be displayed via the fulfillment services registration interface in printable form. Alternatively, the shipping information may be emailed to the listing customer, or provided via some other communications channel or method. As indicated above, one or more items may be rejected by the fulfillment services provider, or alternatively may be removed from the original request by the listing customer, if necessary or desired. Thus, the shipping information may only specify ones of the one or more items that are accepted by the fulfillment services provider and by the listing customer.

In one embodiment, the shipping information may include a shipping list, or packing slip, that lists accepted ones of the one or more possibly heterogeneous items. In one embodiment, the shipping information may also include one or more package labels that specify at least the ship from and ship to addresses. In one embodiment, shipping costs may be prepaid, and thus the package label(s) may specify prepaid shipping. In one embodiment, the shipping information provided to the listing customer may also include information on one or more carriers or delivery services, for example street addresses, drop-off locations, phone numbers, and/or schedules, that are available near the listing customer's address to deliver shipments to the ship to address specified by the fulfillment services provider. In one embodiment, either one or both of the packing slip and package label may include scannable or otherwise readable information that may be used by a carrier or delivery service and/or by the fulfillment services provider upon receiving the package(s).

The packing slip and each item may be placed by the listing customer into a package or packages, the packing label(s) may be applied to the outside of the package(s), and the package(s) may be shipped to a facility of the fulfillment services provider as specified by the ship to address on the package label. The facility may be a materials handling facility, for example an order fulfillment center. Upon arriving at the facility as specified by the ship to address on the package label, an inventory management system of the fulfillment services provider, such as inventory management system 702 illustrated in FIG. 7, may detect that the package(s) have been received at the facility. For example, the package label on the package may be scanned, which identifies to the inventory management system that the shipment from the listing customer has arrived. In one embodiment, the package may be opened, and the packing slip may be removed. The packing slip may include scannable or otherwise readable information. For example, the packing slip may include a bar code. An operator may scan or otherwise read the information from the packing slip. Upon receiving the scanned or read information from the packing slip and/or from the packing label, the inventory management system may, in response, provide instructions as to the disposition of the items contained in the associated package in the facility. For example, the inventory management system may provide instructions that direct the operator or some other operator or operators to put or place each item in the package into a particular location, bin, slot, or other receptacle in inventory storage of the facility. In one embodiment, the items may be commingled with other items that are not associated with the listing customer within inventory storage of the facility.

As illustrated at 758, if the fulfillment services provider determines that the request satisfies the one or more listing rules, the fulfillment services provider may generate respective sales listings for the one or more items within one or more electronic commerce channels. In one embodiment, an electronic commerce channel may be provided by the fulfillment services provider, for example via a sales listing services interface such as sales listing services interface 708 illustrated and described for FIG. 7, or as another example via an electronic commerce web site that accesses the inventory management system of the fulfillment services provider in accordance with a web services interface. As indicated above, one or more items may be rejected by the fulfillment services provider or removed from the original request by the listing customer, if necessary or desired. Thus, sales listings may only be generated for ones of the one or more items that are accepted by the fulfillment services provider and by the listing customer. In one embodiment, the fulfillment services provider may provide, via the fulfillment services registration interface, an option and interface (e.g., a web page) for the listing customer to remove the sales listing for an item if desired, and/or to modify a sales listing, for example by changing the sales price or editing listing customer comments. In one embodiment, the fulfillment services provider may reserve the right to remove any sales listing for an item and/or to modify a sales listing if necessary or desired.

In one embodiment, if a given one of the one or more items listed by the listing customer sells via the sales listings on the electronic commerce channel(s), the fulfillment services provider may assess any charges and fees to the listing customer for inventory fulfillment services related to the given item. In one embodiment, the charges and fees are backloaded; that is, the listing customer pays the fees when the item actually sells, and thus the profit for the sale is the sales price minus the fees. In one embodiment, the listing customer is the seller of record for each item sold via the sales listings on the electronic commerce channel(s).

In one embodiment, the fulfillment services provider may specify a listing period, or expiration period, after which sales listings on the electronic commerce channel(s) may expire. For example, the fulfillment services provider may expire sales listings after 90 days. In one embodiment, different lengths of listing periods may be applied to different types or categories of items. In one embodiment, if a given item does not sell prior to the expiration of its corresponding sales listing, the fulfillment services provider may not assess fees to the listing customer for the costs of inventory fulfillment services incurred prior to the expiration of the corresponding sales listing. In one embodiment, at least a portion of the fees for the costs of inventory fulfillment services incurred prior to the expiration of the corresponding sales listing may be assessed to the listing customer for given items that do not sell before the listing period for the corresponding sales listing expires.

In one embodiment, after expiration of a sales listing, the corresponding item may be returned to the listing customer. In other embodiments, the corresponding item may be disposed of via one of one or more other methods. In one embodiment, the item may be reduced in price, and the sales listing accordingly adjusted, for an extended listing period. In one embodiment, the fulfillment services provider may, after the listing period for an item expires without the item being sold, reduce the sale price of the item by some amount (e.g., 10%), and then reduce the price again after a period (e.g., two days, or a week) if the item does not sell at that price, and may continue periodically or aperiodically reducing the price until the item sells or, if the item does not sell, otherwise disposing of the item. In one embodiment, for any item that has not sold by the end of the listing period, the fulfillment services provider may continue to carry the item, but may begin charging stocking and possibly other applicable inventory fulfillment services fees to the listing customer. In one embodiment, the item may be liquidated, for example by selling the item to a wholesaler at a wholesale or liquidation price. In one embodiment, the item may be thrown away or recycled, if possible. In one embodiment, the item may be donated to a charity or other not-for-profit organization. In one embodiment, the fulfillment services provider may notify the listing customer, for example via email or via a web page provided via the fulfillment services registration interface, when a sales listing for an item is about to or has expired. In one embodiment, the fulfillment services provider may, via the fulfillment services registration interface or via some other communications channel, provide the listing customer with two or more options for disposal of an item for which the corresponding sales listing has expired, and the listing customer may thus select a desired disposal option. In one embodiment, the fulfillment services provider may assess appropriate fees to the listing customer in accordance with the method of disposal of the item. If there is any profit from the disposal of the item, for example if the item is sold at a reduced price that provides a profit after assessment of any applicable fees, the listing customer may be paid the profit by the fulfillment services provider, for example via an electronic funds transfer to an account of the listing customer. If there is no profit, but instead a negative profit or loss, due to the fees for handling and disposal of the item after expiration of the corresponding sales listing, the listing customer may be assessed for the charges.

Assessment of any fees or charges for the handling and disposal may also be performed via electronic funds transfer from an account of the listing customer.

After the items are listed on the one or more electronic commerce channels and received into the inventory storage of the facility as described above, the inventory management system of the fulfillment services provider may receive an order from a purchasing customer for a given one of the items provided by the listing customer, and possibly also specifying one or more other items not provided by the listing customer. The order may be received, for example, via one of the one or more electronic commerce channels.

In response to receiving the order from the purchasing customer, the inventory management system may issue instructions to the operators at the facility that direct the operators in picking, packing, and shipping the given item, along with other items, if any, to the purchasing customer. In one embodiment, the listing customer is the seller of record of the given item, and only of the given item. In response to receiving the order from the purchasing customer, the inventory management system may credit to the listing customer the sales price for the given item less any inventory fulfillment services fees assessed to the listing customer for the given item.

In one embodiment, the inventory management system may determine if the order received from the purchasing customer is eligible for a particular shipping option or program, for example for a discount shipping program or promotional shipping opportunity. If the order is eligible for a particular shipping option or program, the inventory management system may instruct the operators at the facility that the order including the given item is to be shipped to the purchasing customer under terms of the particular shipping option or program.

Exemplary User Interface

FIGS. 9A-G and FIG. 10 through FIG. 14 illustrate an exemplary user interface that may be provided via a fulfillment services registration interface, such as fulfillment services registration interface 704 illustrated in FIG. 7, for providing access to inventory fulfillment services to listing customers who have single units of items or small quantities of possibly heterogeneous items that they wish to list for sale with a fulfillment services provider, according to one embodiment. In one embodiment, the various displays of the exemplary user interface illustrated in FIG. 9A through FIG. 14 may be provided to the listing customer as web pages via the fulfillment services registration interface. The web pages may be displayed and accessed by the listing customer using a web browser on a computer system accessible to the listing customer, or via some other web-enabled device. In one embodiment, the listing customer must have an account with the fulfillment services provider to access the exemplary user interface. The user interface illustrated in FIG. 9A through FIG. 14 is exemplary, and is not intended to be limiting.

Figure 9A:
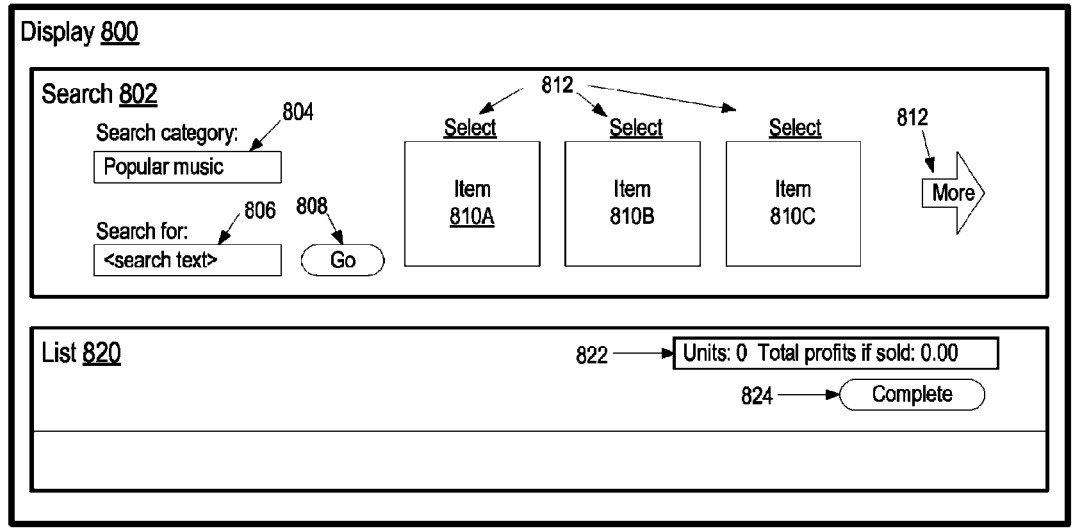

FIG. 9A illustrates an exemplary user interface display for generating a list of one or more possibly heterogeneous items that a listing customer desires to list for sell via the inventory fulfillment services provided by the fulfillment services provider, according to one embodiment. Display 800 may be accessed from one or more links on or more other web pages provided on a electronic commerce web site of the fulfillment services provider, or alternatively from one or more links on or more web pages on one or more other web sites which may or may not be directly associated with the fulfillment services provider. In one embodiment, a web page may provide, as options to a listing customer, a link to display 800 and a link to a web page such as web page 610 of FIG. 6 for accessing the functionality of the inventory fulfillment services as described above for merchants. Thus, a listing customer may be provided with an option to use one or the other of the embodiments of the inventory fulfillment services described herein.

Display 800 may include, but is not limited to, a search 802 area and a list 820 area. Search 802 area may be used by the listing customer to search for and select particular items in a catalog of the fulfillment services provider that match items that the listing customer desires to list with the fulfillment services provider. Search 802 may include a search category 804 user interface element that enables the listing customer to select a category for an item to be searched for. Categories may include, but are not limited to, various media categories (e.g., books, music, subcategories of music or books, DVDs, movies, subcategories of movies, video and/or computer games, etc.), and various other categories (e.g., personal electronic devices, appliances, tools, electric tools, etc.). In general, any type or category of item listed in a catalog of the fulfillment services provider may be entered or selected in search category 804. In one embodiment, search category 804 may be a menu from which a particular category may be selected. In one embodiment, search category 804 may be a text entry box that accepts alphanumeric input.

Search 802 may also include a search for 806 user interface element. In one embodiment, search for 806 may be a text entry box that accepts alphanumeric input. In one embodiment, search for 806 may accept one or more of, but is not limited to, an ISBN of a book, a Universal Product Code (UPC), a proprietary item identifier used by the fulfillment services provider, some other identifier associated with items, a title or portion of a title, an artist or author's name, or some other keyword. In one embodiment, one or more logical operators may be entered to construct a search expression; for example, the user may enter "Smith AND Blues" to search for titles that include both the words Smith and Blues. Search 802 may also include a "Go" 808 user interface element, for example a button, to initiate a search for a specified search for 806 in the specified search category 804.

List 820 is where particular items selected by the listing customer are to be listed. List 820 may include a summary 822 of the listed items, which may display the total number of units listed and the estimated total profit if all of the units are sold. List 820 may also include a complete 824 user interface element that the listing customer may select when the customer has completed the listing of items.

In FIG. 9A, the listing customer has selected a category of "Popular music", specified a search string, and selected Go 808. At least three items have been located in the catalog that meet the specified search criteria. These items are displayed horizontally in search 802 area as items 810A, 810B, and 810C. Items 810 may provide graphical and/or textual descriptions of and information about the items in the catalog. For example, an item 810 may display a graphical image of an item such as a CD, and may display an ISBN, UPC, or some other code or identifier associated with the item. One or more user interface elements, e.g. More 812, may be provided to scroll or otherwise view other items 810 that have been located via the search but that are not currently displayed. In one embodiment, each item 810 may be user-selectable, for example by hovering a cursor over an item 810 and left-clicking a mouse, to add the item to list 820. In one embodiment, a Select 812 user interface element may also or instead be provided with each item 810 whereby the listing customer may select the associated item 810. At this point, the listing customer has not yet selected a particular item 810 that best matches an item that the customer wants to list.

Figure 9B:
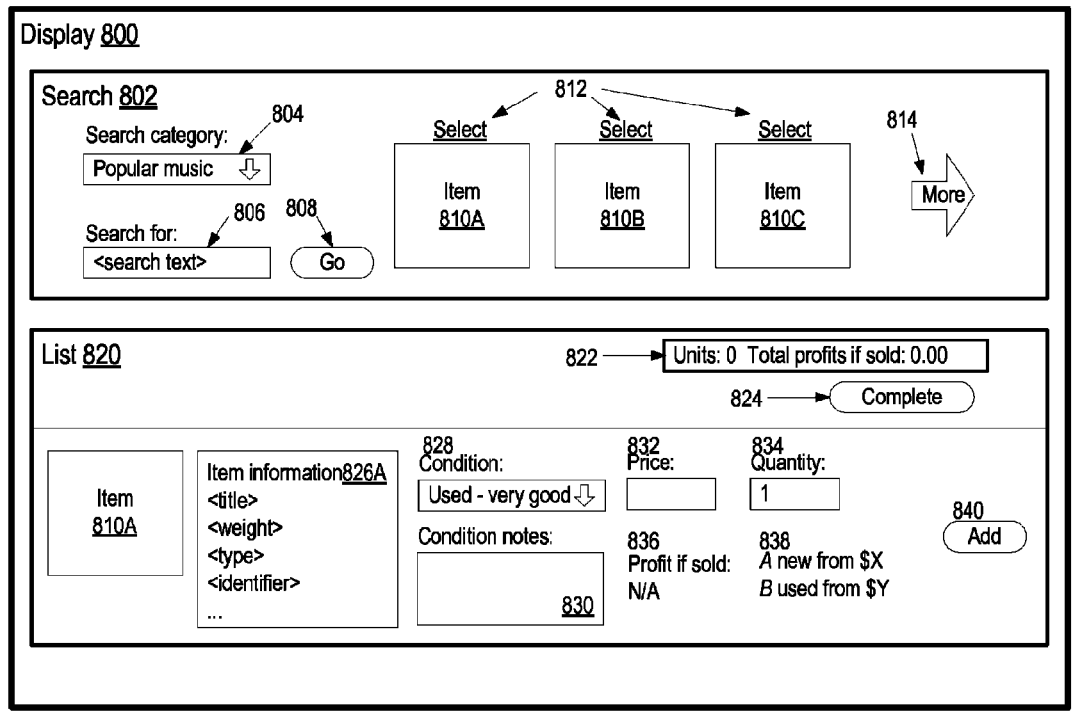

In FIG. 9B, the listing customer has selected item 810A, and item 810A has been added to list 820. List 820 may include one or more other user interface elements associated with item 810A. For example, list 820 may include item information 826 that displays additional textual and/or graphical information related to item 810A, such as the title, weight, type or category, identifier(s), and so on. List 820 may also include one or more user interface elements in which the listing customer may select or enter information related to the particular item in the listing customer's possession that the listing customer wishes to list for sale. In one embodiment, list 820 may include a Condition 828 user interface element, which may for example be a selectable menu item, via which the listing customer may select an approximate condition from a range of two or more conditions for the particular item in the listing customer's possession. For example, selectable conditions may include something like "like new", "very good", "average", and "poor." In one embodiment, list 820 may include a Condition notes 830 user interface element in which the listing customer may enter text further describing the condition (or other aspects) of the particular item. In one embodiment, list 820 may include a quantity 834 user interface element in which the listing customer may specify how many units of the particular item 810A (one or more) the listing customer is listing for sale.

In one embodiment, list 820 may include a price 832 user interface element. In one embodiment, the fulfillment services provider may automatically determine a price for the selected item 810 and may enter the price in price 832 user interface element. In one embodiment, the listing customer may enter a desired sale price in price 832 user interface element. In one embodiment, list 820 may include a user interface element 836 that shows an estimated profit if the item is sold at the specified sales price. The profit is calculated from the specified sale price minus any appropriate inventory fulfillment service fees assessed to the listing customer upon sale of the associated item. Note that the profit if sold may be negative if the estimated fees are greater than the sale price specified in price 832. In one embodiment, list 820 may include a user interface element 838 that shows current and/or historical asking sale prices for item 810A In one embodiment, as shown, user interface element 838 may show the number of new items 810A currently in inventory of the fulfillment services provider and the minimum sale price for the item 810A as new, and the number of used items 810A currently in inventory of the fulfillment services provider and the minimum sale price for the item 810A as used. In one embodiment, list 820 may also show a range of sale prices, from the minimum sale price to the maximum sale price. In one embodiment, list 820 may also show more detailed pricing information, for example sale prices for used items in various conditions. In one embodiment, the more detailed pricing information may also include an estimated amount of time to sell the item 810 as listed by the listing customer at one or more sale prices. Thus, the fulfillment services provider, via the user interface provided in display 800, may coach the listing customer in selecting an appropriate sale price for particular items in particular conditions.

In one embodiment, list 820 may include an Add 840 user interface element that may be selected to add the associated item 810A displayed in list 820 area to an actual list of items that the listing customer wishes to sell. In one embodiment, Add 840 may be disabled until the listing customer completes one or more required fields associated with the item 810A. In FIG. 9B, the listing customer has not yet completed the fields associated with item 810A, and therefore the item 810A, while listed, has not yet been added. Note that the summary 822 of listed items still shows zero units and zero total profit.

Figure 9C:
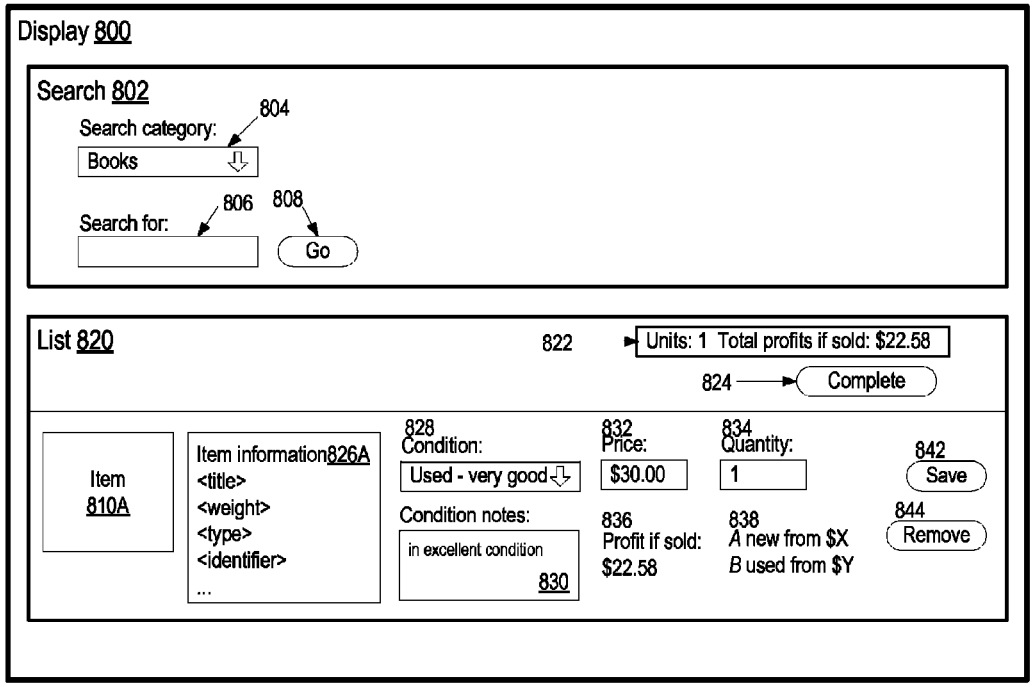

In FIG. 9C, the listing customer has entered information in the various fields of list 820 associated with item 810A, and has added item 810A by selecting Add 840 of FIG. 9B. The listing customer has specified a sale price of $30.00 for the single unit of item 810A that the customer wishes to sell. An expected profit if sold of $22.58 is displayed by Profit if sold 836 user interface element. The summary 822 of listed items now shows one unit and $22.58 total profit. A Remove 844 user interface element is displayed for item 810A, which the listing customer may select to remove item 810A from the list. Note that the Search 802 area has been cleared or reset to its default condition of not displaying any items 810 in response to the listing customer selecting Add 840 associated with item 810A.

Figure 9D:
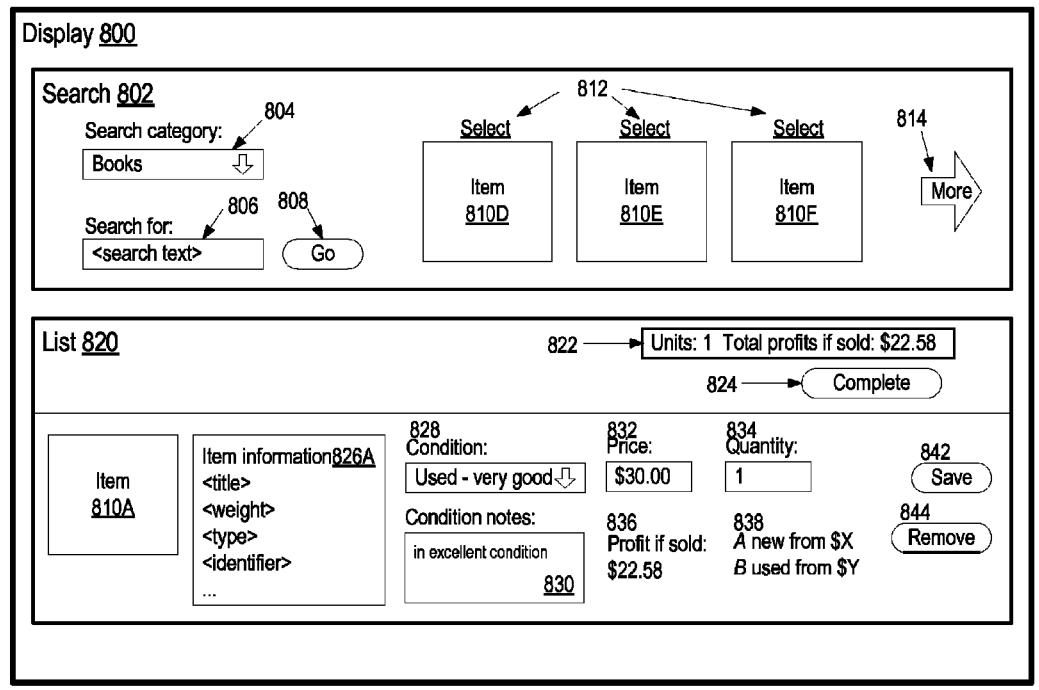

In FIG. 9D, the listing customer has selected a category of "Books", specified a search string, and selected Go 808. At least three items have been located in the catalog that meet the specified search criteria. These items are displayed horizontally in search 802 area as items 810D, 810E, and 810F. At this point, the listing customer has not yet selected a particular item 810 that best matches an item that the customer wants to list, and thus another item 810 has not been added to list 820.

Figure 9E:
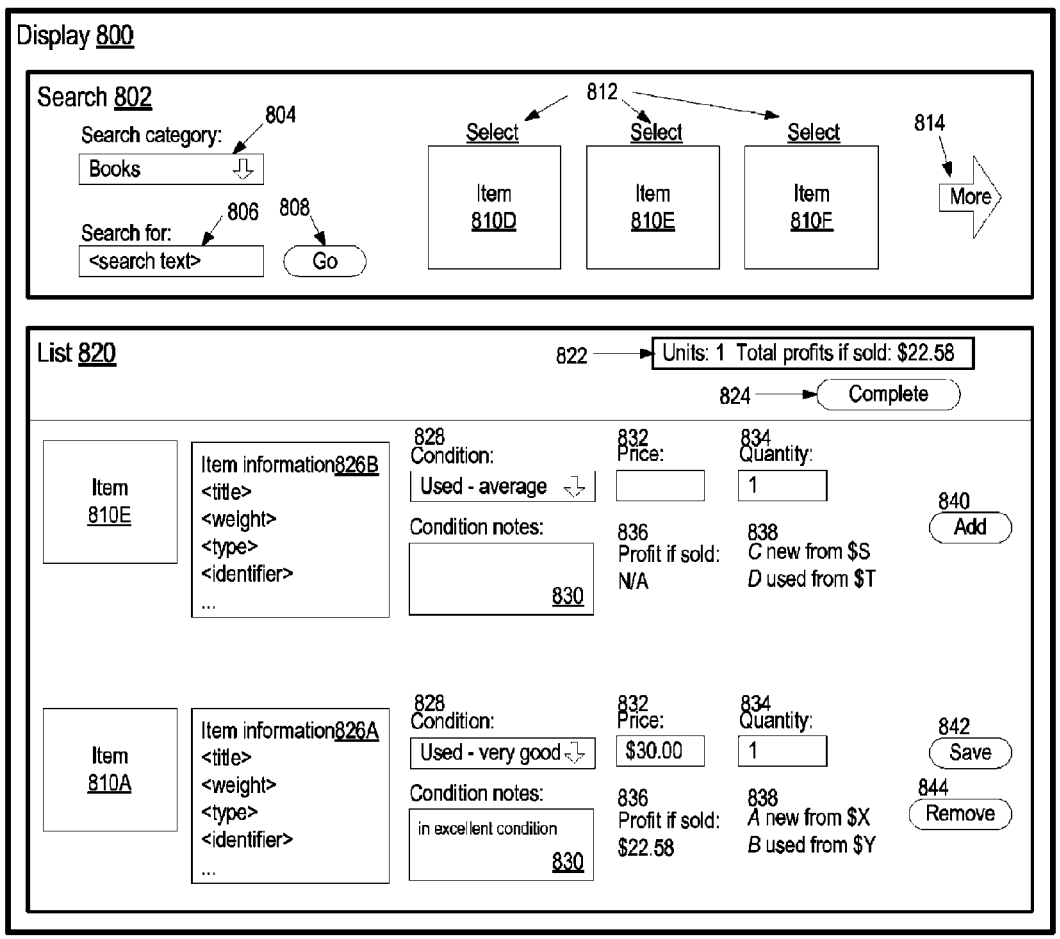

In FIG. 9E, the listing customer has selected item 810E, and item 810E has been added to list 820. The listing customer has not yet entered information in the various fields of list 820 associated with item 810E, and has not yet selected Add 840 for item 810E. The summary 822 of listed items still shows one unit and $22.58 total profit.

In FIG. 9F, the listing customer has entered information in the various fields of list 820 associated with item 810E, and has selected Add 840 for item 810E. Note that the sale price 832 for item 810E is $1.50, and the Profit if sold 836 for item 810E is $−0.99. The listing customer will lose money if the item 810E is sold at the asking sale price. The summary 822 of listed items now shows two units and $21.59 total profit if all units are sold. If the expected profit if sold for an item 810 is negative, the Profit if sold 836 user interface element may display the negative profit in bold and/o in color (e.g., red), or may use one or more other methods to highlight the negative profit. Alternatively, the display 800 may alert the listing customer via some other mechanism or mechanisms that sale of the item at the specified sale price may result in a negative profit. The listing customer may choose to raise the price to at least a break-even level in response, or may choose not to list the item, e.g. by selecting the remove 844 user interface element.

In one embodiment, the fulfillment services provider may refuse to accept a listing for an item that will result in a negative profit, or loss. In this embodiment, the fulfillment services provider may, via the user interface presented on display 800 or via some other mechanism, alert the listing customer that the item 810 will not be accepted at the specified price. In this embodiment, the Add 840 user interface element may be disabled for an associated item 810 that will result in a negative profit if sold at the specified price. The listing customer may choose to raise the price to at least a break-even level in response, or may choose not to list the item.

In FIG. 9G, the listing customer has removed item 810E and searched for and selected two other items 810, items 810G and 810H. The listing customer has entered information in the various fields of list 820 associated with items 810G and 810H, and has selected Add 840 for items 810G and 810H. The summary 822 of listed items now shows three units and $32.72 total profit. If the listing customer is done with the listing of items that the customer wishes to sell, the listing customer may select the complete 824 user interface element. Otherwise, the listing customer may continue to work on the list, searching for and adding other items 810, and possibly editing or removing listed items 810.

FIG. 10 illustrates an exemplary confirmation box 850 that may be displayed in response to the listing customer selecting the complete 824 user interface element of display 800. The listing customer may select "OK" to finalize the list of items that will be the content of a shipment to the fulfillment services provider, or optionally may select "Cancel" to cancel the operation and return to display 800 as illustrated in FIG. 9G.

Figure 11:
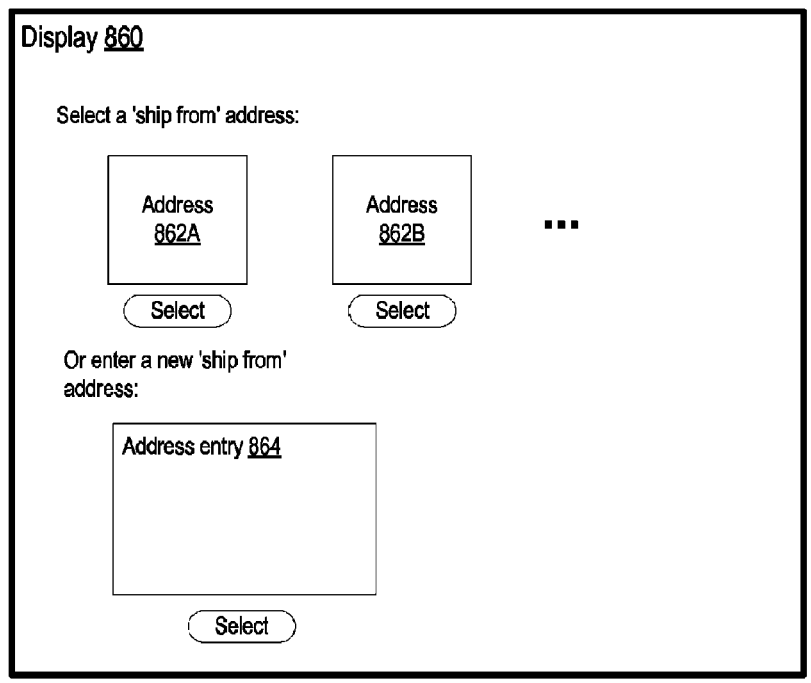

FIG. 11 illustrates a display 860 that may be displayed in response to the listing customer selecting the "OK" user interface element of confirmation box 850. In display 860, the listing customer may specify a ship from address for a shipment containing the items specified in the list created using display 800 of FIGS. 9A through 9G. In one embodiment, display 860 may include a user-selectable list of one or more addresses 862. The address(es) 862 may be obtained from existing account information for the listing customer. In one embodiment, display 860 may include an address entry 864 user interface element or elements in which the listing customer may specify a ship from address for the shipment.

Figure 12:
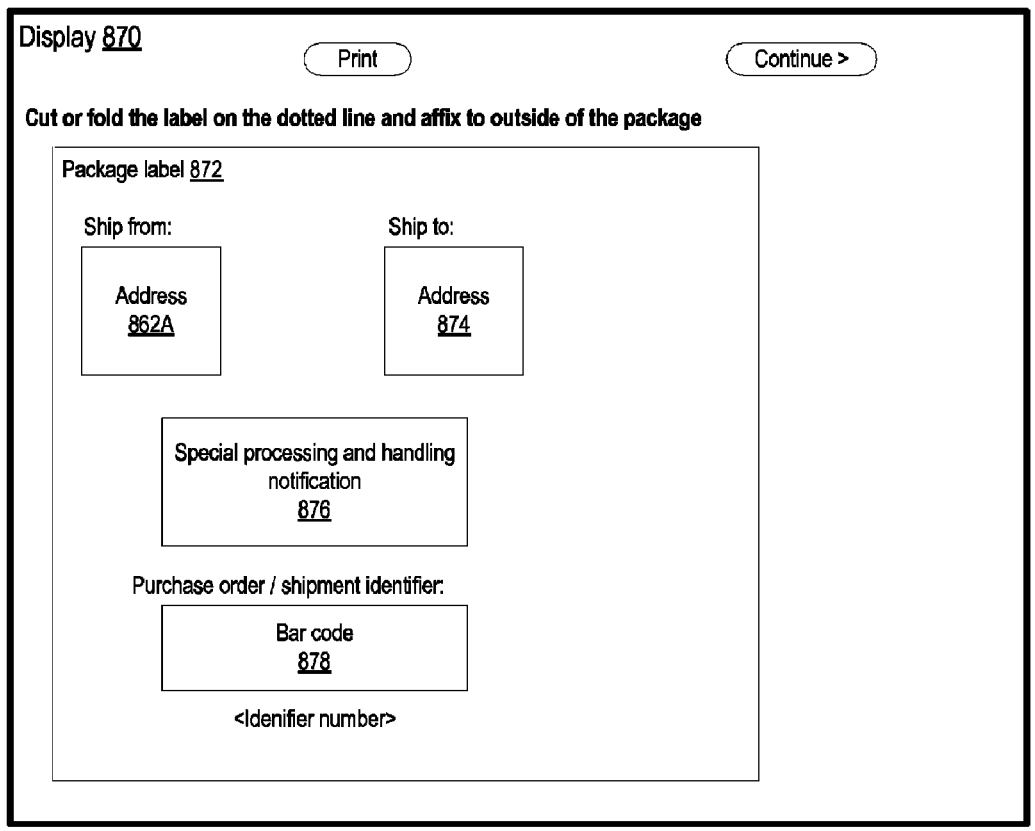

FIG. 12 illustrates a display 870 that includes a printable and/or downloadable package label 872 or labels for the shipment. In one embodiment, display 870 may be displayed in response to the listing customer selecting an address in display 860 of FIG. 11. Package label 872 may include a ship from address (e.g., address 862A selected from display 860) and a ship to address 874 that specifies the address of a facility to which the package(s) are to be shipped. Package label 872 may also include a purchase order/shipment identifier, such as a bar code 878 and alphanumeric shipment/package identifier number. Package label 872 may also include a special processing and handling notification 876, which may, for example, be a visual alert to operators at the ship to facility that the package has been received from a listing customer as described herein. Display 870 may also include a user interface element, e.g. a print button, which the listing user may select to print the package label(s) 872. Display 870 may also include a user interface element, e.g. a "continue" button, which the listing user may select to go to a next display, for example display 880 of FIG. 13.

FIG. 13 illustrates a display 880 that includes a printable and/or downloadable packing slip 882 to be included in or alternatively attached to a package of the shipment. Packing slip 882 may include a ship from address (e.g., address 862A selected from display 860) and a ship to address 874 that specifies the address of a facility to which the package(s) are to be shipped. Packing slip 882 may also include a purchase order/shipment identifier, such as a bar code 884 and alphanumeric shipment identifier number. In one embodiment, packing slip 882 may include a shipment content list 888 that may include a list of each item and item quantities contained in the shipment (there may be two or more of a particular item in a shipment). Information for each item listed may include one or more of, but is not limited to, an item name, item description, item identifier (e.g., UPC code, ISBN number, or other item identifier), item condition as specified by the listing customer, and quantity. Packing slip 882 may also include special processing and handling instructions 886, which may, for example, instruct operators at the ship to facility that the package has been received from a listing customer as described herein, and may provide instructions for handling the items contained in the shipment. For example, the instructions may include something like:

1. Print and apply item labels over existing barcodes.
2. Receive using a special purchase order type.

Display 880 may also include a user interface element, e.g. a print button, which the listing user may select to print the packing slip 882. Display 880 may also include a user interface element, e.g. a "continue" button, which the listing user may select to go to a next display.

While FIGS. 12 and 13 illustrate separate displays for the packing label(s) and packing slip, in an alternative embodiment, a single display may be used to display the packing label(s) and packing slip to the listing customer.

FIG. 14 illustrates a display 890 that may be displayed upon completion of processing of a list of one or more, possibly heterogeneous, items by the listing customer for shipment to the fulfillment services provider. On display 890, the listing customer may be provided with user interface elements that allow the customer to either begin the process over to generate a new shipment, or to exit out of the process and return to a previous web page or display. The listing customer may be provided with one or more user interface elements that allow the listing customer to proceed to a "seller account" web page or pages specific to the listing customer wherein the listing customer may view and manage information about the generated shipment or previously generated shipments.

Inventory Fulfillment Services for Existing Listing Customers

Figure 15:
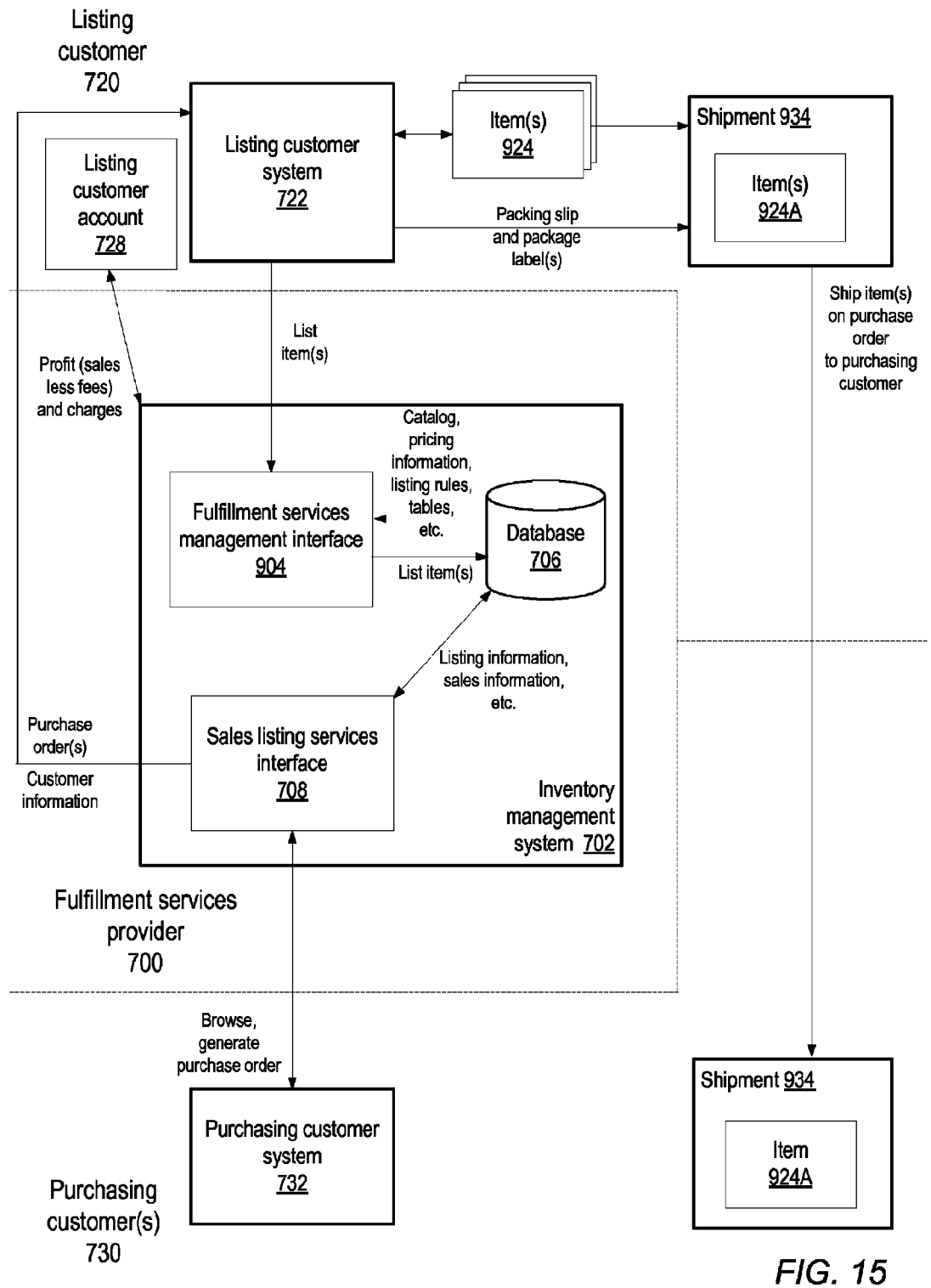
FIG. 15 illustrates a fulfillment services provider and inventory management system that includes a fulfillment services management interface, according to one embodiment.

In various embodiments, the above-described inventory management system may be configured to provide listing services to listing customers (e.g., merchants that have items listed with the inventory management system), as illustrated by FIG. 15. Note that like numbered elements of FIG. 15 and FIG. 7 may in various embodiments be substantially similar or in some cases the same. In various embodiments, listing customers may include individuals and/or merchants that have received listing services (e.g., the listing services provided by interface 708) for one or more items while retaining the responsibility of fulfilling such items (e.g., packaging and shipping to purchasing customers). Such items may be referred to herein as listing customer fulfilled items. In various embodiments, a listing customer, such as listing customer 720 may list listing customer fulfilled items, such as items 924, with a fulfillment services management interface of inventory management system 702. Fulfillment services management interface may 904 in various embodiments provide listing services to customers that desire to utilize the listing functionality (e.g., sales listing services interface 708 and database 706) of the inventory management system in order to sell one or more items to purchasing customers, such as purchasing customer 730. While in the illustrated embodiment the listing customer may list one or more items with the inventory management system via fulfillment services management interface 904, the listing customer may in the illustrated embodiment retain responsibility of fulfilling purchase orders for one or more items that are sold (e.g., packaging and shipping such items to a purchasing customer). In various embodiments, the functionality of fulfillment services management interface 904 for listing one or more items for sale through an ecommerce channel (e.g., adding relevant item information to database 706, creating sales listings available through interface 708) may be substantially similar (and in some cases the same) as the functionality described above in regard to fulfillment services registration interface 704.

For instance, in some cases, the inventory management system described herein may be configured to provide listing services, such as the listing services provided by sales listing services interface 708, for one or more listed items. For each listed item, the inventory management system may be configured to generate and maintain respective sales listings, such as web pages of the marketplace e-commerce channel described above, as well as other product information (e.g., item descriptions, item prices, other item-related information, etc.). Such product web pages may enable purchasing customers, such as purchasing customer 732, to engage in commerce with the fulfillment services provider in order to purchase an item from the listing customer. When a purchasing customer purchases a listed item via an ecommerce channel, the inventory management system may be configured to provide the respective listing customer with notification of such purchase (e.g., one or more purchase orders). Accordingly, the listing customer may complete the necessary fulfillment actions (e.g., packaging and shipping) to provide the purchasing customer with the listed item(s). For instance, in the illustrated embodiment, sales listing service interface 708 may be configured to provide one or more purchase orders to listing customer 720 in response to the purchasing of one or more items by purchasing customer 730. Listing customer 720 may fulfill the purchase order by packaging the items specified by the purchase order and shipping such items to the purchasing customer, such as illustrated by shipment 934 including item(s) 924A.

In some cases, listing customers may desire to transition listing customer fulfilled items to items that are fulfilled by the fulfillment service provider 700. Accordingly, in various embodiments, the inventory management system may enable listing customers to easily transition listed items, which would otherwise be fulfilled by the listing customer, to items that are fulfilled by the fulfillment services provider described herein. In various embodiments, one or more listed items may be transitioned in a batched manner into items that are fulfilled by the fulfillment service provider. For example, the inventory management system may identify all of the listing customer's listed items and transition the listed items such that they are to be fulfilled by the fulfillment services provider. In various embodiments, the fulfillment service provider's inventory management system may be configured to, in response to only a single action being performed, perform one or more inventory management actions to transition the listing customer fulfilled items into items to be fulfilled by the fulfillment services provider, as described in more detail below.

In various embodiments, a fulfillment services management interface, such as fulfillment services management interface 904, may enable a listing customer (including individuals and/or merchants) to transition their listing customer fulfilled items (e.g., items for which the customer is responsible for fulfillment, such as packaging and shipping) to items that are fulfilled by a fulfillment services provider, such as fulfillment service provider 700. In various embodiments, the fulfillment services management interface may be configured to detect a single action, and, in response to only that single action being performed, perform one or more item related functions (e.g., generating shipping information, modifying sales listings, etc.) as described in more detail below. Such single actions may include, but are not limited to, the depressing of a particular button or key, the selection of a display item with a pointing device (e.g., a computer mouse or trackball), the speaking of a voice command (or other generation of sound) by an individual, the clicking of a mouse button when a cursor is positioned over a particular area of a display, or the selection of a displayed indication. In various embodiments, the single action may be performed by an individual or a merchant (or a representative of the merchant).

Figure 16:
FIG. 16 illustrates an exemplary display that enables a user to perform a single action, according to one embodiment.

In various embodiments, the fulfillment services management interface may be configured to generate and present (e.g., via a web page or other interface) a user interface, such as a display, that enables a user to perform a single action, such as the single actions described above. As described above, the fulfillment services management interface may be configured to, in response to only such single action being performed, perform one or more item related functions as described in more detail below. FIG. 16 illustrates an example of such a user interface (e.g., display 1000) generated by the fulfillment services management interface. In various embodiments, display 1000 may be a component of an account management interface (e.g., an account management website) provided by the fulfillment services provider. For example, a listing customer may log on to such a website to manage their item listings (e.g., modify quantities, prices, item descriptions, etc.). Display 1000 may include a list of the customer's items for which the inventory management system provides listing services, such as sales listings and commerce support (e.g., the functionality provided by sales listing services interface 708). One example of such a list is illustrated by listed items 1020. Listed items 1020 may include any of the listing customer fulfilled items (e.g., items 1010A-1010N) associated with the particular listing customer. In some embodiments, the fulfillment services management interface may automatically select which listing customer fulfilled items to display. For instance, the fulfillment services management interface may display all of the listing customer fulfilled items for a particular listing customer. In other cases, the fulfillment services management interface may select a subset of the listing customer's listing customer fulfilled items. In some cases, such subset may be selected based on one or more item criteria (e.g., cost, size, condition, quantity available, etc.). In other embodiments, listed items may be chosen or specified by the listing customer. For instance, in one embodiment, the listing customer may select a subset of his listing customer fulfilled items. For example, the listing customer may select to include or remove items from listed items 1020 by selecting include control 1042 (e.g., to keep the respective item in listed items 1020) or by selecting remove control 1044 (e.g., to remove the respective item from listed items 1020). In some embodiments, the listing customer may filter out particular items based on item properties such as item information 1026, condition 1028, price 1032, quantity 1034, or some other property.

As described above, display 1000 may enable a listing customer to perform a single action and the fulfillment services management interface may be configured to, in response to only such single action being performed, perform various action that may in some embodiments transition the listing customer fulfilled items of listed items 1020 into items that are fulfilled by a fulfillment services provider (e.g., fulfillment services provider 700 of FIG. 7 and FIG. 15). In various embodiments, transitioning the listing customer fulfilled items may include transitioning all items for which the listing customer receives listing services. In other embodiments, transitioning the listing customer fulfilled items may include transitioning a subset of the listing customer fulfilled items for which the listing customer fulfilled items. In some cases, such subset may be chosen by the inventory management system and/or the listing customer as described above. As illustrated by single action user interface element 1050, display 1000 may include one or more single action user interface elements that the listing customer may utilize to perform a single action. In the illustrated embodiment, the single action may include the selection of the single action user interface element 1050, such as the selection of single action user interface element 1050 with a pointing device (e.g., a mouse click). In another embodiment, the single action may include the depressing of a particular button or key that corresponds to single action user interface element 1050 (e.g., selecting the "return" key of a keyboard or other input device). In another embodiment, the single action may include the speaking of a voice command (e.g., through an appropriate sound sensitive input device, such as a microphone). In some embodiments, single action user interface element 1050 may be a button or other control element that occupies a specific portion of display 1000 and the single action may include placing a cursor of a pointing device (e.g., a mouse) over or within the specific portion.

In response to a only a single action being performed, such as the single actions described above, the fulfillment services management interface may be configured to perform one or more tasks, which may in some cases be related to transitioning listing customer fulfilled items into items that are fulfilled by the fulfillment services provider. Such tasks are described in more detail below in regard to FIG. 17.

In various embodiments, the user interface (e.g., display 1000) that includes a single action user interface element may be generated by, for example, inventory management system 702 (or another system controlled by fulfillment services provider 700). However, in various other embodiments, the user interface that includes the single action user interface element may be generated by various entities other than the fulfillment services provider. For instance, in one embodiment, the user interface may be generated by an e-commerce provider (other than fulfillment services provider 700), such as a provider that enables a merchant to list one or more items (e.g., items 1010A-N) for sale electronically (e.g., for sale over a network, such as the Internet). For instance, the e-commerce provider may enable one or more purchasing customers to purchase items 1010A-N via product web pages. In another example, the user interface may be provided by an online auction provider (other than fulfillment services provider) that enables a merchant to list one or more items (e.g., items 1010A-N) for sale via an electronic auction, such as an auction accessible via one or more auction web pages where purchasing customers may place bids for purchase on the items.

In various embodiments, the user interface (e.g., display 1000) may be a component of an account management interface, such as an account management interface of the aforementioned e-commerce provider or online auction provider. For instance, a merchant could log on to an account management interface provided by the e-commerce provider or online auction provider and transition their listed inventory (e.g., items listed for sale or for auction) to be fulfilled by fulfillment services provider 700. Such transitioning may be performed by selecting the single action user interface element 1050 as described in more detail above.

Figure 17:
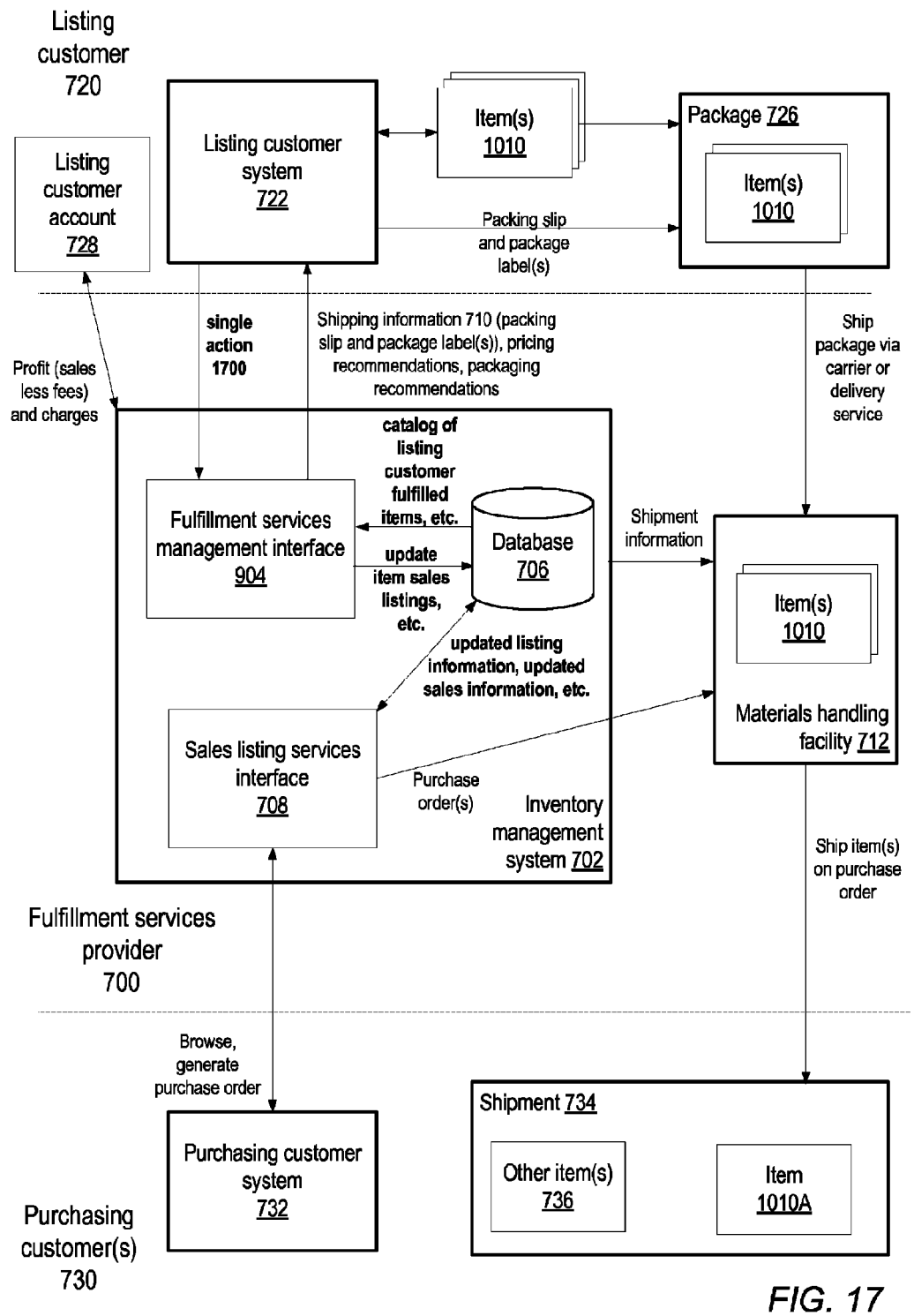
FIG. 17 illustrates a fulfillment services provider and inventory management system that includes a fulfillment services management interface, according to one embodiment.

FIG. 17 illustrates a fulfillment services provider and inventory management system that provides, via a fulfillment services management interface 904, inventory fulfillment services to listing customers who have one or more listing customer fulfilled items on record with fulfillment services provider 700. Note that like numbered elements of FIG. 17 and FIG. 7 (described above) may have substantially similar or in some cases the same functionality. In one embodiment, a listing customer 720 may access a fulfillment services management interface 904 of inventory management system 702, for example by using a web browser on listing customer system 722. The listing customer 720 may have previously registered one or more accounts with the fulfillment services provider 700 before accessing the fulfillment services management interface 904, and thus may have a unique customer account identifier and password (or other authentication information) with which to access the management interface.

A catalog of item descriptions corresponding to respective listing customer fulfilled items may be maintained by the inventory management system 702 in database 706. The item descriptions of the listing customer fulfilled items maintained in database 706 may include the above described listing customer fulfilled items. Note that database 706 may include, but is not limited to, one or more databases, data stores, collections of files of various types, one or more catalogs of item descriptions, pricing information, or other rules, tables and lists, web pages and associated web page data, information, and graphics, textual and/or graphical files for display via various interfaces, historical information such as historical sales information, or any other data and information that may be maintained and used by inventory management system 702. In other words, database 706 may include and therefore is representative of any and all data and information that may be used by inventory management system 702 as described herein. In various embodiments, fulfillment services management interface 904 may use data from database 706 to generate one or more user interfaces, such as display 1000 described above (or other items configured to enable a customer to perform the above described single actions).

In various embodiments, fulfillment service management interface 904 may detect the performance of a single action, such as single action 1700. For instance, fulfillment services management interface 904 may present display 1000 to listing customer 720 (via listing customer system 722) and detect that single action user interface element 1050 has been selected, such as via a mouse click or any other of the above described techniques for performing a single action. Fulfillment service management interface 904 may then, in response to only single action 1700 being performed, generate information for conveying one or more listing customer fulfilled items to the fulfillment services provider. In some case, such information for conveying one or more listing customer fulfilled items to the fulfillment services provider may include shipping information 710 for the listing customer 720. As described above, shipping information 710 may include a shipping list, or packing slip, that lists one or more possibly heterogeneous items 1010 specified by the listing customer 720 to be sent to the fulfillment services provider 720, carried in inventory of the fulfillment services provider (e.g., in materials handling facility 712), offered for sale, and sold to purchasing customer(s) 730 on behalf of the listing customer 720. The shipping information 710 may also include one or more package labels that specify at least a ship from address (the address from which the listing customer 720 will ship a package 726 containing the item(s) 1010) and a ship to address (the address of the facility to which the package 726 is to be shipped). The ship from address may be automatically pulled from account information of the listing customer 720, or alternatively the listing customer 720 may be allowed, via the fulfillment services management interface 904, to select from among two or more ship from addresses and/or to enter a different ship from address.

Inventory management system 702 may provide, in response to only single action 1700 being performed, the shipping information 710 to the listing customer 720 via the fulfillment services management interface 904. As described above, the shipping information 710 may, for example, be electronically transmitted to the listing customer 720 in printable form. For example, the shipping information 710 may be provided to the listing customer 720 on a printable web page, via an email message as message text or as an attachment, or via some other electronic communications channel. Alternatively, shipping information 710 may be mailed to the listing customer 720. In one embodiment, either one or both of the packing slip and package label may include scannable or otherwise readable information that may be used by the carrier or delivery service and/or by the fulfillment services provider 700 upon receiving the package. In one embodiment, shipping information 710 provided to listing customer 720 may also include information on one or more carriers or delivery services, for example street addresses, drop-off locations, phone numbers, and/or schedules, that are available near the listing customer 720's address to deliver shipments to the ship to address specified by the fulfillment services provider 700. The packing slip and each item 1010 may then be placed by the listing customer 720 into a package 726, the packing label may be applied to the outside of the package 726, and the package 726 may be shipped to a facility of the fulfillment services provider 700 as specified by the package label, such as materials handling facility 712, which may, for example, be an order fulfillment center. Package 726 may be any of a variety of shapes, sizes, and configurations of boxes, envelopes, or other types of containers appropriate for packing and shipping the item(s) 1010 of the listing customer 720 to the fulfillment services provider.

In various embodiments, database 706 (or another database accessible to inventory management system 702) may include data or information about items managed by the inventory management system (e.g., items 724) and/or items to be managed by the inventory management system (e.g., items 1010). Such information may in various embodiments include historical pricing information. For instance, as sales listing services interface 708 generates purchase orders for purchased items, database 706 may generate a record that indicates the price at which the item was sold. As multiple ones of the same items are sold over time, database 706 may record each price at which the items were sold. In other cases, database 706 may obtain historical pricing information for particular items from other sources, such as a marketing agency. Database 706 may also include data or information with respect to item characteristics. Such characteristics may include but are not limited to item dimensions (with or without appropriate packaging), such as length, width, weight, etc. The characteristics may also include other information, such as information related to suggesting handling practices for a particular item (e.g., suitable storage temperatures, a measure of how fragile an item is, or a suggested orientation for the item).

Inventory management system 702 may in various embodiments use the data stored in database 706 to generate and/or provide, in response to only a single action being performed (e.g., listing customer selecting single action user interface element 1050), pricing recommendations. Such pricing recommendation may be provided to listing customers to facilitate pricing of their items. In other cases, inventory management system 702 may, in response to only a single action being performed (e.g., listing customer selecting single action user interface element 1050), automatically set prices for each of the listing customers items (e.g., items 1010). In various embodiments, the inventory management system may be configured to apply, in response to only a single action being performed (e.g., listing customer selecting single action user interface element 1050), one or more rules to the data of database 706 to determine a pricing recommendation for a particular item. For example, one rule may specify that the average historical price at which the particular item has been sold should be the suggested price. Other rules may specify other criteria, such as the minimum or maximum price at which the particular item has sold for a particular time period. In some embodiments, other criteria may include the date or time of year at which an item is to be sold. For example, for seasonal items (e.g., winter coats, bathing suits, etc.), the inventory management system may generate different prices dependent upon the date or time of year at which the items are to be sold.

In various embodiments, fulfillment services management interface may be configured to, in response to only single action 1700 being performed, generate and/or provide listing customer 720 with packaging recommendations based on item characteristics (e.g., item characteristics stored in database 706). For instance, for a collection of items, such as items 1010, the fulfillment services management interface may be configured to, in response to only single action 1700 being performed, generate and/or provide listing customer 720 with an indication of the dimensions of shipping containers (e.g., dimensions of one or more packages 726) and the specific contents (e.g., items, packing slips, etc.) that should be packed in such shipping containers. Such packing recommendations may in some embodiments be optimized to minimize shipping costs between the listing customer and the fulfillment services provider. In other embodiments, such recommendations may be optimized to simplify handling logistics for the fulfillment services provider. For instance, items may be grouped among different shipping containers based on their intended location within a materials handling facility, such as materials handling facility 712.

In various embodiments, the inventory management system may be configured to, in response to only single action 1700 being performed, generate and/or provide the customer with a packaging kit with shipping containers (e.g., boxes) that adhere to the above described recommended shipping container dimensions. In some cases, such packaging kit may include pre-labeled shipping containers that include any of the various shipping labels described herein. In some cases, the packaging kit may include instructions for packaging particular items within such shipping containers (e.g., instructions that indicate, for a particular shipping container, which items should be placed within such shipping container). In various embodiments, the inventory management system may determine the appropriate shipping containers (e.g., dimensions of such shipping containers) for the packaging kit by analyzing item characteristics stored in database 706. For instance, the inventory management system may, in response to only single action 1700 being performed, analyze characteristic (e.g., length, width, weight, etc.) to determine an appropriate shipping container (e.g., a shipping container of a particular size or rated for a particular weight). In some cases, the inventory management system may, in response to only single action 1700 being performed, determine how much protective packing material should be used for a particular item (e.g., fragile items may require more protective packing materials than items that are not fragile).

The items 1010 listed by the listing customer 720 may be entered into and tracked by inventory management system 720 as a pending incoming shipment from the listing customer 720. The shipment may be tracked by the scannable or otherwise readable information printed on the package label (s). Any of a variety of carriers or delivery services may be used to ship package 726 to a facility of the fulfillment services provider 700 as specified by the package label as long as package 726 meets the shipping criteria (e.g., weight limit, size limit, content restrictions, etc.) of the carrier or delivery service and the carrier or delivery service provides delivery from the shipping address to the destination address specified on the packing label of the package 726. For example, the postal service or a package delivery service such as UPS may be used to ship package 726 if package 726 meets the criteria for allowable packages. The listing customer 720 may deliver the package to a facility of the carrier or delivery service, may have the package 726 picked up and delivered to a facility of the carrier or delivery service, e.g. by a courier service, or alternatively the carrier or delivery service may pick the package 726 up from the listing customer 720. In one embodiment, the inventory management system 702 may be configured to, in response to only single action 1700 being performed, notify the carrier or delivery service that the listing customer 720 has a package 726 to be picked up, and may also, in response to only single action 1700 being performed, notify the listing customer 720 of a pickup time at which the carrier or delivery service is going to pick up the package 726.

The package(s) 726 including the items 1010 listed by the customer may be delivered by the carrier or delivery service to a facility of the fulfillment services provider 700 as specified by a ship to address on the package label, for example to the exemplary materials handling facility 712 shown in FIG. 7. Inventory management system 702 may include interfaces to the facility (e.g., to materials handling facility 712) for directing operators in the facility in receiving incoming shipments and stocking received items to inventory storage in the facility, and for directing operators in picking, processing packing and shipping items to fulfill requests (e.g., purchase orders) received from purchasing customers 730, for example via sales listing services interface 708. As noted above, the items 1010 listed by the listing customer 720 may be entered into and tracked by inventory management system 720 as a pending incoming shipment from the listing customer 720. The shipment may be tracked by the scannable or otherwise readable information printed on the package label(s). Once the package 726 arrives at a receiving operation of the facility 712, the package label on the package may be scanned, which identifies to the inventory management system 702 that the shipment from the listing customer 720 has arrived.

In one embodiment, at the facility 712, the package 726 may be opened, and the packing slip may be removed. The packing slip may include scannable or otherwise readable information about the shipment. For example, the packing slip may include a bar code that may be scanned to obtain information about the shipment. Alternatively, or in addition, the packing slip may include a list of items and quantities of items included in the shipment. An operator may scan or otherwise read the information from the packing slip. The scanned or read information may be communicated to inventory management system 702, which may verify that the package 726 includes all of the items 1010 listed by the customer 720. In one embodiment, the operator may be instructed to print and apply materials handling facility item labels over existing barcodes or other marks on the received items 1010, or alternatively the inventory management system 702 may automatically print the item labels for application by the operator. In one embodiment, since the items 1010 are not regular inventory items but are instead items received for handling by the inventory fulfillment services, the shipment of items 1010 may be received under a special purchase order type. In various embodiments, the inventory management system 702 may provide instructions as to the disposition of the items 1010 contained in the associated package 726 in the facility, such as described above in regard to FIG. 7.

Materials handling facility 712 may in various embodiments store and/or handle inventory for a variety of listing customers or merchants. For instance, in some embodiments, materials handling facility is owned or under the control of a merchant (e.g., merchant 40d described above) who also owns or controls the inventory management system. In some embodiments, such merchant may have additional inventory management and materials handling capacity and may therefore provide such services to other merchants, such as listing customer 720, for a fee. In some embodiments, the materials handling facility may integrate items selected via the fulfillment services management interface (e.g., items 1010) into the materials handling facility. In various embodiments, the materials handling facility may handle these items in the same manner as other items from other merchants whether such items are items received from other listing customers or a merchant than owns or controls the material handling facility. For example, in response to only a single action being performed (e.g., listing customer 720 selecting single action user interface element 1050), the inventory management system 702 may generate and provide instructions as to the disposition of items 1010 within the facility. For example, the inventory management system 702 may, in response to only a single action being performed (e.g., listing customer 720 selecting single action user interface element 1050), generate and/or provide instructions that direct the operator or some other operator to put or place each item into a particular location, bin, slot, or other receptacle in inventory storage of the facility. In one embodiment, the facility may have an area or areas in inventory storage that are specifically for stocking items 101 received in packages 726 from listing customers 720 via customer interactions with fulfillment services management interface 904 as described above. As described in more detail below, materials handling facility 712 may be configured to ship items 1010, as well as other inventory handled by the materials handling facility (e.g., inventory of other listing customers or merchants) in response to receiving a purchase order from the inventory management system.

In various embodiments, fulfillment service provider 700 may (via materials handling facility 712) provide one more promotional or special handling services for items that are sold by and fulfilled by the fulfillment services provider. Accordingly, for items 1010 the handling facility 712 may include such items as available for such promotional or special handling services even though the fulfillment services provider is not the seller of record for such items. In some embodiments, promotional services may include providing discounted shipping charges for shipping such items to customers (e.g., purchasing customer 730). For instance, in some cases, discounted shipping charges may be provided for items that are part of an order that has a total price above a certain price threshold (e.g., a discount shipping price threshold). For example, discounted shipping may be provided for items of orders having a total cost of more than a threshold amount. In some embodiments, special handling services may include handling services provided by the fulfillment services provider for customers (e.g., purchasing customer 730) of items fulfilled by the fulfillment services provider. For instance, the materials handling facility may include optional services such as gift wrapping of the items or expedited processing of the items (e.g., expediting the process of preparing items and providing items to a shipping carrier). In various embodiments, the inventory management system may modify sales listings (described in more detail below) to reflect the availability of promotional or special handling services. For instance, the method may include modifying a product web page to provide a customer (e.g., purchasing customer 730) with an option to select the above described promotional or special handling services.

In various embodiments, the inventory management system may enable a purchasing customer (e.g., purchasing customer 730) to purchase groups of items that are fulfilled by the fulfillment services provider irrespective of the seller of record for such items. For instance, an order purchased by the purchasing customer might include items for which the fulfillment services provider is the seller of record and items for which the listing customer is the seller of record. For such orders, the fulfillment services provider may enable the purchasing customer to take advantage of the above-described promotional or special handling services even though items of such orders have various sellers of record.

In various embodiments, sales listings for items provided by listing customer(s) 720 may be provided via one or more electronic commerce channels, which may or may not be provided by the fulfillment services provider 700. By way of example, access via a sales listing services interface 708 to an electronic commerce channel provided by the fulfillment services provider 700 is described, but it is to be noted that this example is not intended to be limiting, and that other electronic commerce channels may be used to list items from listing customers 720 for purchase by purchasing customers 730. In various embodiments, such sales listing may be defined by data within database 706. For instance, a sales listing may include data defining one or more web pages that offer one or more of items 1010 for sale. As listing customer fulfilled items are transitioned to items that are fulfilled by inventory management system 702 (e.g., as indicated by single action 1700), such sales listing may be updated or modified to indicate a change in fulfillment provider. For instance, before a listing customer fulfilled item is conveyed to the fulfillment services provider, a sales listing for such item may indicate that the respective listing customer is tasked with fulfilling any orders for such items (e.g., the listing may indicate "this item is packaged and shipped by listing customer ABC"). The inventory management system 702 may be configure to, in response to only single action 1700 being performed, generate for each of such items updated or modified sales listing that indicate a different entity (e.g., fulfillment services provider 700 or another entity other than the listing customer) is tasked with fulfilling orders for such items (e.g., the listing may indicate "this item is packaged and shipped by fulfillment provider XYZ"). In some embodiments, updating or modifying a sales listing may include changing one or more data objects that define such sales listing. In other embodiments, the inventory management system may be configured to, in response to only single action 1700 being performed, generate new sales listings based on corresponding existing sales listings. Such new sales listings may, for example, indicate that a different entity (e.g., fulfillment services provider 700 or another entity other than the listing customer) is tasked with fulfilling orders for such items (e.g., the listing may indicate "this item is packaged and shipped by fulfillment provider XYZ").

In one embodiment, a purchasing customer 730 may access a sales listing services interface 708 to inventory management system 702, for example using a web browser on purchasing customer system 732. Alternatively, the purchasing customer may access inventory management system 702 via a different electronic commerce channel, for example an electronic commerce web site that accesses inventory management system 702 via a web services interface. In one embodiment, the purchasing customer 730 may be required to register for an account with the fulfillment services provider 700 before accessing the sales listing services interface 708. The purchasing customer 730 may, for example via the sales listing services interface 708, browse various items in various categories offered for sale by the fulfillment services provider 700. Items presented to the purchasing customer 730 for sale may include one or more items 1010 which were listed by listing customer 720 and shipped to a facility of the fulfillment services provider 700, as described above. Information on an item 1010 from database 706 may be displayed to the purchasing customer 730 via sales listing services interface 708. This displayed information may include graphical and/or textual information. For example, a graphical image of the item 1010 may be displayed, along with a title, artist or writer (if applicable), item description, and pricing information. Specifically, the sale price specified by the listing customer 720 may be displayed with the associated item 1010. Information on one or more other items, including one or more other same or similar items offered for sale by the fulfillment services provider 700, by other listing customers 730, or by other entities such as one of the merchants described above in reference to FIGS. 1 through 6, may be displayed via the sales listing services interface 708. In various embodiments, inventory management system 702 may be configured to, in response to only single action 1700 being performed, provide sales listing services interface with updated, modified, and/or new information (e.g., the updated, modified, or new sales listing described above) that indicates a change in fulfillment provider for one or more items. Furthermore, the purchasing customer 730 may select for purchase, for example via the sales listing services interface 708, a particular item from the list of one or more items displayed. Such item may be fulfilled according to the techniques described above with respect to FIG. 7 and sent to purchasing customer 730 as shipment 734.

In one embodiment, the inventory management system 702 may be configured to, in response to only single action 1700 being performed, generate and/or provide a web page or pages specific to the listing customer 720 whereby the listing customer 720 can log on (with appropriate identification and password information) and/or check the status of shipped packages 726, the status of listed items 1010 in inventory, the status of sales of the listed items 1010, and so on. The inventory management system 702 may also provide, via the customer 720's web page or pages, the ability for the customer 720 to modify information on listed items(s) 1010, for example the ability for the customer to increase or decrease the requested sale price of listed item(s) 1010 and to change the description of listed item(s) 1010.

In various embodiments, the user interface (e.g., display 1000) that includes a single action user interface element may be generated by, for example, inventory management system 702 (or another system controlled by fulfillment services provider 700). However, in various other embodiments, the user interface that includes the single action user interface element may be generated by various entities other than the fulfillment services provider. For instance, in one embodiment, the user interface may be generated by an e-commerce provider (other than fulfillment services provider 700), such as a provider that enables a merchant to list one or more items (e.g., items 1010A-N) for sale electronically (e.g., for sale over a network, such as the Internet). For instance, the e-commerce provider may enable one or more purchasing customers to purchase items 1010A-N via product web pages. In another example, the user interface may be provided by an online auction provider (other than fulfillment services provider) that enables a merchant to list one or more items (e.g., items 1010A-N) for sale via an electronic auction, such as an auction accessible via one or more auction web pages where purchasing customers may place bids for purchase on the items.

In various embodiments, the user interface (e.g., display 1000) may be a component of an account management interface, such as an account management interface of the aforementioned e-commerce provider or online auction provider. For instance, a merchant could log on to an account management interface provided by the e-commerce provider or online auction provider and transition their listed inventory (e.g., items listed for sale or for auction) to be fulfilled by fulfillment services provider 700. Such transitioning may be performed by selecting the single action user interface element 1050 as described in more detail above. Accordingly, in some embodiments, the fulfillment services provider may receive an indication of single action 1700 from systems other than listing customer's system 722, such as a system owned or controlled by the above described e-commerce provider or online auction provider.

Figure 18:
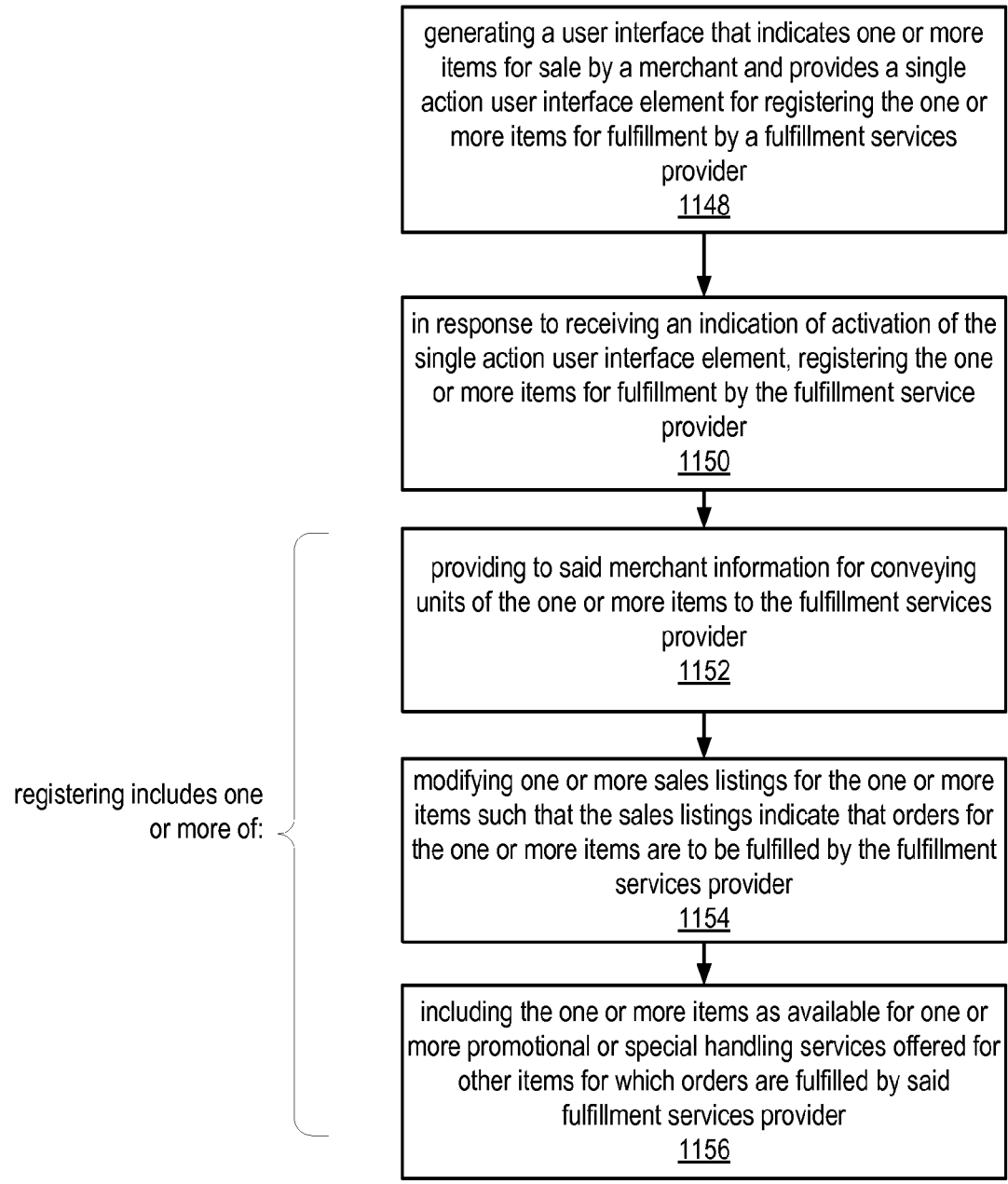
FIG. 18. illustrates a method for performing one or more actions in response to only a single action being performed, according to one embodiment.

FIG. 18. illustrates a flowchart of a method for transitioning listing customer fulfilled items into items that are fulfilled by the fulfillment services provider. In various embodiments, the method described herein may be implemented by an inventory management system, such as inventory management system 702. As illustrated by step 1148, the method may include generating a user interface that provides an indication of one or more items listed for sale by a merchant (e.g., listing customer 720). The items listed for sale by the merchant may be items for which fulfillment services are not provided by a fulfillment services provider (e.g., fulfillment services provider 720). For example, the items may be items for which the merchant receives listing services (e.g., the listing services provided sales listing services interface 708 while retaining responsibility for fulfilling (e.g., packaging and shipping) such items. The user interface may provide a single action user interface element for the merchant to register the one or more items for fulfillment by the fulfillment services provider (e.g., fulfillment services provider 720). Examples of the user interface and the single action user interface element include display 1000 and single action user interface element 1050, respectively.

The method may further include performing one or more actions in response receiving an indication of the activation of the single action user interface element. Activation of the single action user interface element may include the selection of the single action user interface element, such as the selection of the single action user interface element with a pointing device (e.g., a mouse click). In another embodiment, the activation of the single action user interface element may include the depressing of a particular button or key that corresponds to the single action user interface element (e.g., selecting the "return" key of a keyboard or other input device). In another embodiment, the activation of the single action user interface element may include the speaking of a voice command (e.g., through an appropriate sound sensitive input device, such as a microphone). In some embodiments, the single action user interface element may be a button or other control element that occupies a specific portion of the display and the single action may include placing a cursor of a pointing device (e.g., a mouse) over or within the specific portion. In response to receiving the indication of the activation of the single action user interface element, the method may include registering the one or more items for fulfillment by the fulfillment services provider, as illustrated by step 1150.

As illustrated by step 1152, such registering may include providing to the merchant information for conveying units of the items to the fulfillment services provider. In some case, such information for conveying one or more listing customer fulfilled items to the fulfillment services provider may include shipping information for the items. As described above, shipping information may include a shipping list, or packing slip, that lists one or more possibly heterogeneous items specified by the merchant to be sent to the fulfillment services provider, carried in inventory of the fulfillment services provider (e.g., in materials handling facility 712), offered for sale, and sold to purchasing customer (e.g., purchasing customer 730) on behalf of the merchant. The shipping information may also include one or more package labels that specify at least a ship from address (the address from which the merchant will ship a package containing the item) and a ship to address (the address of the facility to which the package is to be shipped). The ship from address may be automatically pulled from account information of the listing customer, or alternatively the listing customer may be allowed, to select from among two or more ship from addresses and/or to enter a different ship from address. The method may include electronically transmitting the shipping information to the merchant in printable form. For example, the shipping information may be provided to the merchant on a printable web page, via an email message as message text or as an attachment, or via some other electronic communications channel. Alternatively, the shipping information may be mailed to the merchant. In one embodiment, either one or both of the packing slip and package label may include scannable or otherwise readable information that may be used by the carrier or delivery service and/or by the fulfillment services provider upon receiving the package. In one embodiment, shipping information provided to merchant may also include information on one or more carriers or delivery services, for example street addresses, drop-off locations, phone numbers, and/or schedules, that are available near the merchant's address to deliver shipments to the ship to address specified by the fulfillment services provider.

In various embodiments, providing the merchant with information for conveying units of the one or more items to the fulfillment services provider may include generating and/or providing the merchant with packaging recommendations based on item characteristics (e.g., item characteristics stored in database 706). For instance, for a collection of items, the method may include generating and/or providing the merchant with an indication of the dimensions of shipping containers (e.g., dimensions of one or more packages 726) and the specific contents (e.g., items, packing slips, etc.) that should be packed in such shipping containers. The method may in some embodiment include optimizing such packing recommendations to minimize shipping costs between the merchant and the fulfillment services provider. In other embodiments, such recommendations may be optimized to simplify handling logistics for the fulfillment services provider. For instance, items may be grouped among different shipping containers based on their intended location within a materials handling facility, such as materials handling facility 712.

In various embodiments, the method may include generating and/or providing the merchant with a packaging kit with shipping containers (e.g., boxes) that adhere to the above described recommended shipping container dimensions. In some cases, such packaging kit may include pre-labeled shipping containers that include any of the various shipping labels described herein. In some cases, the packaging kit may include instructions for packaging particular items within such shipping containers (e.g., instructions that indicate, for a particular shipping container, which items should be placed within such shipping container). The method may include determining the appropriate shipping containers (e.g., dimensions of such shipping containers) for the packaging kit by analyzing item characteristics stored in database 706. For instance, the method may include analyzing item characteristics (e.g., length, width, weight, etc.) to determine an appropriate shipping container (e.g., a shipping container of a particular size or rated for a particular weight). In some cases, the method may include determining how much protective packing material should be used for a particular item (e.g., fragile items may require more protective packing materials than items that are not fragile) and providing such information to the merchant (e.g., as part of the packaging kit).

As illustrated by step 1154, registering the or more items for fulfillment by the fulfillment services provider may include modifying one or more sales listings (e.g., sales listing provided by sales listings services interface 708) such that the sales listing indicate that orders for the one or more items are to be fulfilled by the fulfillment services provider. For instance, before the item(s) are conveyed to the fulfillment services provider, a sales listing for such items may indicate that the respective merchant (e.g., listing customer 720) is tasked with fulfilling any orders for such items (e.g., the listing may indicate "this item is packaged and shipped by listing customer ABC"). Accordingly the method may include generating for each of such items updated or modified sales listing that indicate a different entity (e.g., fulfillment services provider 700 or another entity other than the listing customer) is tasked with fulfilling orders for such items (e.g., the listing may indicate "this item is packaged and shipped by fulfillment provider XYZ"). In some embodiments, updating or modifying a sales listing may include changing one or more data objects that define such sales listing (e.g., data of database 706). In other embodiments, the method may include generating new sales listings based on corresponding existing sales listings. Similarly, such new sales listings may, for example, indicate that a different entity (e.g., fulfillment services provider 700 or another entity other than the listing customer) is tasked with fulfilling orders for such items (e.g., the listing may indicate "this item is packaged and shipped by fulfillment provider XYZ"). In various embodiments, registering the one or more items for fulfillment by the fulfillment services provider may include generating pricing recommendations, such as the various pricing recommendation described above, and modifying respective sales listing to include one or more recommended prices.

As illustrated by step 1156, registering the one or more items for fulfillment by the fulfillment services provider may include including the items as available for one or more promotional or special handling services offered for other items for which orders are fulfilled by the fulfillment services provider. For instance, in various embodiments, the fulfillment service provider (e.g., fulfillment service provider 700) may provide one more promotional or special handling services for items that are sold by and fulfilled by the fulfillment services provider. Accordingly, for the item(s) indicated by the user interface (as described in step 1148) the method may in some cases include including such items as available for such promotional or special handling services even though the fulfillment services provider is not the seller of record for such items. In some embodiments, promotional services may include providing discounted shipping charges for shipping such items to customers (e.g., purchasing customer 730). For instance, in some cases, discounted shipping charges may be provided for items that are part of an order that has a total price above a certain price threshold (e.g., a discount shipping price threshold). For example, discounted shipping may be provided for items of orders having a total cost of more than $25. In some embodiments, special handling services may include handling services provided by the fulfillment services provider for customers (e.g., purchasing customer 730) of items fulfilled by the fulfillment services provider. For instance, the fulfillment service provider may include optional services such as gift wrapping of the items or expedited processing of the items (e.g., expediting the process of preparing items and providing items to a shipping carrier). In various embodiments, the method may include modifying sales listings (e.g., as in step 1154) to reflect the availability of promotional or special handling services. For instance, the method may include modifying a product web page to provide a customer (e.g., purchasing customer 730) with an option to select the above described promotional or special handling services.

Exemplary Computer System Embodiment

It is contemplated that in some embodiments, any of the methods or techniques described above may be implemented as program instructions and data capable of being stored or conveyed via a computer-accessible medium. Such methods or techniques may include, for example and without limitation, the functions of inventory management system 30, interface 200 and/or database 210, as well as the methods illustrated in FIGS. 3 and 4 or any suitable variations or portions thereof. Such methods or techniques may include, for example and without limitation, the functions of inventory management system 702, interfaces 704, 904 and 708 and/or database 706 illustrated in FIG. 7, as well as the method illustrated in FIG. 8, FIG. 18 or any suitable variations or portions thereof, Such program instructions may also be executed to perform computational functions in support of the methods and techniques described above, for example to instantiate operating system functionality, application functionality, and/or any other suitable functions.

One exemplary embodiment of a computer system including computer-accessible media is illustrated in FIG. 19. In the illustrated embodiment, computer system 900 includes one or more processors 910 coupled to a system memory 920 via an input/output (I/O) interface 930. Computer system 900 further includes a network interface 940 coupled to I/O interface 930. In some embodiments, it is contemplated that inventory management system 50 and/or inventory management system 702 may be implemented using a single instance of computer system 900, while in other embodiments multiple such systems may be configured to host different portions or instances of inventory management system 50 and/or inventory management system 702. For example, in one embodiment some data sources or services (e.g., purchasing management services) may be implemented via instances of computer system 900 that are distinct from those instances implementing other data sources or services (e.g., order entry/fulfillment services). It is noted that in some embodiments, the functions of inventory management system 50 and/or inventory management system 702 as variously described hereinabove may be partitioned in any suitable fashion into a number of distinct modules, procedures or other functional portions. The resulting portions of inventory management system 50 and/or inventory management system 702 may then be implemented as a unified or distributed system among one or several instances of computer system 900, for example as instructions executable by one or more of processors 910.

In various embodiments computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be a general-purpose or embedded processor implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by process 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or CD/DVD-ROM coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940.

Additionally, it is contemplated that any of the methods or techniques described above and illustrated, for example, in FIGS. 3 and 4, and in FIGS. 7, 8 and 18, may be implemented as a web service that may be performed on behalf of clients requesting such a service. Generally speaking, providing a function or service as a web service may encompass providing any of a variety of standardized APIs configured to allow different software programs to communicate (e.g., to request services and respond to such requests) in an autonomous, web-based and typically platform-independent manner. For example, an enterprise may choose to expose certain enterprise data (e.g., catalog data, inventory data, customer data or other types of data) and/or certain enterprise functions (e.g., fulfillment service request processing functions, query functions, electronic commerce functions, generic data storage or computational functions, etc.) to external clients (e.g., merchants 40 or customers 50) via a web services interface. Applications could then access the exposed data and/or functions via the web services interface, even though the accessing application may be configured to execute on an entirely different platform (e.g., a different operating system or system architecture) than the platform hosting the exposed data or functions. For example, a merchant 40 may perform self-service registration of an item 35 for fulfillment services, or may inform fulfillment center 10 of an order to be fulfilled, through web services calls exposed by interface 200.

In some embodiments, provisioning a web service may encompass the use of particular protocols which may be executable (e.g., as part of code 925) to publish available web services to potential users, to describe the interfaces of web services sufficiently to allow users to invoke web services properly, to allow users to select and differentiate among web services for a particular transaction, and to provide a format for exchanging web services data in a flexible and platform-independent manner. Specifically, in one embodiment a provider of a web service may register the service using a version of the Universal Discovery Description and Integration (UDDI) protocol, which may function as a general directory through which potential resource users may locate web services of interest. The web service provider may also publish specific details regarding how a well-formed web services request from a user should be formatted (e.g., what specific parameters are required or allowed, the data type or format to be used for a given parameter, etc.). For example, such interface details may be published (e.g., within a UDDI directory entry) using a version of the Web Services Description Language (WSDL).

In many embodiments, web services request and response data is exchanged between a client and the service provider through the use of messages or documents formatted as platform-independent structured data, such as a document formatted in compliance with a version of eXtensible Markup Language (XML). For example, in one embodiment a web services request to provide inventory health information for a given inventory item may be embodied in an XML document including fields identifying the item of interest, the type of data requested (e.g., inventory health data), and possibly other fields, in which each field is delimited by an XML tag describing the type of data the field represents. The response to such a request from the web service provider may include an XML document containing the requested data. In some embodiments, web services-related documents may be transmitted between applications making requests and targeted web services using a web-based data transfer protocol, such as a version of the Hypertext Transfer Protocol (HTTP), for example.

Different types of web services requests and responses may yield XML documents that bear little content in common, which may complicate the handling and interpretation of such documents. For example, in different versions of a free-form XML document specifying a web services request, the actual web service that is requested may appear at different places within different document versions, which may require a recipient of the document to buffer or parse a good deal of document data before understanding what the document is for. Consequently, in some embodiments, the XML documents containing web services request/response data may be encapsulated within additional XML data used to define a messaging framework, e.g., a generic format for exchanging documents or messages having arbitrary content. For example, in one embodiment web services requests or responses may be XML documents formatted according to a version of the Simple Object Access Protocol (SOAP), which in various versions may define distinct document sections such as an "envelope" (e.g., which may include a specification of the document type, the intended recipient web service, etc.) as well as a message body that may include arbitrary XML message data (e.g., the particular details of the web services request). However, in some embodiments, web services may be implemented using different protocols and standards for publishing services and formatting and exchanging messages.

Additionally, in some embodiments, a web services system may be implemented without using document-based techniques such as SOAP-type protocols. For example, as an alternative to a document-based approach, a web service may be implemented using a Representational State Transfer (REST)-type architecture. Generally speaking, in REST-type architectures, web services requests may be formed as commands conveyed via a transport protocol, such as PUT or GET commands conveyed via a version of the HTTP protocol. Those parameters of the request that might be embedded within a document in a document-based web services architecture may instead be included as command parameters in a REST-type architecture. Other suitable configurations of web services architectures are possible and contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising: a memory storing program instructions; and one or more processors coupled to said memory, wherein said program instructions are executable by at least one of said one or more processors to implement an inventory management system for a fulfillment services provider, wherein said inventory management system is configured to:
   determine identification information for a merchant;
      based on the identification information for the merchant, access, from an e-commerce provider of an e-commerce channel listing one or more items for sale for the merchant, listing information for the one or more listed items that are already listed for sale by the merchant with the e-commerce provider through the e-commerce channel;
      generate, based on the stored listing information, a user interface providing an indication of the one or more listed items that are already listed for sale by the merchant with the e-commerce provider through the e-commerce channel,
         wherein order fulfillment services for the one or more listed items are not currently provided by said fulfillment services provider and are instead provided by the merchant,
         wherein the user interface provides a single action user interface element for the merchant to register the one or more listed items for order fulfillment services provided by said fulfillment services provider instead of the order fulfillment services provided by the merchant, and
         wherein the single action user interface element corresponds to the one or more listed items accessed based on the identification information for the merchant; and
      in response to receiving an indication of activation of the single action user interface element, register the one or more listed items for order fulfillment services provided by said fulfillment services provider to transition order fulfillment responsibility for the one or more listed items from the merchant to said fulfillment services provider, wherein registering the one or more listed items for order fulfillment services provided by said fulfillment services provider includes one or more of: providing to said merchant information or items for conveying units of the one or more listed items to said fulfillment services provider, modifying one or more sales listings for the one or more listed items to indicate that orders for the one or more listed items are fulfilled by said fulfillment services provider, or including the one or more listed items as available for one or more promotional or special handling services offered for other items for which orders are fulfilled by said fulfillment services provider.

2. The system of claim 1, wherein said registering includes said providing to said merchant the information or items for conveying units of the one or more listed items to said fulfillment services provider, wherein providing information or items for conveying units of the one or more listed items comprises providing shipping information comprising one or more of: a shipping list, a packing slip, and a shipping label for said one or more listed items.

3. The system of claim 1, wherein said registering includes said providing to said merchant the information or items for conveying units of the one or more listed items to said fulfillment services provider, wherein providing information or items for conveying units of the one or more listed items comprises providing to said merchant a packaging kit comprising shipping containers and instructions for packing particular ones of said one or more listed items within particular ones of said shipping containers.

4. The system of claim 1, wherein said registering includes said modifying the one or more sales listings for the one or more listed items, wherein said modifying further comprises modifying said one or more sales listings such that the one or more sales listing indicate that one or more of said promotional or special handling services are available for said one or more listed items.

5. The system of claim 1, wherein said registering comprises including the one or more listed items as available for said one or more promotional or special handling services, wherein said including comprises including the one or more listed items as available for a discounted shipping rates program for shipping one or more of said one or more listed items to a purchasing customer.

6. The system of claim 1, wherein said registering comprises including the one or more listed items as available for said one or more promotional or special handling services, wherein said including comprises including the one or more listed items as available for expedited order processing.

7. The system of claim 1, wherein said registering further comprising providing one or more pricing suggestions for each of said one or more listed items, wherein said one or more pricing suggestions are based on historical pricing information for said one or more listed items from said fulfillment services provider.

8. The system of claim 1, wherein said single action user interface element is a web-based element, wherein receiving the indication of activation of the single action user interface element comprises receiving said indication via a web-based interface.

9. A computer-implemented method for registering items with a fulfillment services provider, the method comprising: performing by one or more computers:
   determining identification information for a merchant;
   based on the identification information for the merchant, accessing, from an e-commerce provider of an e-commerce channel listing one or more items for sale for the merchant, stored listing information for one or more listed items that are already listed for sale by the merchant with the e-commerce provider through the e-commerce channel;
   generating, based on the stored listing information, a user interface providing an indication of the one or more listed items that are already listed for sale by the merchant with the e-commerce provider through the e-commerce channel, wherein order fulfillment services for the one or more listed items are not currently provided by said fulfillment services provider and are instead provided by the merchant, wherein the user interface provides a single action user interface element for the merchant to register the one or more listed items for order fulfillment service provide by said fulfillment services provider instead of the order fulfillment service provide by the merchant, and wherein the single action user interface element corresponds to the one or more listed items accessed based on the identification information for the merchant; and in response to receiving an indication of activation of the single action user interface element, registering the one or more listed items for order fulfillment services provided by said fulfillment services provider to transition order fulfillment responsibility for the one or more listed items from the merchant to said fulfillment services provider, wherein registering the one or more listed items for order fulfillment services provided by said fulfillment services provider includes one or more of: providing to said merchant information or items for conveying units of the one or more listed items to said fulfillment services provider, modifying one or more sales listings for the one or more listed items to indicate that orders for the one or more listed items are fulfilled by said fulfillment services provider, or including the one or more listed items as available for one or more promotional or special handling services offered for other items for which orders are fulfilled by said fulfillment services provider.

10. The method of claim 9, wherein said registering includes said providing to said merchant the information or items for conveying units of the one or more listed items to said fulfillment services provider, wherein providing information or items for conveying units of the one or more listed items comprises providing shipping information comprising one or more of: a shipping list, a packing slip, and a shipping label for said one or more listed items.

11. The method of claim 9, wherein said registering includes said providing to said merchant the information or items for conveying units of the one or more listed items to said fulfillment services provider, wherein providing information or items for conveying units of the one or more listed items comprises providing to said merchant a packaging kit comprising shipping containers and instructions for packing particular ones of said one or more listed items within particular ones of said shipping containers.

12. The method of claim 9, wherein said registering includes said modifying the one or more sales listings for the one or more listed items, wherein said modifying further comprises modifying said one or more sales listings such that the one or more sales listing indicate that one or more of said promotional or special handling services are available for said one or more listed items.

13. The method of claim 9, wherein said registering comprises including the one or more listed items as available for said one or more promotional or special handling services, wherein said including comprises including the one or more listed items as available for a discounted shipping rates program for shipping one or more of said one or more listed items to a purchasing customer.

14. The method of claim 9, wherein said registering comprises including the one or more listed items as available for said one or more promotional or special handling services, wherein said including comprises including the one or more listed items as available for expedited order processing.

15. The method of claim 9, wherein said registering further comprising providing one or more pricing suggestions for each of said one or more listed items, wherein said one or more pricing suggestions are based on historical pricing information for said one or more listed items from said fulfillment services provider.

16. The method of claim 9, wherein said single action user interface element is a web-based element, wherein receiving the indication of activation of the single action user interface element comprises receiving said indication via a web-based interface.

17. A non-transitory computer-readable storage medium, comprising program instructions computer-executable to:

determine identification information for a merchant;

based on the identification information for the merchant, access, from an e-commerce provider of an e-commerce channel listing one or more items for sale for the merchant, listing information for the one or more listed items that are already listed for sale by the merchant with the e-commerce provider through the e-commerce channel;

generate, based on the stored listing information, a user interface providing an indication of the one or more listed items that are already listed for sale by the merchant with the e-commerce provider through the e-commerce channel, wherein the user interface provides a single action user interface element for the merchant to register the one or more listed items for order fulfillment services provided by a fulfillment services provider other than a particular fulfillment services provider that is currently providing fulfillment services for the one or more listed items listed for sale in the electronic marketplace, and wherein the single action user interface element corresponds to the one or more listed items accessed based on the identification information for the merchant; and in response to receiving an indication of activation of the single action user interface element, register the one or more listed items for order fulfillment services provided by said fulfillment services provider to transition order fulfillment responsibility for the one or more listed items from the merchant to said fulfillment services provider.

18. The medium of claim 17, wherein registering the one or more listed items for fulfillment by said fulfillment services provider includes one or more of: providing to said merchant information or items for conveying units of the one or more listed items to said fulfillment services provider, modifying one or more sales listings for the one or more listed items to indicate that orders for the one or more listed items are fulfilled by said fulfillment services provider, and including the one or more listed items as available for one or more promotional or special handling services offered for other items for which orders are fulfilled by said fulfillment services provider.

19. The medium of claim 18, wherein said registering includes said providing to said merchant the information or items for conveying units of the one or more listed items to said fulfillment services provider, wherein providing information or items for conveying units of the one or more listed items comprises providing shipping information comprising one or more of: a shipping list, a packing slip, and a shipping label for said one or more listed items.

20. The medium of claim 18, wherein said registering includes said providing to said merchant the information or items for conveying units of the one or more listed items to said fulfillment services provider, wherein providing information or items for conveying units of the one or more listed items comprises providing to said merchant a packaging kit comprising shipping containers and instructions for packing particular ones of said one or more listed items within particular ones of said shipping containers.

21. The medium of claim 18, wherein said registering includes said modifying the one or more sales listings for the one or more listed items, wherein said modifying further comprises modifying said one or more sales listings such that the one or more sales listing indicate that one or more of said promotional or special handling services are available for said one or more listed items.

22. The medium of claim 18, wherein said registering comprises including the one or more listed items as available for said one or more promotional or special handling services, wherein said including comprises including the one or more listed items as available for a discounted shipping rates program for shipping one or more of said one or more listed items to a purchasing customer.

23. The medium of claim 18, wherein said registering comprises including the one or more listed items as available for said one or more promotional or special handling services, wherein said including comprises including the one or more listed items as available for expedited order processing.

24. The medium of claim 18, wherein said registering further comprising providing one or more pricing suggestions for each of said one or more listed items, wherein said one or more pricing suggestions are based on historical pricing information for said one or more listed items from said fulfillment services provider.

25. The medium of claim 17, wherein said single action user interface element is a web-based element, wherein receiving the indication of activation of the single action user interface element comprises receiving said indication via a web-based interface.

* * * * *